United States Patent [19]

Harvey et al.

[11] Patent Number: 4,694,490

[45] Date of Patent: Sep. 15, 1987

[54] SIGNAL PROCESSING APPARATUS AND METHODS

[76] Inventors: John C. Harvey, 333 E. 57th St., New York, N.Y. 10022; James W. Cuddihy, 523 E. 14th St., New York, N.Y. 10009

[21] Appl. No.: 317,510

[22] Filed: Nov. 3, 1981

[51] Int. Cl.[4] .......................... H04K 9/00; H04N 7/08
[52] U.S. Cl. ............................................ 380/20; 380/9; 380/10; 380/54; 358/142; 358/143
[58] Field of Search ................... 455/4, 26, 30, 32–34, 455/37, 70; 358/147, 142, 146, 143, 183, 86, 122; 364/521

[56] References Cited

U.S. PATENT DOCUMENTS

| | | | |
|---|---|---|---|
| 3,668,307 | 6/1972 | Face et al. | 358/114 |
| 3,684,823 | 8/1972 | McVoy | 455/70 |
| 3,833,757 | 9/1974 | Kirk, Jr. et al. | 455/4 |
| 3,845,391 | 10/1974 | Crosby | 455/26 |
| 3,891,792 | 6/1975 | Kimura | 358/142 |
| 3,987,398 | 10/1976 | Fung | 455/4 |
| 4,138,726 | 2/1979 | Girault et al. | 364/521 |
| 4,218,698 | 8/1980 | Bart et al. | 358/183 |
| 4,264,925 | 4/1981 | Freeman et al. | 358/143 |
| 4,310,854 | 1/1982 | Baer | 358/143 |
| 4,337,480 | 1/1982 | Bourassin et al. | 358/183 |
| 4,347,532 | 8/1982 | Korver | 358/183 |
| 4,381,522 | 4/1983 | Lambert | 455/4 |

*Primary Examiner*—Salvatore Cangialosi

*Attorney, Agent, or Firm*—Darby & Darby

[57] ABSTRACT

Apparatus and methods for automatically controlling programming transmissions and presentations on television and radio equipment and monitoring the programming transmitted and presented. ("Programming" here means everything transmitted over television or radio intended for communication of entertainment or to instruct or inform.) The Apparatus can handle programming transmitted either over-the-air (hereinafter, "broadcast") or over hard-wire (hereinafter, "cablecast"). The apparatus receive transmissions from as many as one hundred or more channels that are sequentially scanned by one or more scanners/switches that transfer the transmissions to one or more receiver/decoders that identify signals in the programming and separate the signals from the programming transmissions. The signals may then be transferred through one or more decrypters. The separated and possibly wholly or partially decrypted signals are then transferred through one or more processors and buffers to external equipment and/or data recorders. The data recorders are adapted to output data to remote sites on predetermined instructions. In all these functions, the apparatus are governed by one or more controllers. The methods co-ordinate and instruct equipment in the transmission and presentation of radio and television programming, especially in multi-media and multi-channel presentations, and in certain other functions.

13 Claims, 22 Drawing Figures

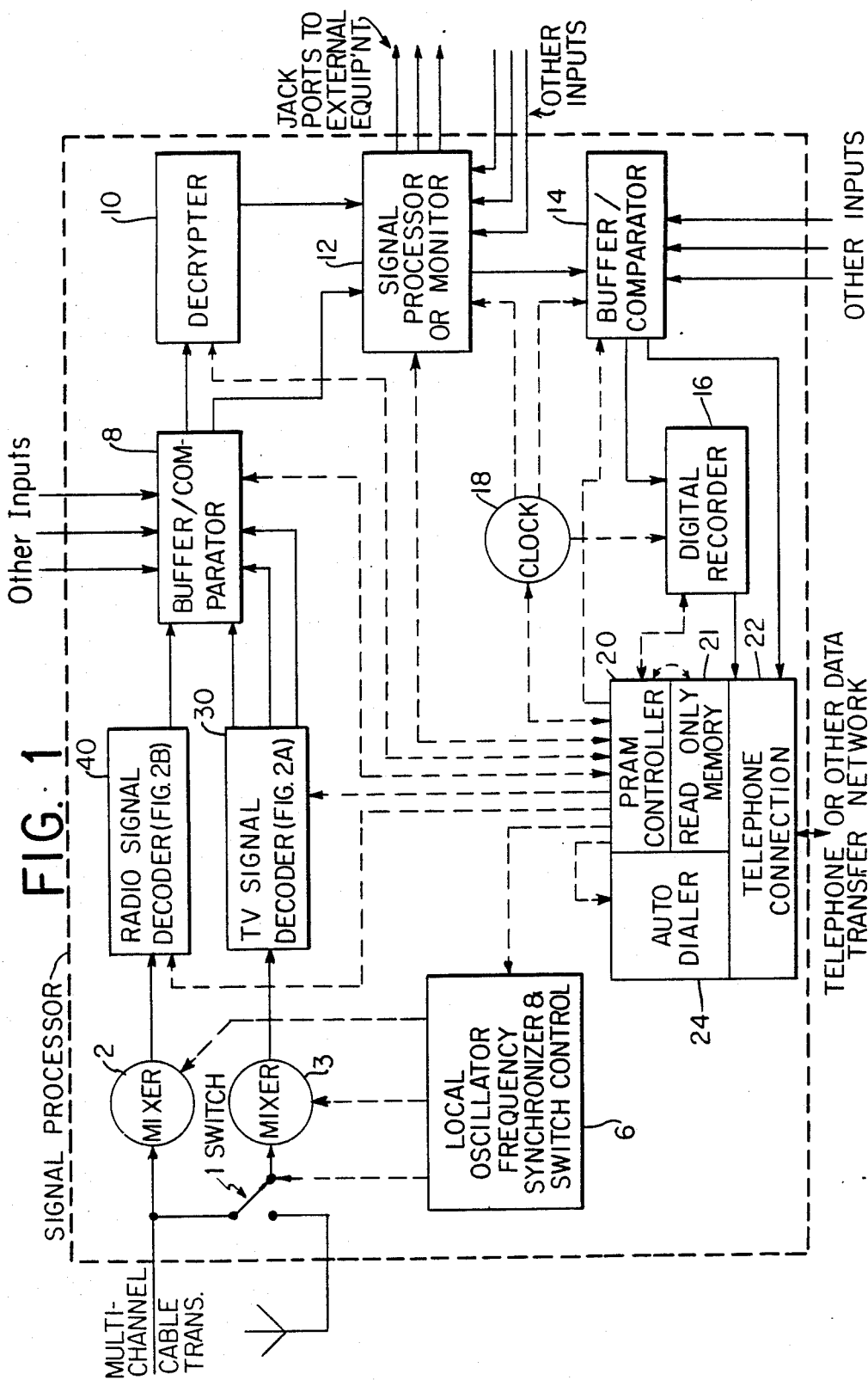

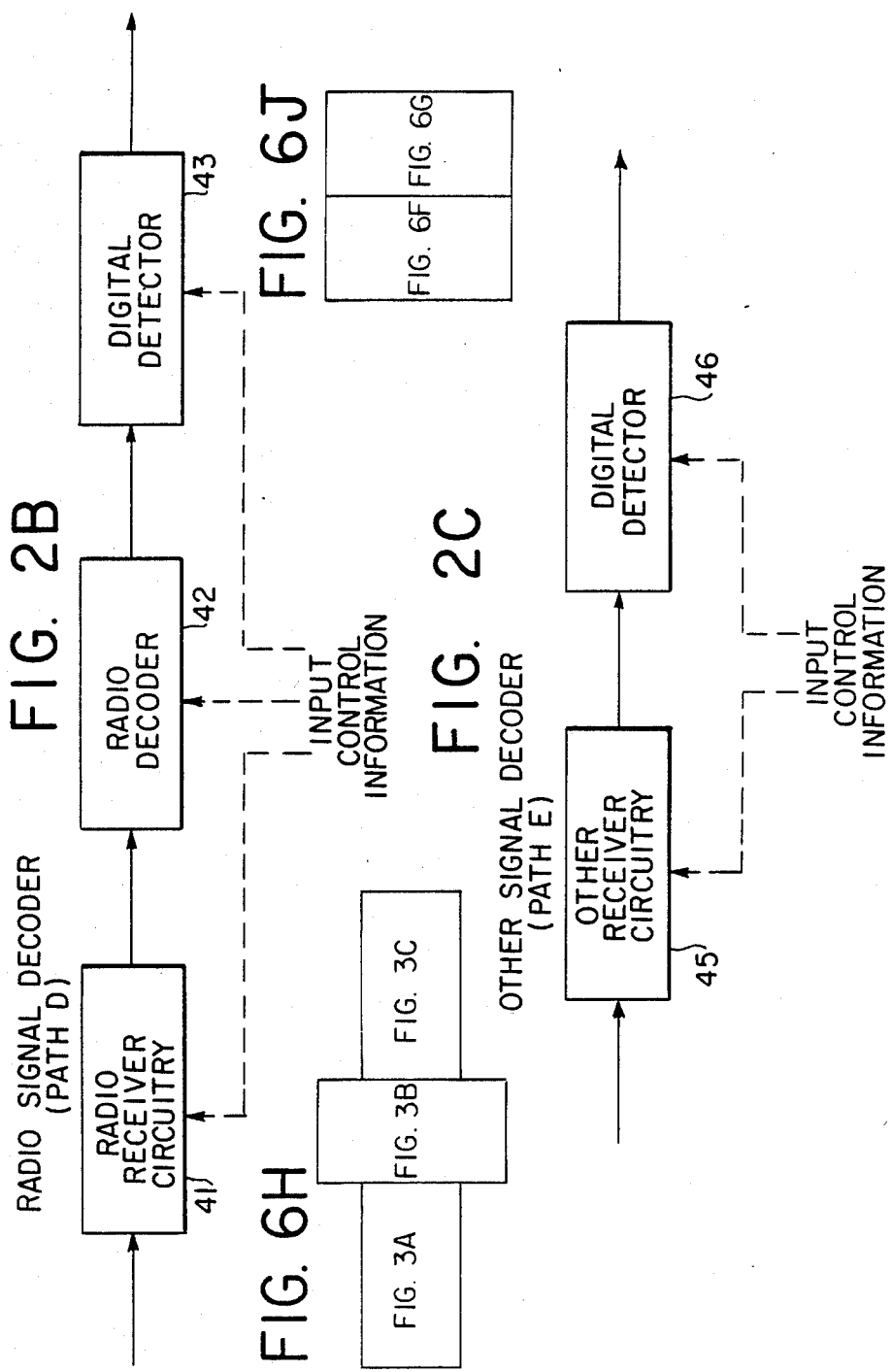

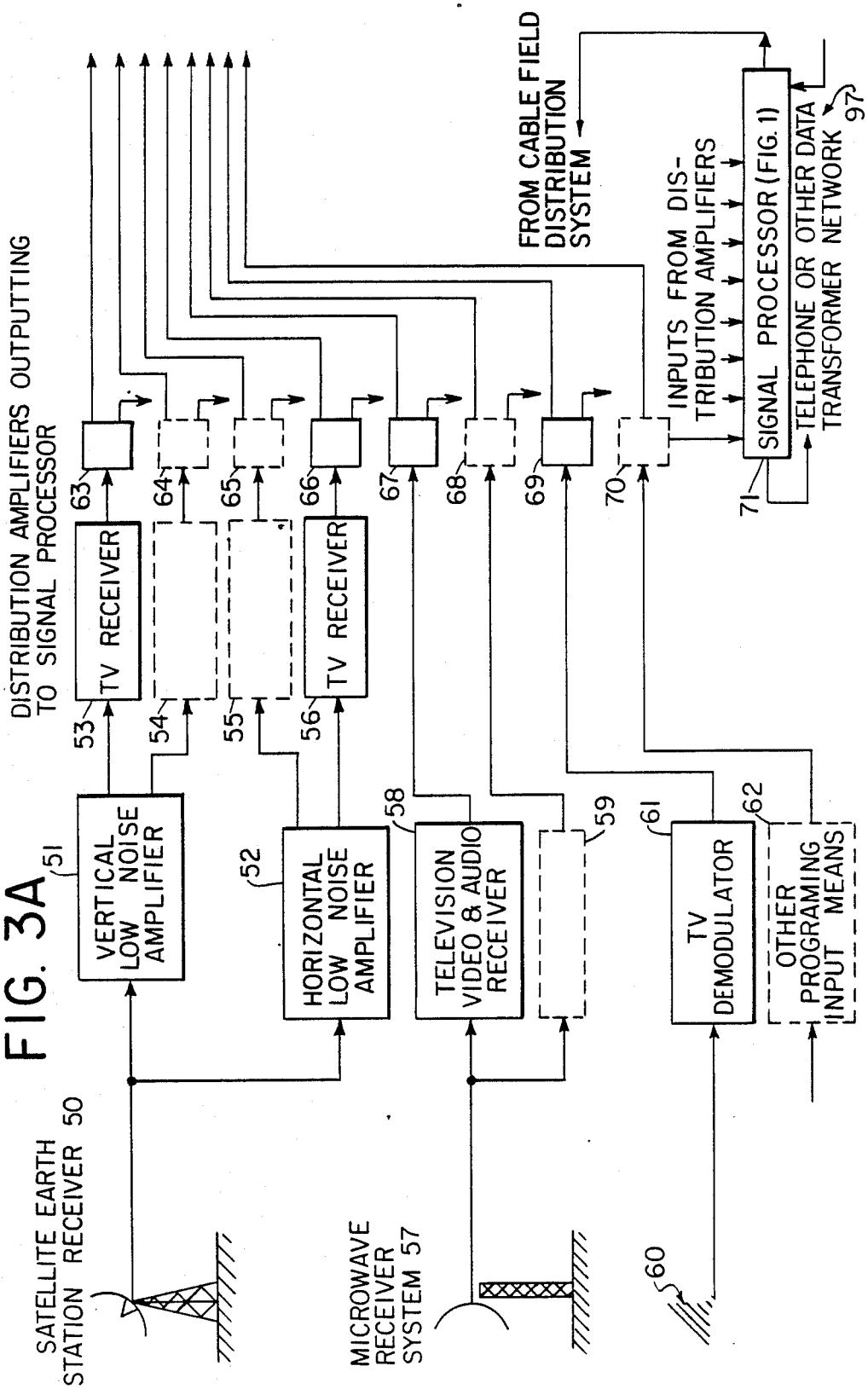

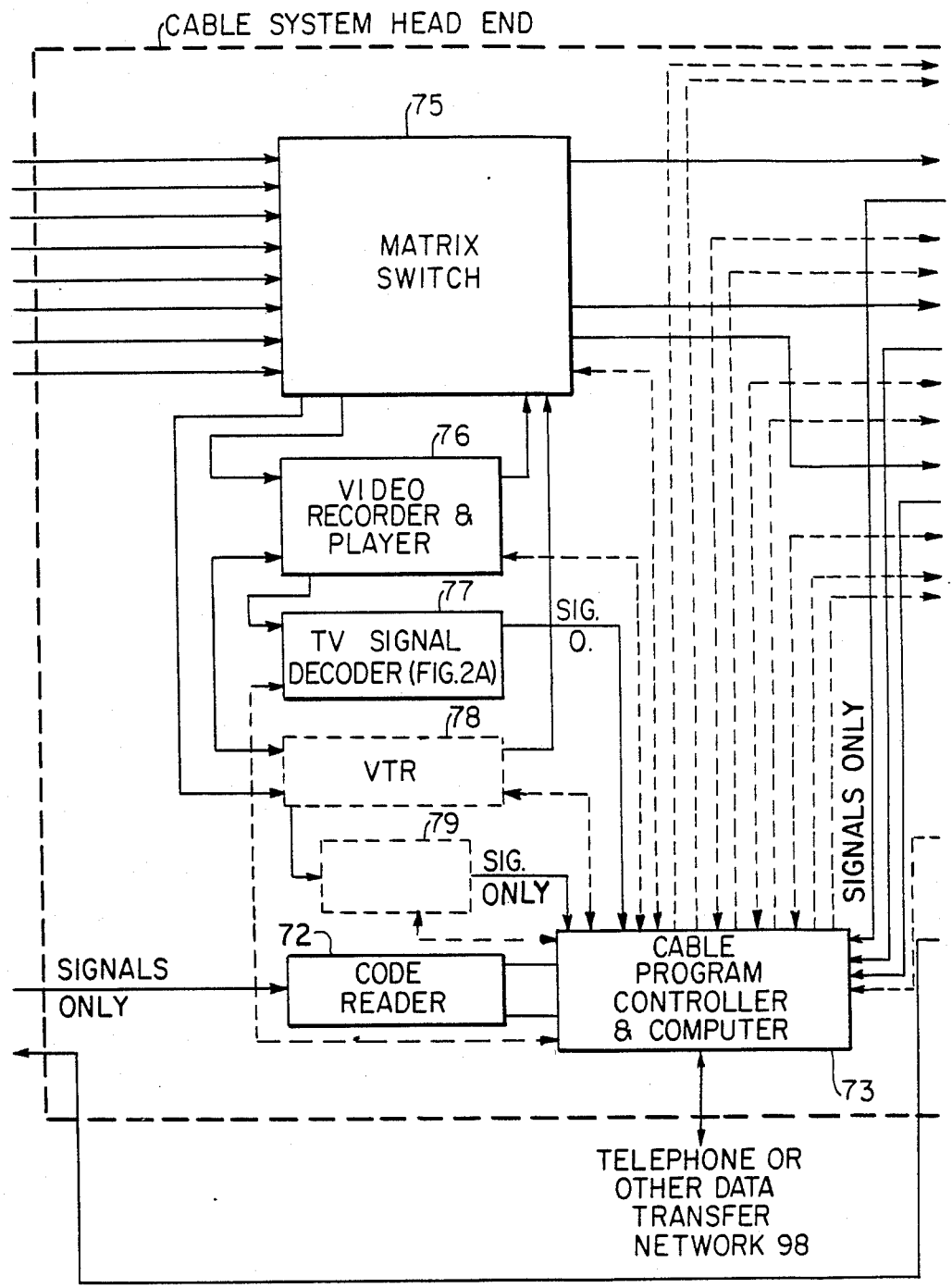

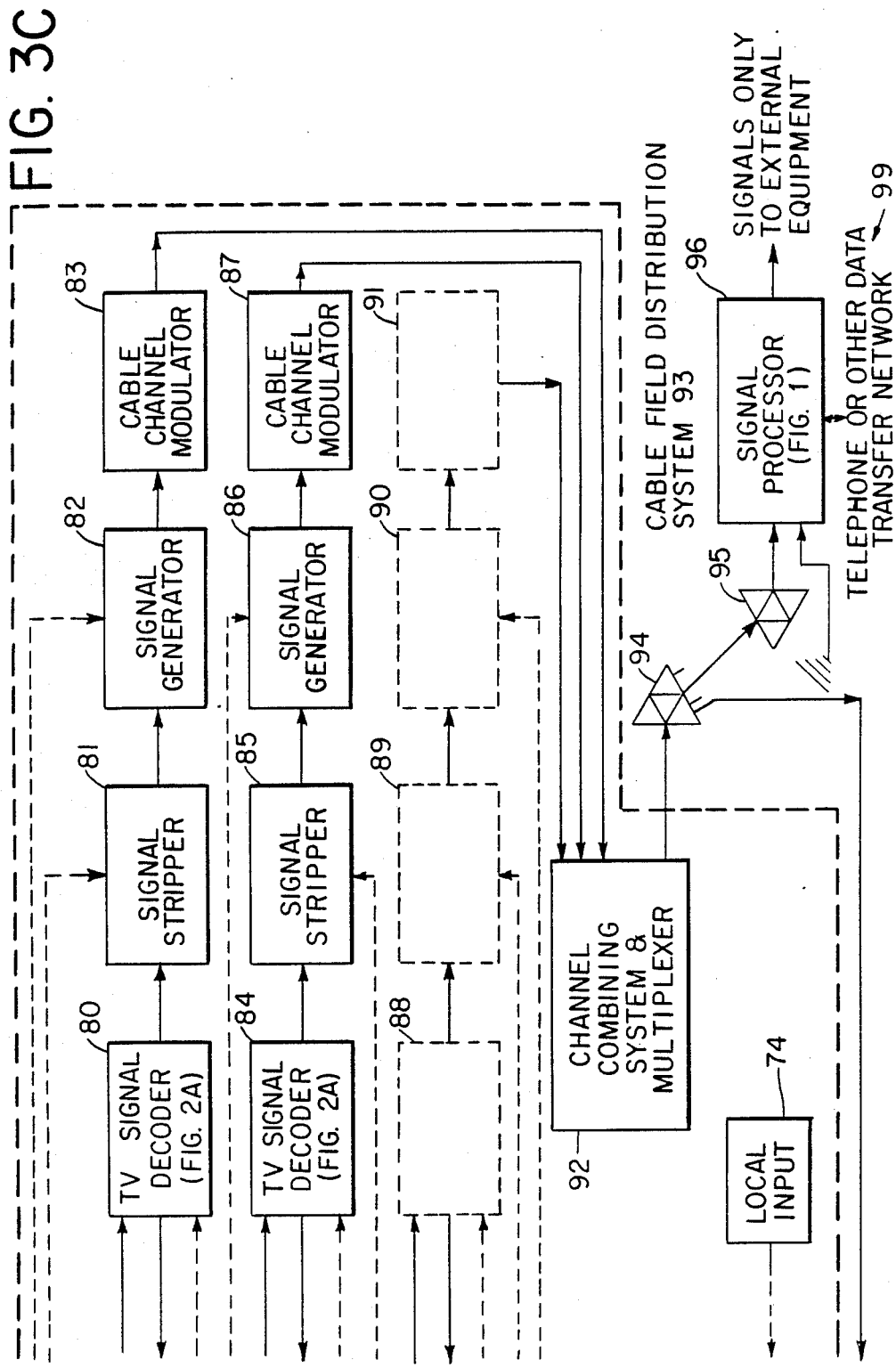

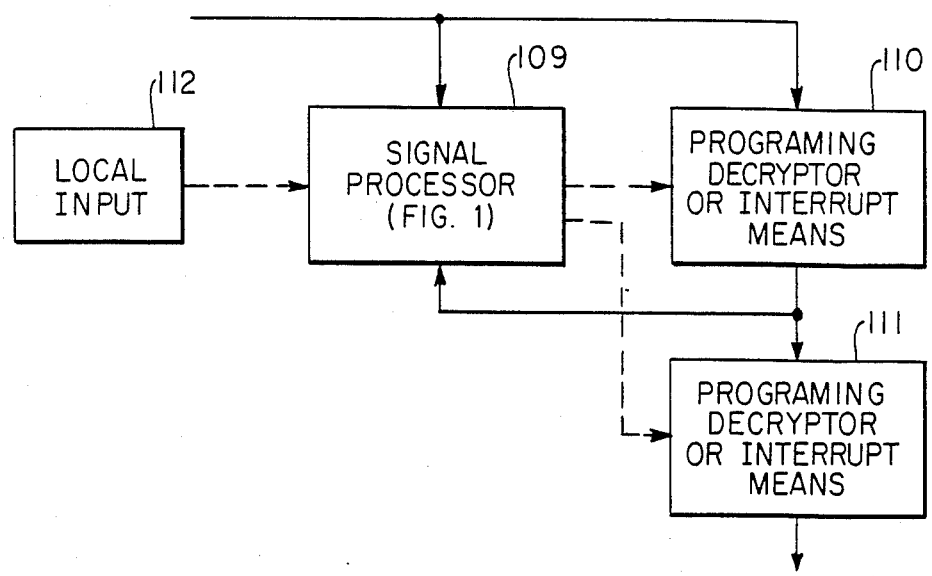
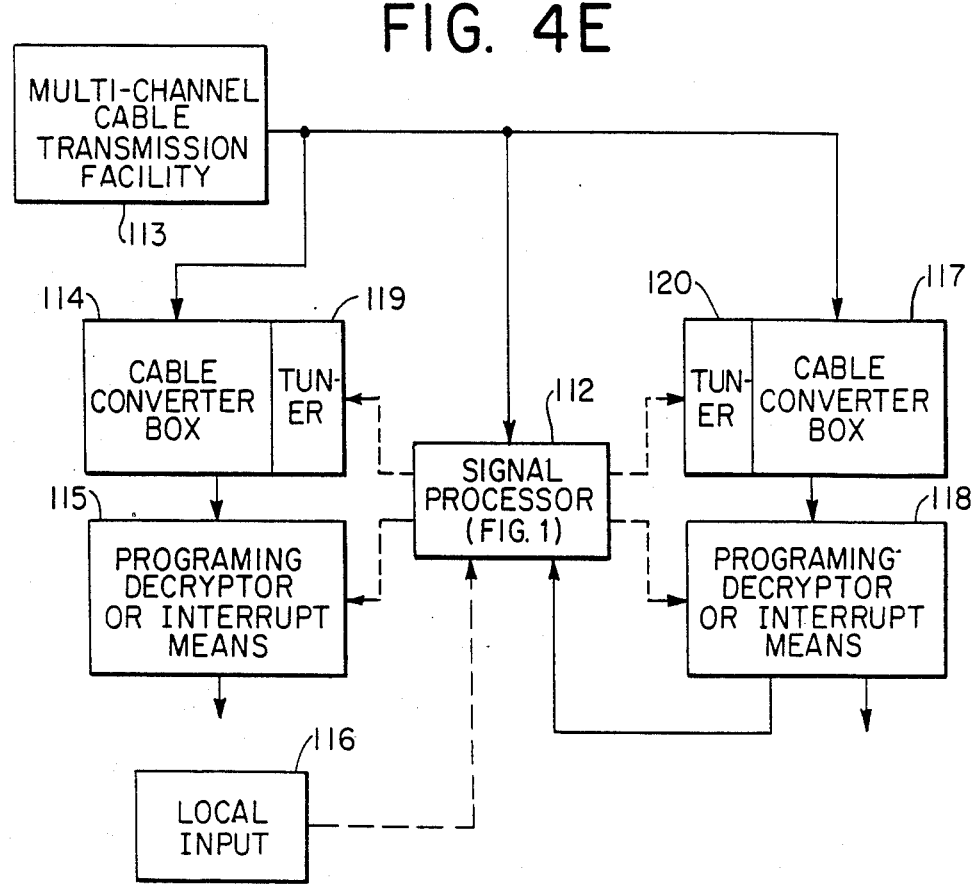

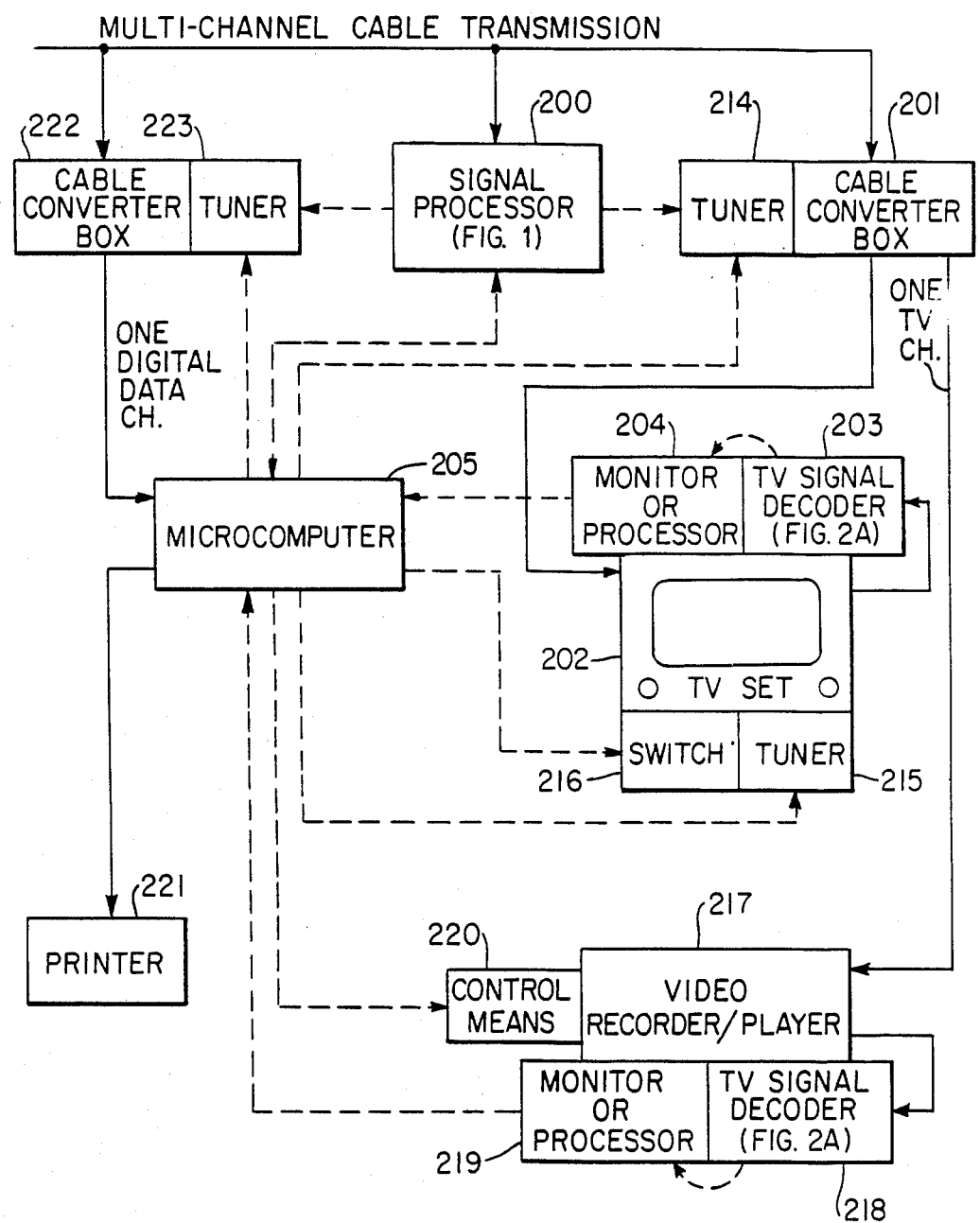

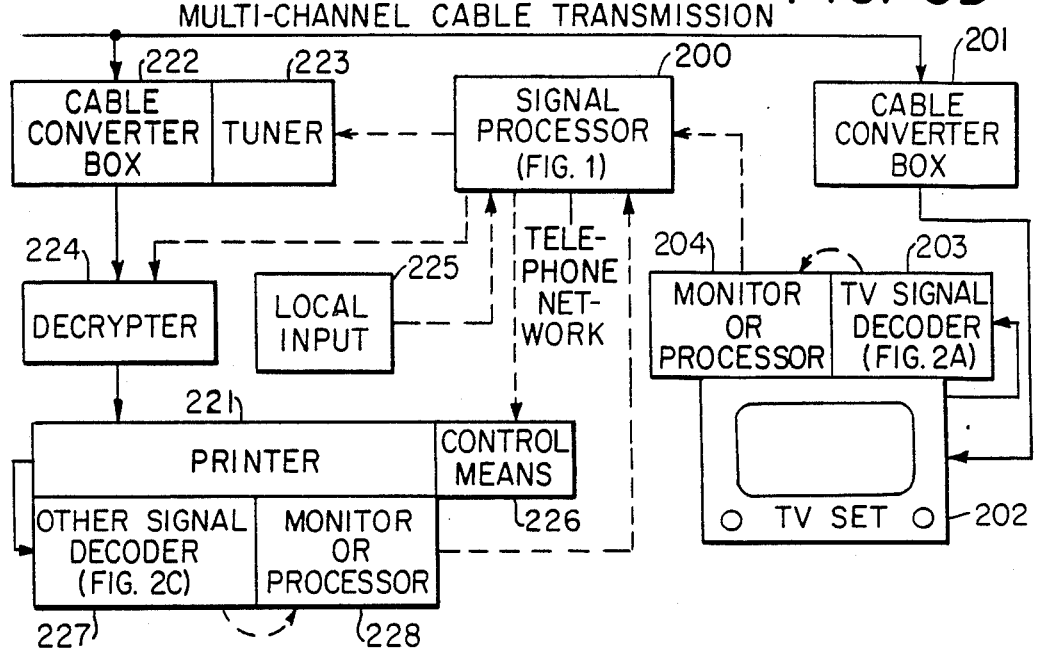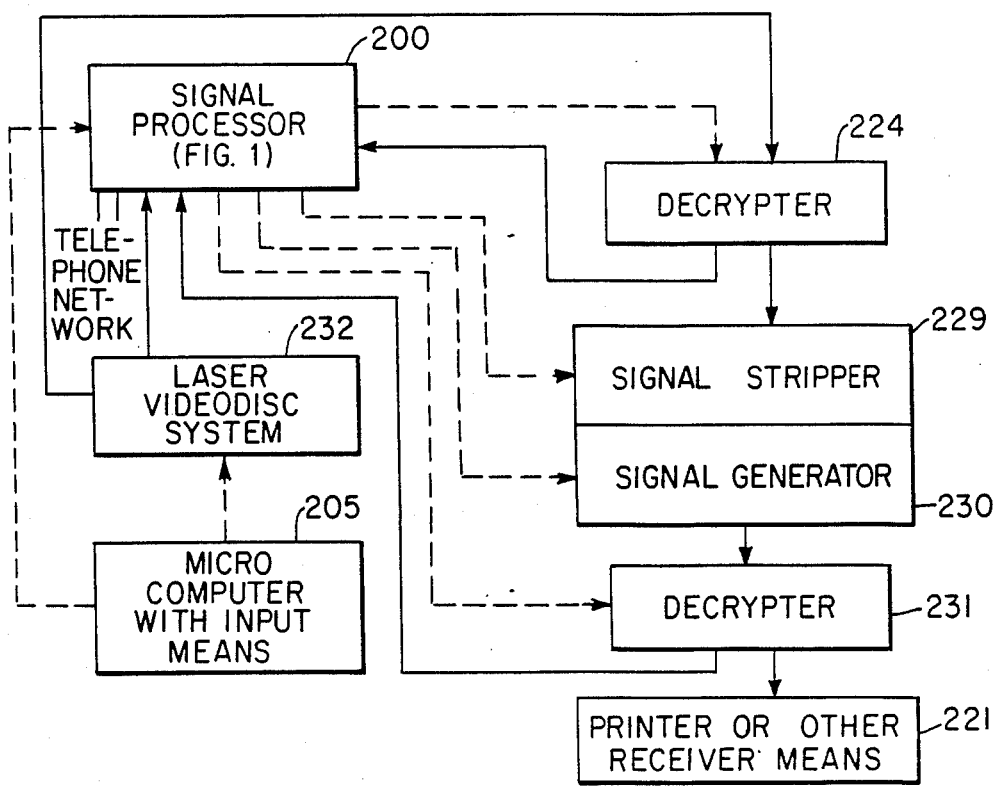

SIGNAL PROCESSING APPARATUS AND METHODS

BACKGROUND OF THE INVENTION

At the present time, vast amounts of programing are transmitted through various media throughout the United States which programing is handled with significant degrees of manual processing as different, discrete units of programing transmitted on single channel systems. Broadcasters and cablecasters transmit programing with the expectation that viewers in one place tune to only one channel at a time.

On occasion and on a limited scale, the co-ordination of two media and two channels has occurred. Such co-ordination has taken the form of stereo simulcasts where one local television station broadcasts a program, generally of classical music, and simultaneously, a local radio station broadcasts the same music in stereo. But such simulcasts require significant degrees of manual processing at both the points of origination and reception.

Today great potential exists for a significant increase in the scope and scale of multi-media and multi-channel presentations. This increase is desirable because it will increase variety and add substantially to the richness of presentations as regards both entertainment and the communications of ideas and information.

This potential arises out of two simultaneous, independent trends. One is the development and growth of the so-called cable television industry whose member companies deliver locally not one but many channels of programing. The other is the widespread and growing ownership of computers, especially microcomputers in homes.

It is the object of this invention to unlock this potential by the development of means and methods which permit programing to communicate with equipment that is external to television and radio receivers, particularly computers and computer peripherals such as printers.

It is the further purpose of this invention to provide means and methods to process and monitor such transmissions and presentations at individual receiver sites and to control, in certain ways, the use of transmitted programing and the operation of certain associated equipment. Such receiver sites may be stations or systems that intend to retransmit the programing, or they may be end users of the programing. The present invention contemplates that certain data may be encrypted and that certain data collected from such processing and monitoring will automatically be transfered to a remote geographic location or locations.

In the prior art, there have been attempts to develop systems to control programing and systems to monitor programing, but the two have been treated as separate systems, and each has had limited capacity.

As regards control systems, cueing systems and equipment now exist that transmit instructions to operating equipment at receiver sites by means of tone signals that are carried, in television transmissions, in the audio portion and may be heard by the human ear. Such systems and devices are used to turn on equipment such as videotape players and recorders that have been manually loaded and to tell such equipment how long to run. Such systems operate by transmitting operating signals that precede and follow programing and are called "headers" and "trailers" respectively. The use of headers and trailers limits prior art in that headers and trailers can become separated from programing, thereby hampering automatic operations. Such prior art techniques have lacked the capacity to process the programing in various ways including to instruct receiver end equipment what specific programing to select to play or record other than that immediately at hand, how to load it on player or recorder equipment, when and how to play it or record it other than immediately, how to modify it, what equipment or channel or channels to transmit it on, when to transmit it, and how and where to file it or refile it or dispose of it. (Within television studios that are original transmitters of programing, certain systems and equipment do exist for certain automatic co-ordination of players, loaders, and other equipment; however, manual instructions still must be given, on site, for the co-ordination of such equipment which instructions are transmitted electronically on hardwire channels that are strictly separate from the channels on which the programing is transmitted and such instructions are never broadcast.) Such prior art systems and equipment have lacked the capacity to automatically coordinate multi-channel and multi-media presentations. They have lacked the capacity to decrypt encrypted processing signals. They have lacked the capacity to monitor whether receiver-end equipment are following instructions properly.

As regards monitoring systems, various systems and devices have been developed to determine what programing is played on television. One such system for monitoring programs is described in U.S. Pat. No. 4,025,851 to Haselwood, et al. Another that monitors by means of audio codes that are only "substantially inaudible" is described in U.S. Pat. No. 3,845,391 to Crosby. Recently devices, called addressable converters, have been developed that facilitate so-called pay-per-view marketing of programing by monitoring what individual television receivers tune to and either permitting or preventing the tuners to tune to given frequencies satisfactorily. Such prior art techniques and equipment have been limited to monitoring single broadcast stations, channels or units and have lacked the ability to monitor multimedia presentations. They have been able to monitor only the audio or the video portion of television transmissions. They have been able either to monitor what is transmitted over one channel or what is received by one or more receivers but not both. They have lacked the capacity to record and transfer information simultaneously. They have been unable to decrypt encrypted signals. They have been able to monitor only single signal word types or word lengths that are placed, within the transmissions, in locations that are unvarying and unvariable. They have lacked the capacity to compare, assemble, and/or evaluate multi-word, multi-location signals. Except in the possible case of addressable converters, they have been unable to distinguish the absence of signals or signal words in transmissions. They have lacked the capacity to communicate processing instructions to external equipment as described in the paragraph above. It is the object of the present invention to overcome these and other deficiencies of the prior art.

(The term "signal unit" hereinafter means one complete signal instruction or information message unit. Examples of signal units are a unique code identifying a programing unit, or a unique purchase order number identifying the proper use of a programing unit, or a general instruction identifying whether a programing unit is to be retransmitted immediately or recorded for delayed transmission. The term "signal word" hereinafter means one full discrete appearance of a signal as embedded at one time in one location on a transmission. Examples of signal words are a string of one or more digital data bits encoded together on a single line of video or sequentially in audio. Such strings may or may not have predetermined data bits to identify the beginnings and ends of words. Signal words may contain parts of signal units, whole signal units, or groups of partial or whole signal units or combinations.)

It is a further object of the present invention to process and monitor signals on numerous channels by sequentially scanning each channel in a predetermined manner which manner may be varied. It is also an object of the present invention to prevent unauthorized use of signals and programing by permitting signal encryption, the variation of word numbers, word lengths, word compositions, and/or word locations. It is also an object of this system to process different signal words in different ways. It is also an object of the present invention to provide a record of signals that may be transferred to a geographically distant location on command or predetermined instruction.

Other objects of this invention will appear from the following descriptions and the appended claims.

SUMMARY OF THE INVENTION

The present invention consists of methods and apparatus with several forms.

One method provides a technique whereby a broadcast or cablecast transmission facility can duplicate the operation of a television studio automatically through the use of instruction and information signals embedded in programing either supplied from a remote source or sources or prerecorded. The programing may be delivered to the transmission facility by any means including broadcast, hard-wire, and manual means. The transmission facility may transmit a single channel or multiple channels of programing. The method includes a monitoring technique to construct a record for each transmitted channel that duplicates the log that the Federal Communications Commission requires broadcast station operators to maintain. The method permits the transfer of such records to a predetermined site or sites in a predetermined fashion or fashions.

Another method has application at receiver sites such as private homes or public places like theaters, hotels, brokerage offices, etc., whether commercial establishments or not. This method provides techniques whereby, automatically, single channel, single medium presentations, be they television, radio, or other electronic transmissions, may be recorded, co-ordinated in time with other programing previously transmitted or recorded, or processed in other fashions. Multimedia presentations may be co-ordinated in time and/or in place as, for example, when real-time video programing is co-ordinated with presentations from a microcomputer working with data supplied earlier. This method provides techniques whereby the timing and fashion of the playing, processing, and co-ordination of a presentation or presentations may be determined at the time and place of transmission or of presentation, either in whole or in part, either locally or remotely, or a combination of these factors. The method provides monitoring techniques to develop data on patterns of viewership and to permit the detemination of specific usage at individual receiving sites for various purposes including, for example, the billing of individual customers. The method provides techniques whereby unauthorized use of programing and/or of signals may be prevented.

These techniques employ signals embedded in programs. The advantage of such embedded signals, as compared to header and trailer signals, is that they cannot become separated inadvertently from the programing and, thereby, inhibit automatic processing, that they can convey signals to equipment that must switch manners or modes of operation during transmissions of individual units of programing, and that they can be monitored. (The techniques described here may use headers and trailers from time to time.) The embedded signals may run and repeat continuously throughout the programing or they may run only occasionally or only once. They may appear in various and varying locations. In television they may appear on one line in the video portion of the transmission, or on a portion of one line, or on more than one line, and will probably lie outside the range of the television picture displayed on a normally tuned television set. In television and radio they may appear in a portion of the audio range that is not normally rendered in a form audible to the human ear. In television audio, they are likely to lie between eight and fifteen kilohertz. Signals may also be transmitted on frequencies outside the ranges of television and radio. Different and differing numbers of signals may be sent in different and differing word lengths and locations.

The present invention provides a method for obscuring the meaning of the signals to prevent unauthorized use of the signals and of their associated programing. Their meanings may be obscured through encryption so that apparatus described below are necessary to decrypt them. In addition, the pattern of the composition, timing, and location of the signals may vary in such ways that only receiving apparatus that are preinformed regarding the patterns that obtain at any given time will be able to process the signals correctly. Both the arrangement of signal units in signal words and the locations, timings, and lengths of signal words in individual transmissions or groups of transmissions may vary in fashions that can only be interpreted accurately by apparatus that are preprogramed with the keys to such variations.

The present invention also provides a method for identifying attempts to make unauthorized use of signals and the programing associated with signals. When an apparatus finds that signal words fail to appear in places and at times when and where they are expected, the apparatus may automatically contact one or more remote sites and may or may not disable the flow of programing in one or more ways.

The present invention contemplates signal processing apparatus comprising a device or devices that can selectively scan transmission channels as directed. The channels may convey television, radio, or other transmission frequencies. The input transmissions may be received by means of antennas or from hard-wire connections. The scanners/switches, working in parallel or series or combinations, transfer the transmissions to receiver/decoder/detectors that identify signals encoded in programing transmissions and convert the encoded signals to digital information; decryptors that may convert the received information, in part or in whole, to other digital information according to preset methods or patterns; and one or more processor/monitors and/or buffer/- comparators that organize and transfer the information stream. The processors and buffers can have inputs from each of the receiver/detector lines and evaluate information continuously. From the processors and buffers, the signals may be transferred to external equipment such as computers, videotape recorders and players, etc. And/or they may be transferred to one or more internal digital recorders that receive and store in memory the recorded information and have connections to one or more remote sites for further transmission of the recorded information. The apparatus has means for external communication and an automatic dialer and can contact remote sites and transfer stored information as required in a predetermined fashion or fashions. The apparatus has a clock for determining and recording time as required. It has a read only memory for recording permanent operating instructions and other information and a programmable random access memory controller ("PRAM controller") that permits revision of operating patterns and instructions. The PRAM controller may be connected to all internal operating units for full flexibility of operations.

Signal processing apparatus that are employed in specific situations that require fewer functions than those provided by the basic apparatus described above may omit one or more of the specific operating elements described above.

BRIEF DESCRIPTION OF THE DRAWINGS

FIG. 1 is a block diagram of one embodiment of signal processing apparatus.

FIG. 2B is a block diagram of a radio signal decoder apparatus.

FIG. 2C is a block diagram of an other signal decoder apparatus.

FIGS. 3A 3B and 3C are a block diagram of signal processing apparatus and methods as they might be used in an intermediate transmission facility, in this case a cable system head end.

FIG. 4D is a block diagram of a signal processor and a multiple decrypter/interrupters in series, with signals input both before and after programing decryption.

FIG. 4E is a block diagram of a signal processor and multiple decryptor/interruptors and with signals from one channel needed for decryption of a second channel.

FIG. 6C is a block diagram of signal processor apparatus and methods used to organize the reception of selected information and programing and to co-ordinate multi-media, multi-channel presentations in time.

FIG. 6D is a block diagram of another example of multi-media, multi-channel co-ordination. In this case, the co-ordintation of video and print.

FIG. 6E is a block diagram of signal processing techniques co-ordinated with programing decryptions techniques to facilitate electronic distribution of copyrighted materials while discouraging pirating and unauthorized copying.

FIG. 6H shows the relationship of FIGS. 3A, 3B, and 3C.

FIG. 6J shows the relationship of FIGS. 6F and 6G.

DESCRIPTION OF THE PREFERRED EMBODIMENTS

The Signal Processor Apparatus

Figure 2A:
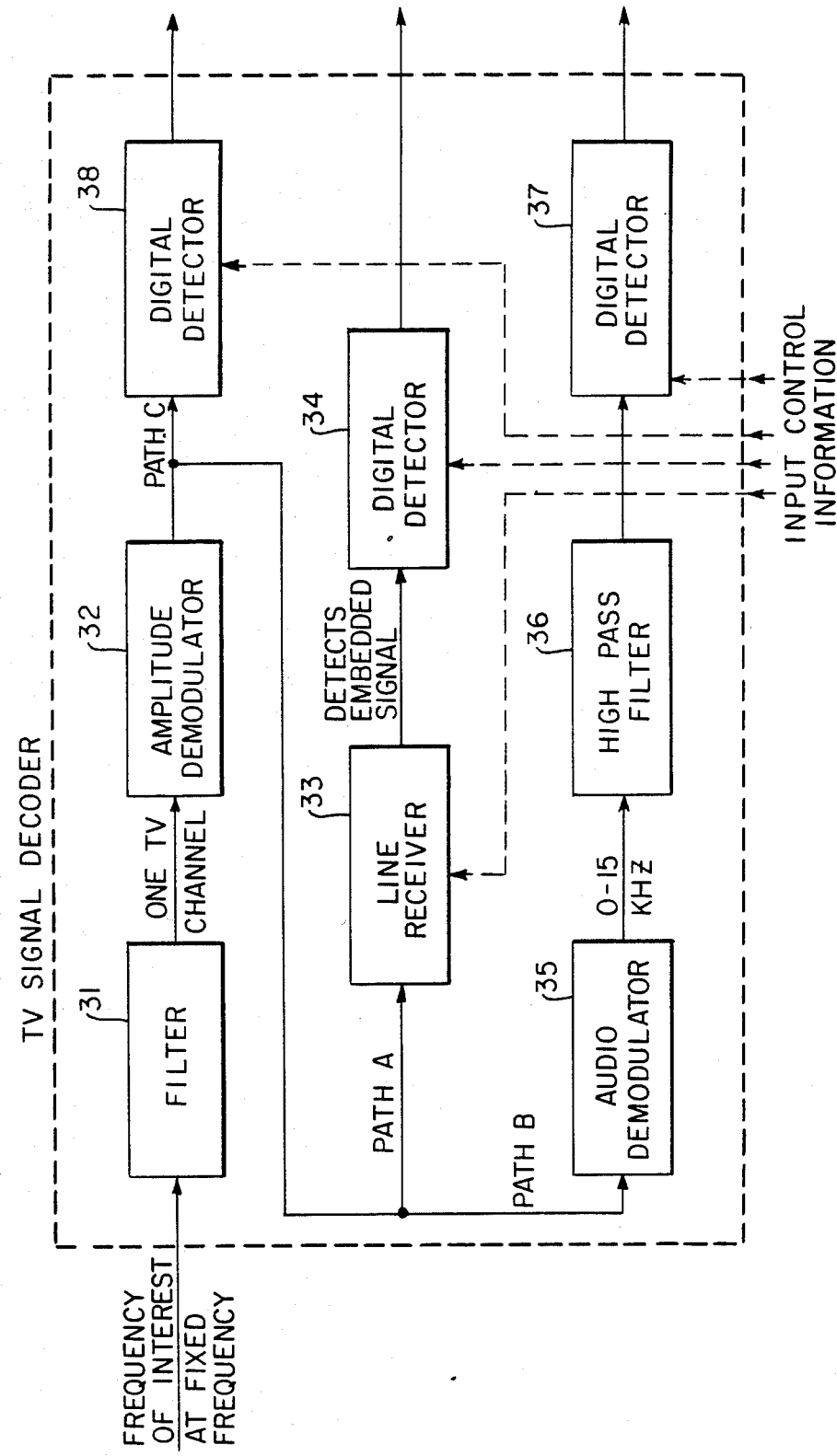
FIG. 2A is a block diagram of a TV signal decoder apparatus.

A signal processor apparatus for simultaneous use with a cablecast input that conveys both television and radio programing and a broadcast television input is shown in FIG. 1. As shown, the input signals are the entire range of frequencies or channels transmitted on the cable and the entire range of broadcast television transmissions available to a local television antenna of conventional design. The cable transmission is input simultaneously to switch 1 and mixer 2. The broadcast transmission is input to switch 1. Switch 1 and mixers 2 and 3 are all controlled by local oscillator and switch control 6. The oscillator, 6, is controlled to provide a number of discrete specified frequencies for the particular radio and television channels required. The switch, 1, acts to select the broadcast input or the cablecast input and passes transmissions to mixer 3 which, with the controlled oscillator, 6, acts to select a television frequency of interest that is passed at a fixed frequency to a TV signal decoder, 30.

Decoder 30 is shown more fully in FIG. 2A. In the decoder, 30, the frequency passes first through filter 31 which defines the particular channel of interest to be analyzed. The television channel signal is then transmitted to a standard amplitude demodulator, 32, which uses standard demodulator techniques well known in the art to define the television base band signal. This base band signal is then transmitted through separate paths to three separate detector devices. These separate detectors are designed to act on the particular frequency ranges in which the encoded information may be found. The first path, designated A, inputs to a standard line receiver, 33, well known in the art. This line receiver, 33, detects the existance of an embedded signal or signals in one or more of the lines normally used to define a television picture. It receives and detects only that portion or portions of the overall video transmission and passes this line portion or portions to a digital detector, 34, which acts to decode the encoded signal information in the line portion or portions. The base band signal is also inputted through path B to an audio demodulator, 35, which further inputs a high pass filter, 36, and a digital detector, 37. The digital detector, 37, through standard detection techniques well known in the art, determines whether a particular signal is present in the transmission in a predetermined fashion. Path C inputs the separately defined transmission to a digital detector, 38. Detectors, 34, 37, and 38, line receiver, 33, and high pass filter, 36, all operate in predetermined fashions which fashions may be changed by external controller, 20 (referring to FIG. 1), to be described below.

If one returns to FIG. 1, one sees that the three separate lines of information outputted from TV signal decoder, 30, are then gated to a buffer/comparator, 8, which also receives other inputs from the other separate receivers comprising similar filters, demodulators, and decoders for other channels of interest.

One such other path is that from mixer 2. Mixer 2 and the controlled oscillator, 6, act to select a radio frequency of interest which is inputted to a radio signal decoder, 40, shown in FIG. 2B. The frequency passes first through standard radio receiver circuitry, 41, well known in the art, a radio decoder, 42, and a standard digital detector, 43. All operate in predetermined fashions that may be changed by external controller, 20 (referring to FIG. 1). As FIG. 1 shows, the radio signal detector outputs to buffer/comparator 8.

(The signal processor apparatus described here is configured to receive broadcast TV transmissions and cablecast TV and radio transmissions. Were it desirable to process signals in other transmissions such as broadcast microwave transmissions or cablecast transmissions on other than standard TV and radio frequencies, the mixers and switches would be appropriately reconfigured and one or more other signal decoders as described in FIG. 2C would be added. As FIG. 2C shows, the desired frequencies would pass through appropriate other receiver circuitry, 45, well known in the art, and an appropriate digital detector, 46, before being outputted to buffer/comparator 8. These, too, can be controlled by controller, 20 (referring to FIG. 1).)

Buffer/comparator, 8, organizes the data stream that it receives according to a pre-determined fashion that enables buffer/comparator, 8, among other things, to assemble signal units from signal words. In a pre-determined fashion, buffer/comparator, 8, identifies signal words and/or signal units that must be decrypted, either in whole or in part, and passes identified signal words and/or units to decrypter, 10. Decrypter, 10, uses conventional decrypter techniques, well known in the art, in a pre-determined fashion to decrypt such signals as required. Decrypter, 10, then passes the decrypted signals to processor or monitor, 12. Buffer/comparator, 8, passes signal words and units not identified as requiring decryption directly to processor or monitor, 12.

Processor or monitor, 12, analyzes, in a pre determined fashion, the signal words and units that it receives and determines whether they are to be passed to external equipment or to buffer/comparator, 14, for further processing or both. If a signal or signals are to be passed externally, processor unit, 12, identifies, in a pre-determined fashion, the external equipment to which the signal or signals are addressed and passes them to appropriate jack ports for external transmission. If they are to be processed further, processor or monitor, 12, passes them to buffer/comparator, 14. Processor or monitor, 12, communicates with clock, 18, and has means to delay the transfer of signals, in a predetermined fashion, when delayed transfer is determined, in a predetermined fashion, to be required.

Buffer/comparator, 14, has means for identifying, according to a predetermined fashion, which signals are to be recorded. To avoid overloading digital recorder, 16, with duplicate data, buffer/comparator, 14, has means for counting and discarding duplicate signals. Buffer/comparator, 14, is connected to clock, 18, and has means for adding information such as time of receipt, for example, to signals. Upon determining in a pre-determined fashion that a signal word or unit should be passed, buffer/comparator, 14, transmits the combined information to a digital recorder, 16. Buffer/comparator, 14, also has means for determining, in a predetermined fashion, when signals require transfer immediately to a remote site and for communicating such a requirement to controller, 20, and such signals directly with the remote site via telephone connection, 22.

Digital recorder, 16, may be a memory storage element of standard design. It has means for determining in a predetermined fashion how full it is and passing this information to controller, 20. The pre determined fashion may include provisions whereby recorder, 16, informs controller, 20, automatically when it reaches a certain level of fullness.

The signal processor apparatus also has a controller device which includes programable random access memory controller 20, read only memory 21 that may contain a unique digital code capable of identifying the signal processing apparatus uniquely, an automatic dialing device 24, and a telephone unit, 22. The controller, 20, governs the operation of all operating elements of the apparatus. The controller, 20, inputs the local oscillator, 6, a sequential pattern to select the various channels to be received by switch, 1, and mixers, 2 and 3. This then allows the channels to be diverted to the detectors, receivers, and decoders in any predetermined pattern desired. The controller, 20, can instruct signal decoders, 30 and 40, when, where, and how to look for signal words, which allows signal words to be received in any pattern or patterns. It can instruct buffer/comparator, 8, how to assemble signal words into signal units and join units together for further transfer and how to determine which signals to pass to decrypter, 10. It can tell decrypter, 10, when and how to change decryption patterns, fashions, and techniques. It can tell processor or monitor, 12, how to determine which signals to pass externally and when and where and how to determine which signals to pass to buffer/comparator, 14. It can tell buffer/comparator, 14, what and how to count, what and how to mark signals, and what-received signals to discard. The controller, 20, also inputs the digital recorder, 16, to direct it to output the information from the memory of the recorder, 16, to telephone connection, 22, and thence to the collection site at the remote geographical location. The controller, 20, also controls the automatic telephone dialing device, 24, to allow the apparatus to automatically output its own information in accordance with a predetermined sequence and to change telephone numbers dialed as required.

To facilitate the operation of the device, the controller, 20, can receive information from all operating elements of the apparatus. Control signals can be passed to the apparatus by means of the programing transmissions input at switch, 1, and mixer, 2. An example of such a control signal is an instruction for the apparatus to contact a remote telephone unit. The processor unit, 12, has the capacity to identify instruction signals for controller, 20, and pass them to controller, 20, over control information lines. Buffer/comparator, 14, has the capacity to pass received time signals to the controller, 20, in a predetermined fashion set by and changeable by controller, 20. Buffer/comparator, 8, and monitor or processor, 12, each have the capacity to inform controller, 20, when signals that they are instructed to look for in predetermined fashions, set by and changeable by controller, 20, fail to appear. Oscillator, 6, the controller, 20, and buffer/comparator, 8, can interact in such a fashion that buffer, 8, can identify the channel that any given signal is received on and mark the signal for subsequent identification of the channel. Digital recorder, 16, can tell the controller, 20, when it reaches predetermined levels of fullness to permit the controller, 20, to instruct auto dialer, 24, to contact an appropriate remote site allowing the recorder, 16, to output its data making memory available. In normal operation, controller, 20, may be instructed by the remote site to erase recorder, 16, which instruction controller, 20, effects through communication with recorder, 16; however, controller may ignore such an instruction in a predetermined fashion, if the information in recorder, 16, is to be conveyed to more than one remote sites.

The controller, 20, can shut off any element or elements of the apparatus in whole or in part. It is interactive with external sources via telephone connection, 22, and can be reprogramed from such remote sources. It follows standard password protection techniques well known in the art.

Operation of Signal Processor Apparatus

The simplest forms of signal processor apparatus are each of the five paths described in FIGS. 2A, 2B, and 2C. Each path, by itself, is capable of identifying signals in the portions of programing transmissions that each receives. A digital signal is embedded by conventional generating and encoding means and transmitted in a television, radio or other transmission. Each path is capable of receiving a transmission or a portion of a transmission and detecting digital signals in that portion and transmitting said signals to in-line equipment for further processing. Each of the paths described in FIGS. 2A, 2B, and 2C can identify and process only signals embedded in the particular transmission channel inputted to said paths.

The signal processor apparatus described in FIG. 1 can identify such signals in multiple and variable locations in multiple and variable modes, channels, and transmissions. Such signals may be transmitted over and over continuously in such transmissions or they may be transmitted over and over only for predetermined time intervals. The controller, 20, is programed to sequence the local oscillator, 6, to select each desired frequency for a specific time interval in accordance with a predetermined pattern. This pattern may be selected in accordance with standard broadcast and cablecast practices known to exist on that transmission line or frequency. The local oscillator, being thus sequenced, will allow each signal decoder, 30 and 40, to receive a particular frequency at a particular time interval. This will define the timing of the composite outputs of the digital detectors, 34, 37, and 38 in FIG. 2A, and 43 in FIG. 2B. The same controller will control buffer/comparator, 8, to discard received duplicate and partial signals, to mark signals with correct channel identifiers, to transfer signals to decrypter, 10, and processor or monitor, 12, as required, and to perform such other functions as buffer/comparator, 8, performs. The controller, 20, instructs decrypter, 10, what to decrypt and in what fashion. It instructs processor or monitor, 12, how to identify what signals to pass externally and where to pass them and what signals to transfer to buffer/comparator, 14. The controller, 20, instructs buffer/comparator, 14, what signals to discard and how to mark signals and assemble signal strings. The controller activates digital recorder, 16, thus defining the location in memory of each of the signals and signal strings. The controller, 20, also controls the automatic telephone dialing device, 24, which can automatically output the digital information on the digital recorder, 12, to a remote site through a telephone connection, 22. The controller, 20, can also set the proper time into clock, 18, should this step be necessary. The controller, 20, operates in a predetermined fashion that can be altered by external means communicating by means of the telephone connection, 22.

Method of Use at an Intermediate Transmission Point

The signal processing apparatus outlined in FIGS. 1, 2A, 2B, and 2C, and their variants as appropriate, can be used to automate the operations of an intermediate transmission point whether it be a broadcast station transmitting only a single channel of programing or a cable system cablecasting many channels. They can be used in a facility transmitting television programing, radio programing, and making other electronic transmissions.

FIGS. 3A, 3B and 3C illustrates one instance of such use. FIGS. 3A, 3B and 3C illustrate the use of Signal Processing Apparatus and Methods at a cable television system "head end" transmission facility that cablecasts several channels of television programing. The means for and method of transmission of programing described here is well known in the art. The facility receives programing from many sources. Transmissions may be received from satellites by satellite antenna, 50, low noise amplifiers, 51 and 52, and TV receivers, 53, 54, 55, and 56. Microwave transmissions can be received by microwave antenna, 57, and television video and audio receivers, 58 and 59. Conventional TV broadcast transmissions can be received by antenna, 60, and TV demodulator, 61. Other electronic programing input means, 62, can receive programing transmissions. All of these received transmissions feed into the facility by hard-wire and connect, by means of conventional switches (here matrix switch, 75), to one or more video recorder/players, 76 and 78, and/or to equipment that outputs them over various channels to the cable system's field distribution system, 93, which equipment includes here cable channel modulators, 83, 87, and 91, and channel combining and multiplexing system, 92. Programing can also be manually delivered to the facility on prerecorded video tapes and videodiscs. When played on video recorder and players, 76 and 78, or other similar equipment well known in the art, such prerecorded programing can be transmitted to the field.

In the present art, the identification of incoming programing, however received; the operation of video player and recorder equipment, 76 and 78; and the maintenance of records of programing transmissions are all largely manual operations.

FIGS. 3A, 3B and 3C show the introduction of signal processing apparatus and methods to automate these and other operations.

Incoming programing transmissions are received at the relevant receiver points, antennas, 50, 57, and 60, and other means, 62. They are fed along the conventional paths described above. At distribution amplifiers, 63 through 70, each incoming feed is split into two paths. One is the conventional path whereby programing has flowed and continues to flow to recording devices, 76 and 78, and/or to flow to field distribution system, 93. The other path flows from each distribution amplifier, 63 through 70, individually to signal processor, 71. Signal processor, 71, has means, described above, to identify and separate the instruction and information signals from their associated programing and pass them, along with information identifying the channel source of each signal, externally to code reader, 72. Signal processor, 71, also has means to record said signals and transfer them to external communications network, 97. It also has means to record and transfer simultaneously.

Code reader, 72, passes the received signals, with channel identifiers, to cable program controller and computer, 73.

Cable program controller and computer, 73, is the central automatic control unit for the transmission facility.

The controller/computer, 73, has means for receiving input information from local input, 74, and from remote sources via telephone or other data transfer network, 98. Such input information might include the cable television system's complete programing schedule, with each discrete unit of programing identified with a unique program code (which in the case of advertising might be a purchase order number). Such input information might also indicate when and where the cable head end facility should expect to receive the programing. Such input information might also indicate when and on which channel or channels the head end facility should transmit each program unit to cable field distribution system, 93.

By means of the signals, with channel indicators, received from code reader, 72, controller/computer, 73, can determine what specific programing and programing unit has been received by each receiver, 53 through 62, and is passing in line on each individual wire to matrix switch, 75.

By comparing identification signals on the incoming programing with the programing schedule received earlier from local input, 74, and/or from a remote site via network, 98, controller/computer, 73, can determine when and on what channel or channels the head end facility should transmit the programing.

Controller/computer, 73, has means for communicating control information with matrix switch, 75, and video recorder/players, 76 and 78. If incoming programing is meant for immediate transmission, controller/computer, 73, instructs matrix switch, 75, to configure its switches so as to transfer incoming programing to the proper output channel. For example, if controller/computer, 73, determines that programing incoming via receiver, 53, should be transmitted immediately to the field distribution system, 93, via cable channel modulator, 87, controller/computer, 73, instructs matrix switch, 75, to configure its switches so as to transfer programing transmissions inputted from TV receiver, 53, to the output that leads to modulator, 87. Similarly, if controller/computer, 73, determines that incoming programing should be recorded for delayed transmission, controller/computer, 73, selects a video recorder/player, 76 or 78, in a predetermined fashion, to record the incoming programing, instructs matrix switch, 75, to transfer the programing to the designated recorder/player, 76 or 78, and instructs the recorder/player, 76 or 78, to turn on and record the programing.

Recorder/players, 76 and 78, can communicate programing with each other through matrix switch, 75. If controller/computer, 73, determines at any time that it is necessary to reorganize the order in which programing units are stored on either recorder/player or on both, controller/computer, 73, can use techniques for reorganizing files stored on multidisk units, which techniques are well known to computer operators, and order the execution of such techniques by passing appropriate instructions to of matrix switch, 75, and recorder/ players, 76 and 78. Were this head end facility equiped with automatic operating equipment well known in television studios, controller/computer, 73, could pass appropriate operating instructions to such equipment.

Controller/computer, 73, monitors the operation of the head end facility by means of TV signal decoders, 77, 79, 80, 84, and 88, each of which are shown in detail in FIG. 2A. Controller/computer, 73, has means to communicate control information with each decoder, 77, 79, 80, 84, and 88, to tell each how to operate and how and where to look for signals and to communicate other information. (This particular embodiment could be expanded to include a decrypter, such as decrypter 10 in FIG. 1, in signals-only line between each decoder, 77, 79, 80, 84, and 88, and controller/computer, 73.) Decoders, 80, 84, and 88, inform controller/computer, 73, what programing is passing on each cable channel and what signals the programing contains. Decoders, 77 and 79, inform controller/computer, 73, what specific programing is loaded on recorder/players, 76 and 78 respectively, and what signals it contains. (Among other signals, a program unit could contain signals that would inform controller/computer, 73, of the distance to the beginning and end of the program unit which signals would facilitate operation of recorder/players such as 76 and 78.)

The cable head end facility also contains signal strippers, 81, 85, and 89, of which models exist well known in the art, that controller/computer, 73, can instruct to remove signals from programing as required, and signal generators, 82, 86, and 90, also well known in the art, that controller/computer, 73, can instruct to add signals to programing as required. At each point, 81, 85, and 89, there may be single or multiple strippers. At each point, 82, 86, and 90, there may be single or multiple generators.

Beyond channel combining system and multiplexer, 92, amplifier, 94, transmits programing to signal processor, 71, and signal processor, 96, which permits both apparatus to monitor and record all the programing transmitted by the cable television system head end facility to field distribution system, 93. Such records can provide automatically for each channel the information that the Federal Communications Commission requires broadcast station operators to maintain as station logs. Signal processors, 71 and 96, can transmit such records of programing to remote sites via telephone or other data transfer networks, 97 and 99 respectively.

This particular embodiment describes a transmission facility transmitting only television programing. The facility could also process and transmit radio programing and other electronic data according to the methods described here by adding radio decoder paths and other signal decoder paths, as shown in FIGS. 2B and 2C respectively, to signal processors, 71 and 96, and decoders, 77, 79, 80, 84, and 88. Likewise, these methods are also applicable in a facility that transmits only a single channel of radio or television programing.

Methods for Governing the Reception of Programing

FIGS. 4A through 4E illustrate methods for governing the reception of programing and the use of signal processor apparatus in these methods. All of these methods involve the use of one or more devices, of which various models exist well known in the art, for the decryption of programing transmissions and/or one or more other means for interrupting programing transmissions, also well known in the art, which may be as simple as a switch and which may have means to interrupt programing by generating noise which noise may be an overlay of another audio and/or video transmission.

Figure 4A:
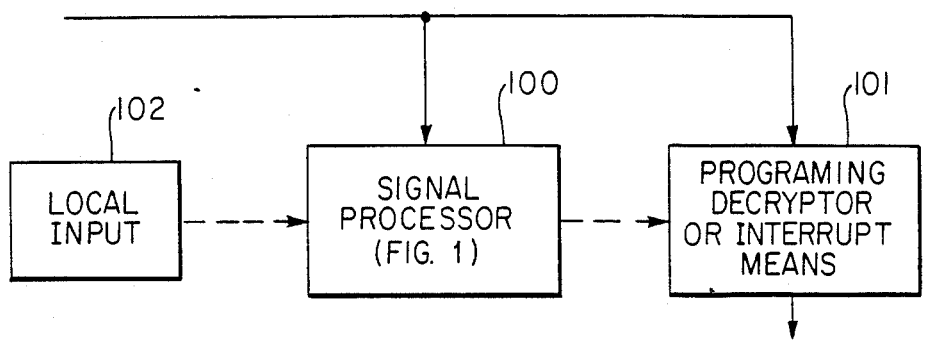
FIG. 4A is a block diagram of a signal processor and a programing decryptor or other interrupt means with signals input to the signal processor before programing decryption. Also included is a local input.

FIG. 4A shows a signal processor, 100, and a programing decrypter and/or interrupt means, 101, each of which receives the same transmission of programing. The devices, 100 and 101, may receive one channel of programing or multiple channels. The signals that enable the decrypter/interrupter, 101, to decrypt and/or transfer programing uninterrupted may be embedded in the programing or may be elsewhere. Signal processor, 100, identifies, evaluates, possibly decrypts, and passes a signal or signals to decrypter/interrupter, 101, either at the time of receipt of such programing or at a delayed time or a combination. The signal or signals instruct decrypter/interrupter, 101, to decrypt the transmission or not to decrypt the transmission or to interrupt the transmission or not to interrupt the transmission. The signal or signals may also inform decrypter/interrupter, 101, how to decrypt or interrupt the programing if decrypter/interrupter, 101, is capable of multiple means. The signal or signals may transmit a code or codes necessary for the decryption of the transmission.

FIG. 4A also shows local input, 102, with means for generating and transmitting signals to signal processor, 100. Local input, 102, is intended to permit a person at a local receiving site that is prevented, by any means, from receiving programing to instruct signal processor, 100, that the site wants to be enabled to receive the programing. Local input, 102, may also serve other purposes. Local input, 102, may convey a continuous signal or an occassional signal or a one-time-only signal. It may be activated by one or more switches or buttons or combinations. It may be a computer acting in a predetermined fashion. The signal may be input to signal processor, 100, as described in FIG. 1, at buffer/comparator, 8, or signal processor or monitor, 12, or buffer/comparator, 14.

In the preferred embodiment, local input, 102, inputs a one-time signal to signal processor, 100, at buffer/comparator, 8, and transmits information in a digital code signal which information is input to local input, 102, in an alphanumeric form manually by means of buttons.

Figure 4B:
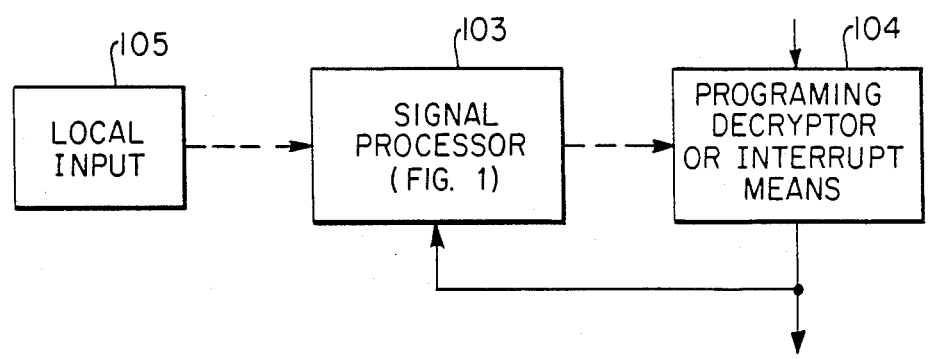
FIG. 4B is a block diagram of a signal processor and a decryptor/interruptor with signals input to the signal processor in programing after programing decryption.
Figure 4C:
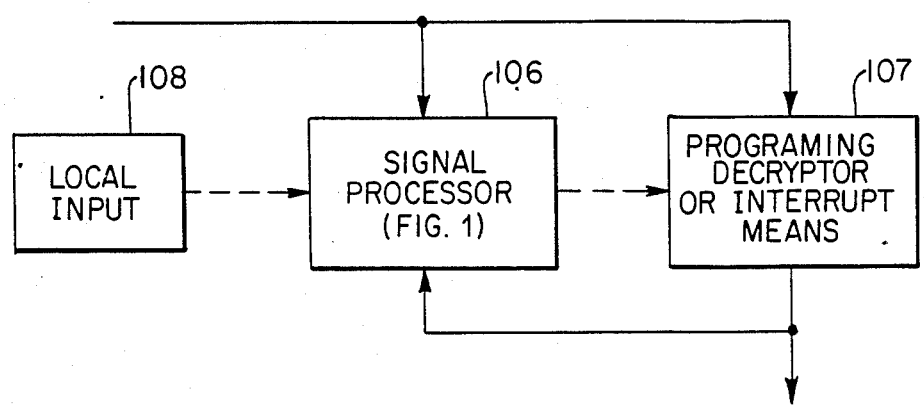
FIG. 4C is a block diagram of a signal processor and a decryptor/interruptor with signals input both before and after programing decryption.

FIGS. 4B and 4C illustrate various alternative ways that signals may be input to the signal processor, 100, 103, or 106 as applicable. The fundamental point is that signals may be received in a manner that requires decryption and/or transmission by a decryptor/interruptor, 104, before they reach the signal processor, as with signal processor 103 in FIG. 4B, or they may not, as with signal processor 100 in FIG. 4A, or some combination, as with signal processor 106 in FIG. 4C.

However, FIGS. 4A, 4B, and 4C do not fully illustrate this point because these figures do not reveal that the question of the need for decryption prior to reaching the signal processor depends, among other things, on where the signal or signals are placed in the incoming transmission. A decrypter does not necessarily decrypt the entire transmission. Encrypted transmissions may be only partially encrypted. For example, only the video portion of the transmission may be encrypted. The audio portion may remain unencrypted. In such a circumstance, a connection such as that shown in FIG. 4B could pass unencrypted signals to signal processor 103, while passing a transmission unsuitable for satisfactory viewing, if the signals were placed in the audio portion of the overall transmission.

FIG. 4C illustrates a configuration that permits a method that provides a signal or signals to signal processor, 106, prior to decryption which signal or signals enables decryptor/interruptor, 107, to decrypt and/or pass programing transmissions it receives then signal processor, 106, searches in a predetermined fashion for a second signal or set of signals in the decrypted output of decryptor/interruptor, 107. If this second signal or set of signals fails to appear in the form or forms and place or places and time or times that signal processor, 106, expects, signal processor, 106, can respond in a predetermined fashion and generate and record in digital recorder, 16 (referring to FIG. 1), information that reports this fact in a predetermined fashion and/or transfer this information immediately to a remote site by telephone means and/or generate and transmit to decryptor/interruptor, 107, instructions that disable decryptor/interruptor, 107.

FIG. 4D shows that a multi-stage decryption/interruption process may be used in which transmissions must be processed by one or more additional decryptor/interruptors, 111, that follow decryptor/interruptor, 110.

FIG. 4E illustrates that the signal processor, 112, can monitor multiple channels and pass instructions to multiple decryptor/interruptors, each of which processes fewer channels than the multiple channels processed by signal processor, 112. FIG. 4E illustrates how signals transmitted on one channel can govern the decryption and/or transfer of another channel. Signal processor, 112, receives, evaluates, and processes a multiple channel transmission from cable transmission facility, 113. Cable converter box, 114, of which many types are now available, with means for informing signal processor, 112, which channel of programing it is transferring, receives the same multi-channel transmission and transfers one channel to decryptor/interruptor, 115. The signal or signals necessary for the decryption of the channel that box, 114, passes to decryptor/interruptor, 115, in this case, is not located in the channel transmission. They may be preprogramed into the signal processor (for example, in programable randon access memory controller, 20, in FIG. 1) or they may be transmitted in a channel other than the channel being transferred from box, 114. If signal processor, 112, has been programed with the signal or signals or if it has been informed of the predetermined fashion for identifying and processing the the needed signal or signals in the incoming transmission from facility, 113, for example, where to look for the signals and when and how, signal processor, 112, can transfer the signal to decryptor/interruptor, 115. The tuner, 119, informs signal processor, 112, what channel box, 114, is switched to whenever box, 114, is switched or turned on. Signal processor, 112, receives this information probably at buffer/comparator, 8 (referring to FIG. 1), which signal processor, 112, processes the signal from tuner, 119, in a predetermined fashion that causes the signal or signals that relate to the necessary proper operation of decryptor/interruptor, 115. If signal processor, 112, can identify, processes, and transfer the needed signal or signals, decryptor/interruptor, 115, can decrypt and/or transfer the incoming transmission from box, 114, satisfactorily. If signal processor, 112, cannot transfer the needed signal or signals, decryptor/interruptor, 115, cannot decrypt and/or transfer the programing transmission satisfactorily.

FIG. 4E also illustrates how it may be necessary to decrypt a programing transmission on one channel in order to identify and process correctly the programing transmitted on another. In FIG. 4E, the signal or signals needed to operate decryptor/interruptor, 115, correctly may be on a separate channel of programing that is, itself, encrypted in transmission. Signal processor, 112, can transfer the correct signal or signals only if cable converter box, 117, is tuned to the proper channel and decryptor/interruptor, 118, can transfer a correctly decrypted transmission to signal processor, 112, for processing.

In any of the cases illustrated in FIGS. 4A through 4E, signal processors, 100, 103, 106, 109, and 112, could also operate in a predetermined fashion and telephone a remote site to get an additional signal or signals necessary for the proper decryption and/or transfer of incoming programing transmissions.

Methods for Monitoring Reception and Operation

Figure 5:
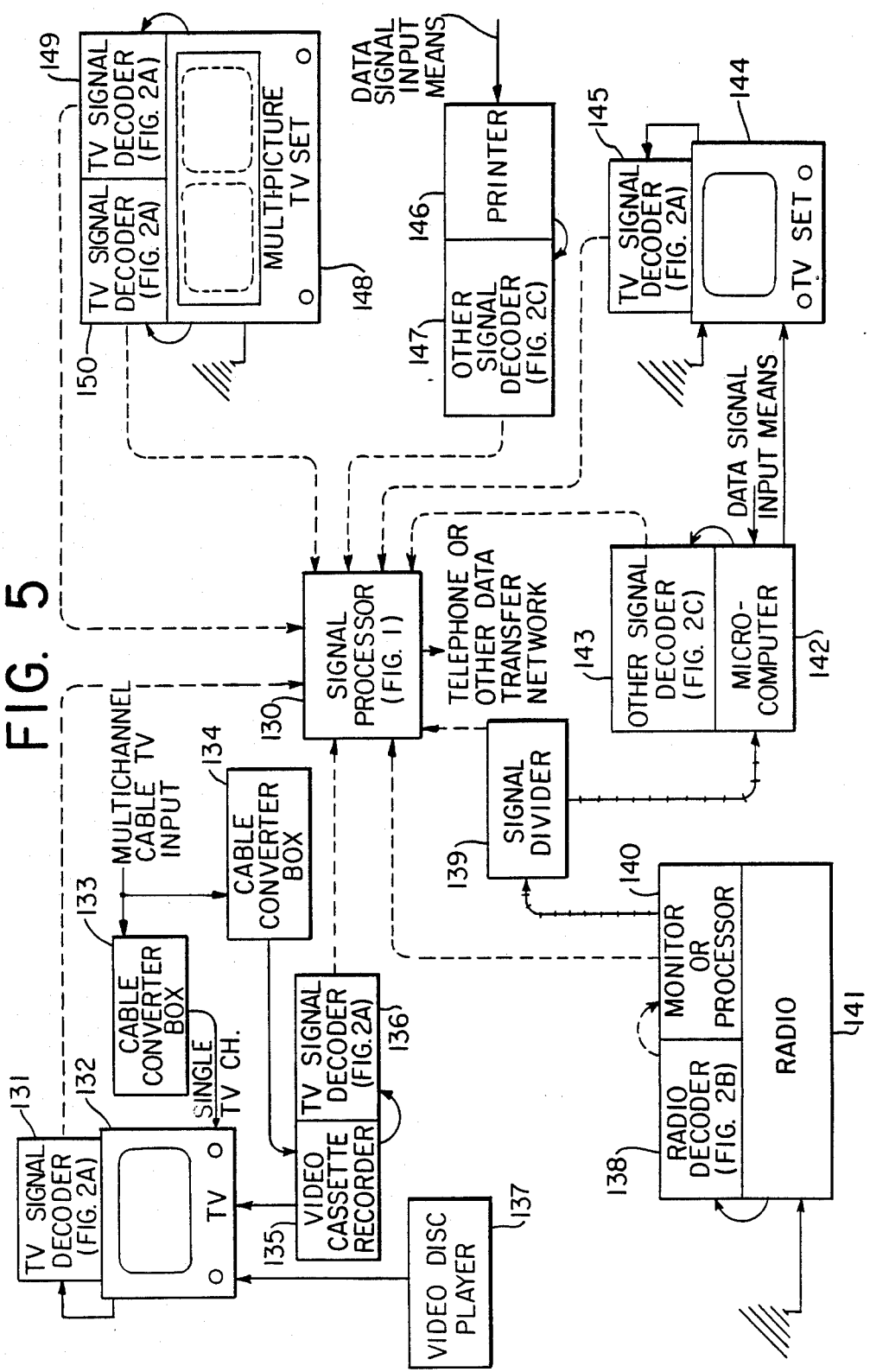
FIG. 5 is a block diagram of signal processor apparatus monitoring various programing and viewership patterns.

FIG. 5 illustrates methods for monitoring reception and operation which methods can be used to gather statistics on programing usage and associated uses of other data transmissions and equipment. Such statistics are necessary, for example, in the development of television program ratings.

FIG. 5 shows two conventional TV sets, 132 and 144, a conventional video cassette recorder, 135, a conventional videodisc player, 137, a conventional radio, 141, a conventional microcomputer, 142, a conventional data printer, 146, and a television set, 148, that is capable of displaying two different television programing transmissions at once. This is only a representative group of equipment. Many other types of television and radio players and recorders could be included in FIG. 5.

Except for the videodisc player which neither records nor displays programing or other data, each unit has an appropriate associated signal decoder. Each decoder is likely to be located physically inside its associated player/recorder unit. Each is located at a point in the associated unit's circuitry where it receives every embedded signal on the programing channel or data channel to which the unit is tuned for which signal the decoder is programed in a predetermined fashion to search.

If a unit like the microcomputer can receive transmissions from more than one source or of more than one kind—television, radio, or other—it will have sufficient apparatus to monitor every channel and kind of transmission it can receive.

The signals for which the decoders are monitoring are likely to be unique digital codes that may identify each programing or data unit received and the source of each. They may identify networks, broadcast stations, channels on cable systems, and possibly times of transmission. They may convey unique identifier codes for each program or commercial. In the case of data transmitted to the microcomputer, they may be unique codes that identify the source and suppliers of the data. In the case of data received at the printer, they may identify publications, articles, publishers, distributors, advertisements, etc. The decoders, 131, 136, 138, 143, 145, 147, 149, and 150, may search for many types of codes, and the types described here provide only examples.

In FIG. 5, each decoder receives every relevant signal received by its associated player or recorder unit. For example, TV set, 131, may receive programing from many sources including cable converter box, 133, video cassette recorder, 135, and videodisc player, 137. In every programing unit played on TV set, 132, TV decoder, 131, receives every signal for which it is instructed to search in a predetermined fashion and transfers the signals to signal processor, 130, which has means to identify the source decoder from which each signal that it receives comes. On all programing recorded by video cassette recorder, 135, decoder, 136, receives every relevant signal and transfers such signals to signal processor 130. Radio signal decoder, 138, operates similarly for radio, 141. Other signal decoder, 143, for microcomputer 142. TV signal decoder, 145, for TV set, 144 (which may receive programing inputs and associated signals generated or transferred by microcomputer, 142). Other signal decoder, 147, for printer 146. And TV signal decoders, 150 and 149, for each channel of programing received and displayed by multi-picture TV set, 148.

One particular advantage of these methods for monitoring programing is that, by locating the identifier signals in the audio and/or video and/or other parts of the programing that are conventionally recorded by, for example, conventional video cassette recorders, these methods provide techniques for gathering statistics on what is recorded on video cassette recorders and on how people replay such recordings. For example, a person might instruct video cassette recorder, 135, automatically to record the NBC Network Nightly News as broadcast over station WNBC in New York City. Recorder, 135, might receive the programing over Manhattan Cable TV channel 4 and record the programing from 7:00 PM to 7:30 PM on the evening of July 15, 1985. Each discrete bit of this information could be conveyed to recorder, 135, in a signal unit or units in the programing so received and recorded. Decoder, 136, would identify these signals and transfer them to signal processor, 130. Subsequently, the person might play the recorded programing on TV set, 132, from 10:45 PM to 11:15 PM the same evening. This time, TV signal decoder, 131, identifies the embedded signals and transfers them to signal processor, 131. Prerecorded video cassettes and videodiscs could also contain unique embedded codes that would identify their usage (and could also transfer instructions to other external equipment).

Signal processor, 130, would probably receive these signals from decoders, 131, 136, 138, 143, 145, 147, 149, and 150) at its buffer/comparator unit, 14 (referring to FIG. 1), in a predetermined fashion that would permit signal processor, 130, to identify which decoder the individual signals come from and, in a predetermined fashion, create a signal string by appending digital information to the received signal which information might identify the individual decoder, 131, 136, 138, 143, 145, 147, 149, or 150 and the time of receipt at signal processor, 130. To minimize the use of data recorder, 16, buffer/comparator, 14, may evaluate signals in a predetermined fashion and discard some signals rather than passing them to the recorder, 16. It may compare each signal from a given source such as decoder, 131, with other signals received earlier from the same source. It may only count incoming duplicate signals or it may append a time code to the end of the basic signal string formed around the first received signal and alter this time designation each time a new duplicate signal is identified so that the time code identifies the time of receipt of the last duplicate signal. Whatever method is used, the buffer/comparator, 14, may discard all duplicate signals received. At a time when buffer/comparator, 14, determines in a predetermined fashion that it will receive no further duplicate signals, it transfers the full signal string to recorder, 16.

Signal divider, 139, illustrates another type of monitoring that signal processing apparatus and methods can facilitate. Signal divider, 139, monitors the use of signals rather than the use of programing. Every instruction or information signal transmitted from processor, 140, to microcomputer, 142, is also transmitted to signal processor, 130, to be handled, recorded, and transmitted to a remote site with all other monitor information. In a predetermined fashion, signal processor, 130, identifies and marks the source of signals as coming from a device, 139, monitoring signal usage rather than programing usage and viewership. In this fashion, besides facilitating data gathering on how programing is used, signal processing apparatus and methods also permit the evaluation of how equipment is used.

(For simplicity, FIG. 5 has focused only on methods whereby data is gathered from signal decoders remote from signal processor, 130. FIG. 5 has not included control information connections between signal processor, 130, and the remote decoders which would permit signal decoder, 130, to alter the methods of operation of said remote decoders. Such control information connections are included in signal processing apparatus and methods.)

Methods for Governing or Influencing the Operation of Equipment that is External to Conventional Television and Radio Sets by Passing Instruction and Information Signals that are Embedded in Television and Radio Programing Transmissions to Such External Equipment Signal processor apparatus have the ability to identify instruction and information signals in one or more inputted television and radio programing transmissions, identify and discriminate among one or more pieces of external equipment to which such signals are addressed, and transfer such signals to such equipment as directed. This permits many valuable techniques for facilitating the operation of such external equipment.

Figure 6A:
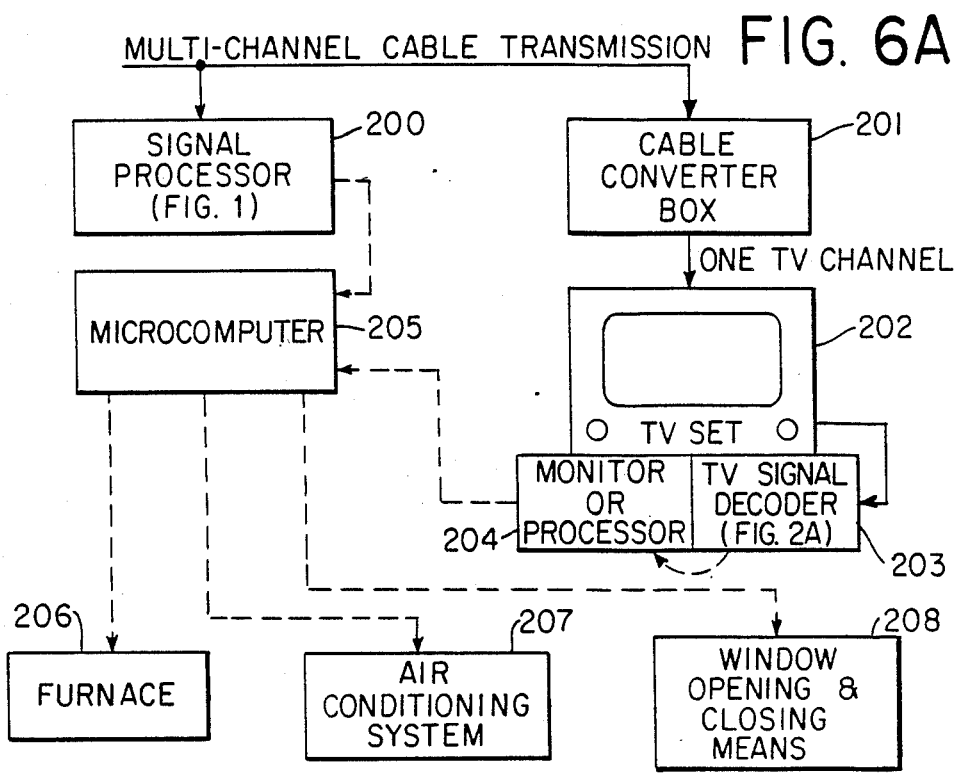
FIG. 6A is a block diagram of signal processor apparatus and methods used to instruct and inform external equipment governing the environment of the local receiver site.
Figure 6B:
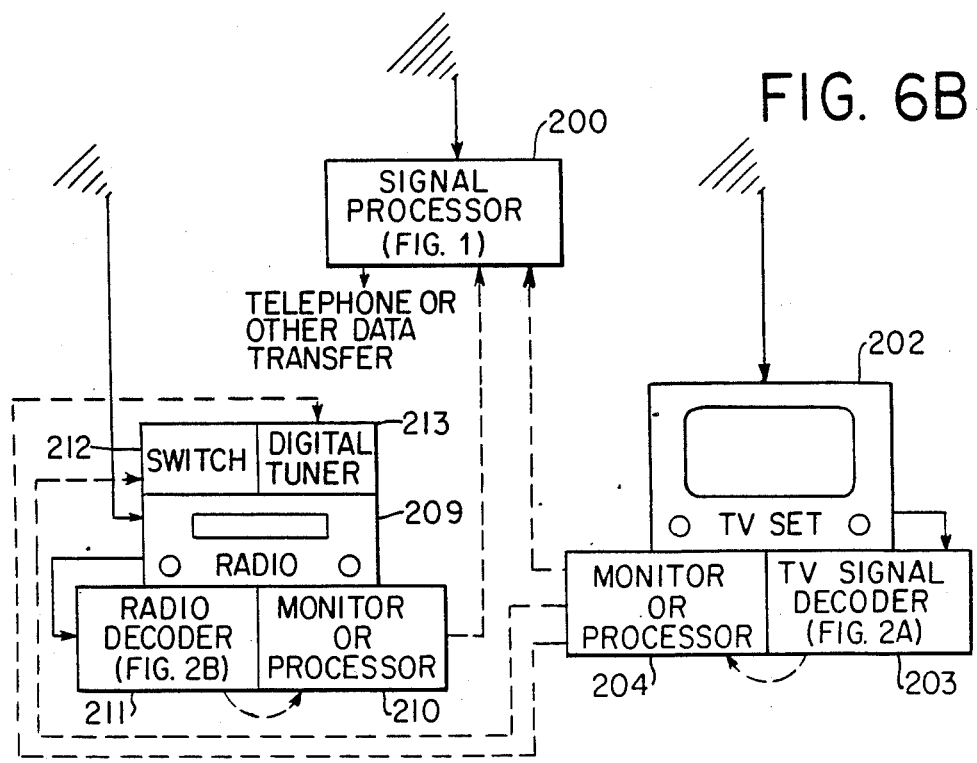
FIG. 6B is a block diagram of signal processor apparatus and methods used to co-ordinate a multi-media, multi-channel presentation and monitor such viewership.
Figure 6F:
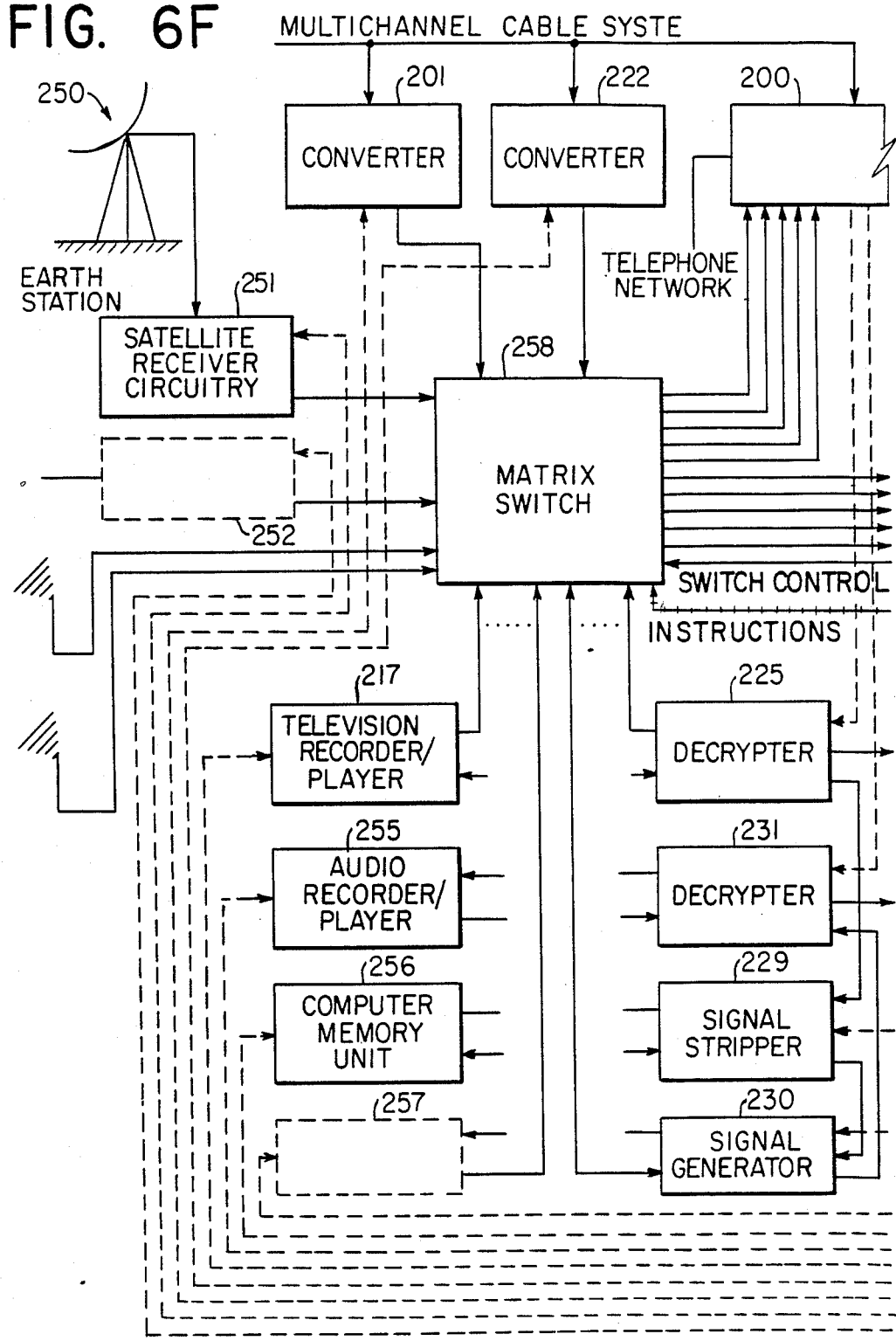
FIGS. 6F and 6G comprise a block diagram of signal processor apparatus and methods as they might be used at a consumer receiver site.
Figure 6G:
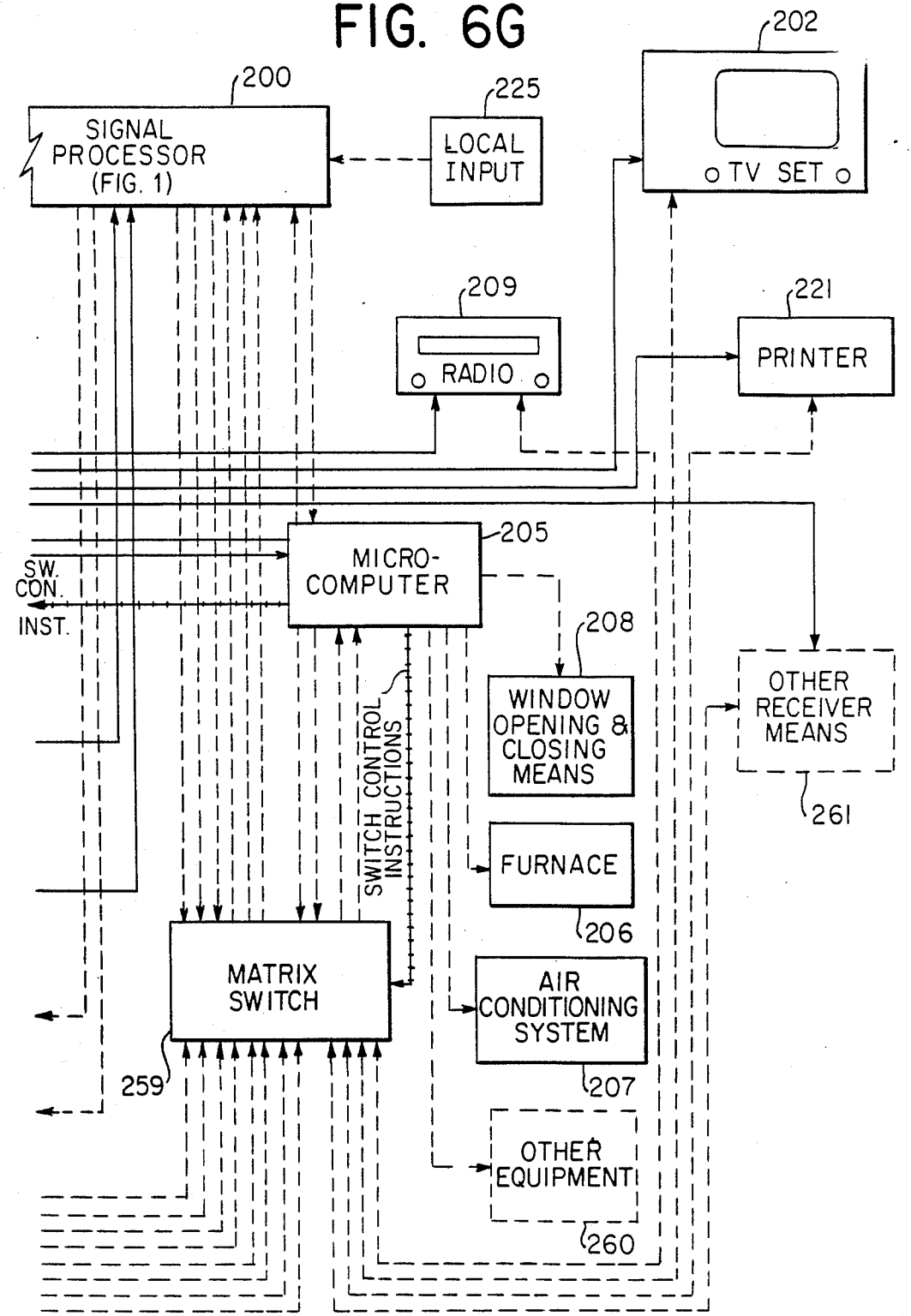

FIGS. 6A and 6B illustrate one possible configuration of equipment in a home or office or other television and/or radio receiving site. Consideration of FIGS. 6F and 6G is facilitated by consideration, first, of individual examples of the types of co-ordinated presentations that the signal apparatus and methods described here can permit.

Governing the Home or Office Environment

FIG. 6A illustrates a method for governing a home or office environment. One or more channels of television programing transmissions inputted to signal processor, 200, and cable converter box, 201, may contain signals intended for microcomputer, 205, which signals convey information on local weather conditions. Such signals might include current outside temperature and baraметric readings. They might include forecast data. Signal processor, 200, is always operating and monitors all incoming channels. It can convey such signals to microcomputer, 205, whenever it receives them. TV signal decoder, 203, can also identify such signals but only in the one TV channel transferred by box, 201, to TV set, 202, and then only when TV set, 202, is on and operating. Decoder, 203, transfers all received signals to processor or monitor, 204, which identifies the signals as addressed to microcomputer, 205, and transfers them to microcomputer, 205. Microcomputer, 205, uses such received signals, in a predetermined fashion, to govern the operation of furnace, 206, air conditioning system, 207, and window opening and closing means, 208.

Co-ordinating a Stereo Simulcast

FIG. 6B illustrates a method for automatic co-ordination of a multimedia presentation in one place, in this case a stereo simulcast. A person decides to watch a program on television that is stereo simulcast on a local radio station, too. The person turns on television, 202, and tunes to the proper channel. TV signal decoder, 203, detects signals in the programing transmission on the channel which signals it transfers to monitor or processor, 204. Monitor or processor, 204, determines that certain signals are addressed to switch, 212, and transfers these signals to switch, 212. These signals instruct switch, 212, to turn power on to radio, 209, and its associated equipment, including a conventional digital tuner, 213. Monitor or processor, 204, also identifies signals addressed to tuner, 213, which it transfers accordingly. These signals instruct tuner, 213, to tune radio, 209, to the proper frequency for the simulcast. Automatically, by turning TV set, 202, to the channel with a stereo simulcast, the person has activated the stereo simulcast.

FIG. 6B also shows signal processor, 200, monitoring for a data gathering and ratings service. TV signal decoder, 203, and radio signal decoder, 211, also identify certain signals that monitors or processors, 204 and 210 respectively, determine to identify the programs, etc. on the channels to which TV set, 202, and radio, 209, are tuned, The processors, 204 and 210, transfer this information to signal processor, 200, for recording and subsequent transmission to a remote data collection site. Simultaneously, processor, 200, is also monitoring sequentially all other broadcast transmissions in the locality to gather further data on programing availability to record and transmit to a remote site.

Receiving Selected Information and/or Programing

FIG. 6C illustrates methods for monitoring multiple programing channels and selecting programing and information in a predetermined fashion. In this example, microprocessor, 205, is programed to hold a portfolio of stocks and to receive news about these particular stocks and about the industries they are in. Several separate news services transmit news on different channels carried on the multi-channel cable transmission to converter boxes, 222 and 201, and to signal processor, 200. The news services preceed each news transmission with a unique signal that uniquely identifies the company or companies to which the news item refers and/or the industries. In a predetermined fashion, microcomputer, 205, instructs signal processor, 200, to hold examples of the sought for unique signals in its buffer/comparator, 8, and compare them with all incoming signals. Signal processor, 200, scans sequentially all channels. When it identifies a signal of interest, it relays that information and the channel identifier, in this illustration, to microcomputer, 205. In a predetermined fashion, either microcomputer, 205, or signal processor, 200, instructs tuner, 223, to set cable converter box, 222, to the proper channel, and microcomputer, 200, may record the information in memory or transfer it to printer, 221, for printing.

In the same fashion, microcomputer, 205, may also instruct signal processor, 200, to monitor single or multiple television channels and/or radio channels for programing of interest to play or record.

In another example, microcomputer, 205 may be preinformed that a certain television program, hypothetically "Wall Street Week," should be televised on TV set, 202, when it is cablecast. Microcomputer, 205, is preinformed of the time of cablecasting. When that time comes, microcomputer, 205, receives no program identification signals whatever from TV signal decoder, 203, which indicates that the set, 202, is not on. Microcomputer, 205, instructs signal processor, 200, to pass all program and channel identifiers on all programing being cablecast on the multi-channel system. Signal processor, 200, receives this instruction from microcomputer, 205, at its processor or monitor, 12, which reacts, in a predetermined fashion by passing also externally to microcomputer, 205, all signals that it passes to buffer/comparator, 14. Analyzing these identifier signals in a predetermined fashion, microcomputer, 205, determines that "Wall Street Week" is being televised on channel X. Then, in a predetermined fashion, microcomputer, 205, may instruct tuner, 214, to switch box, 201, to channel X and may instruct control system, 220, to turn video recorder, 217, on and record "Wall Street Week," and also microcomputer, 205, may instruct switch, 216, to turn TV set, 202, on and tuner, 215, to tune appropriately to "Wall Street Week."

Co-ordinating Multimedia Presentations in Time

FIG. 6C can also illustrate how programing delivered at different times to one place can be co-ordinated to give a multimedia presentation at one time in one place.

Each weekday, microcomputer, 205, receives, about 4:30 PM, by means of a digital information channel, all closing stock prices applicable that day. It may receive these directly or it may automatically query a data service for them in a predetermined fashion. It records those prices that relate to the stocks in its stored portfolio.

Microcomputer, 205, is preprogramed to respond in a predetermined fashion to instruction signals embedded in the "Wall Street Week" programing transmission. When the "Wall Street Week" transmission begins at 8:30 PM on a Friday evening, several instruction signals are identified by decoder, 203, and transferred to microcomputer, 205. These signals instruct microcomputer, 205, to generate several graphic video overlays, which microcomputer, 205, has the means to generate and transmit and TV set, 202, has the means to receive and display, and to transmit these overlays to TV set, 202, upon command. Subsequently in the program, the host says, "Here is what the Dow Jones Industrials did is the past week," and a studio generated graphic is pictured. The host then says, "Here is what the broader NASDAQ index did in the week past," and a studio generated graphic overlay is displayed on top of the first graphic. Then the host says, "And here is what your portfolio did." At this point, an instruction signal is generated in the television studio originating the programing and is transmitted in the programing transmission. This signal is identified by decoder, 203, and transferred via processor, 204, to microcomputer, 205. This signal instructs microcomputer, 205, to transmit the first overlay to TV set, 202, for as long as it receives the same instruction signal from processor, 204. The viewer then sees a microcomputer generated graphic of his own stocks' performance overlay the studio generated graphic. When the two studio generated graphics are no longer displayed, the studio stops sending the instruction signal, and the microcomputer, 205, ceases transmitting its own graphic to TV set, 202, and prepares to send the next locally generated graphic overlay upon instruction from the originating studio.

This is only one of many examples of the co-ordination at one time and in one place of programing and information material delivered at different times.

Co-ordinating Print and Video

FIG. 6D illustrates one method for co-ordinating the presentation of information through the use of print with video. FIG. 6D also illustrates possible uses of a decrypter and a local input.

Suppose a viewer watches a television program on cooking techniques that is received on TV set, 202, via box, 201. Julia Childs's "The French Chef" is one such program. Halfway through the program, the host says, "If you are interested in cooking what we are preparing here and want a printed copy of the recipe for a charge of only 10 cents, press 567 on your Widget Signal Generator and Local Input." The viewer then presses buttons 567 on local input, 225, which signal is conveyed to the buffer/comparator, 8 (referring to FIG. 1), of signal processor, 200, to hold and process further in a predetermined fashion. Five minutes later, a signal is identified in the incoming programing on TV set, 202, by decoder, 203, which is also transferred by processor, 204, to buffer/comparator, 8, of signal processor, 200. This signal instructs buffer/comparator, 8, that, if 567 has been received from signal generator, 225, signal processor, 200, should, in a predetermined fashion, instruct tuner, 223, to tune cable converter box, 222, to the appropriate channel to receive the recipe in encoded digital form and instruct control means, 226, to activate printer, 221. The signal transmission from processor, 204, also passes a signal word to signal processor, 200, which, in a predetermined fashion, signal processor, 200, decrypts and transfers to decrypter, 224, to serve as the code upon which decrypter, 224, will decrypt the incoming encrypted recipe. Then, as part of the predetermined operation, signal processor, 200, conveys to its data recorder, 16, information that the 567 order was placed by the viewer and all necessary equipment was enabled. When the transmission of the recipe is received, box 222, transfers the transmission to decrypter, 224, for decryption and thence to printer, 221, for printing. Other signal decoder, 227, identifies a signal in the transmission received by printer, 221, which it passes via processor, 228, and buffer/comparator, 14, of signal processor, 200, to data recorder, 16. This signal indicates that the recipe, itself, has been received. Subsequently, when signal processor, 200, transfers the data in its data recorder, 16, via telephone to a remote site, that site can determine for billing purposes that the recipe was, first, ordered and, second, delivered.

(An alternate method for transmitting the recipe to printer, 221, would be for the recipe, itself, to be located in encoded digital form in the programing transmission received by TV set, 202. In this case, decoder, 203, would identify the signals conveying the recipe and transfer them via processor, 204, to signal processor, 200, which would decrypt them, itself, and transfer them, via means which in this case it would have, to printer, 221.)

Using Signaling and Decryption Techniques to Control Distribution of Copyrighted Materials FIG. 6E illustrates a signaling and decryption technique which could serve to facilitate the electronic distribution of copyrighted materials such as books and movies by tending to discourage piracy and the unauthorized retransmission of copies, whether they be properly acquired or pirated.

FIG. 6E could be any home or commercial establishment but is described here as a book store. Using conventional laser videodisc equipment and techniques, well known in the art, a publisher has put his full line of books on laser discs in encrypted form and distributed one copy of each disc to each of his authorized book store retail outlets. He has also distributed to each a conventional computer floppy disk for use on conventional microcomputer, 205, that can operate conventional laser videodisc system, 232, in a predetermined fashion to locate and transmit individual titles in his line.

A customer comes into the book store and asks to buy a title, hypothetically, *How to Grow Grass.* The salesman asks the customer for suitable identification, types into microcomputer, 205, the customer's name and address and that he wishes to purchase *How to Grow Grass.* Microcomputer, 205, may check to determine that the customer has no record as a pirate then transfers his name and address to buffer/comparator, 8 (referring to FIG. 1), of signal processor, 200, and instructs laser videodisc system, 232, to transmit its encrypted copy of *How to Grow Grass* to printer or other means, 221, via decryptors, 224 and 231. Laser system, 232, transmits one copy of the encrypted title to decryptor, 224, and one to signal processor, 200, for processing and evaluation.

In the encrypted title, signal processor, 200, identifies one or more signal words. If signal processor, 200, has the customer's name and address and the bookstore is a retail outlet in good standing that has received from a remote site program information on the predetermined fashions in affect, signal processor, 200, decrypts the signal word or words and transfers them to decryptor, 224, to serve as the code for the first stage of decryption.

Decryptor, 224, then decrypts a part of the encrypted transmission and passes the partly decrypted transmission to signal stripper, 229, and signal generator, 230. In the decrypted portion of the partially decrypted transmission, signal processor, 200, identifies a second signal word or set of words which it decrypts in a predetermined fashion and passes to decryptor, 231, to serve as the code basis for the second stage of decryption. Signal processor, 200, also may instruct signal stripper, 229, to remove this second signal word or words. Signal processor, 200, also passes the customer's name and address and its own unique apparatus identifier code from read only memory, 21, to signal generator, 230, which generates a signal embedding the customer's name and address and the retail outlet's identification in the programing in a suitable place or places in a suitable fashion. (Signal processor, 200, may also transmit the customer's name and address to printer or other means, 221, for actual printing of the customer's name and address in the text.) The transmission then passes through decryptor, 231, which completes the decryption process and passes the decrypted programing transmission to printer or other means, 221, and also to signal processor, 200. Signal processor 200, receives and analyzes the signal content of the programing output of decrypter, 231 to ensure that stripper, 229, and and generator, 230, have functioned properly. If they have not, signal processor, 200, shuts down the decryption of the title and prevents its delivery to the customer.

The General Case

It is obvious to one of ordinary skill in the art that the foregoing is presented by way of example only and that the invention is not to be unduly restricted thereby since modifications may be made in the structure of the various parts without functionally departing from the spirit of the invention. FIG. 6 should make this clear. The receiver site depicted in FIG. 6 has multiple means for receiving programing transmissions. All received programing is analyzed and evaluated by signal processor, 200. Working with microcomputer, 205, which is preprogramed to present received programing in predetermined fashions determined at the receiver site, signal processor, 200, permits and facilitates such presentations in accordance with the intentions of the suppliers of the programing at remote sites. Working together, signal processor, 200, and microcomputer, 205, can control all local equipment and manage local presentations in any fashion feasible given the nature of the local equipment and the programing.

We claim:

1. A method of communicating television program material to a multiplicity of receiver stations each of which includes a television receiver and computer, the computers being adapted to generate and transmit overlay signals to their associated television receivers, said overlay signals causing the display of user specific information related to said program material, and with at least some of said computers being programmed to process overlay modification control signals so as to modify the overlay signals transmitted to their associated receivers, each of said computers being programmed to accommodate a specific user application, comprising the steps of:

transmitting a video signal containing a television program signal to said receivers, transmitting an instruct-to-overlay signal to said receiver stations at a time when the corresponding overlay is not being displayed, receiving said video signal at a plurality of receiver stations and displaying said program material on the video receivers of selected ones of said plurality of receiver stations, detecting the presence of said instruct-to-overlay signal at said selected receiver stations and coupling said instruct-to-overlay signal to the computers associated with the video receivers of said selected stations, and causing said last named computers to generate and transmit their overlay signals to their associated television receivers in response to said instruct-to-overlay signal, thereby to present a display at the selected receiver stations including the television program material and the related computer generated overlay, the overlays displayed at a multiplicity of said receiver stations being different, with each display specific to a specific user.

2. A method according to claim 1, further including the step of transmitting an overlay modification signal to the computers which are programmed to process overlay modification signals, and causing said last named computers to modify their respective overlay signals in response thereto.

3. A method according to claim 1, wherein said instruct-to-overlay signal is embedded in said video signal outside the range of the television picture.

4. In a method of communicating television program material to a multiplicity of receiver stations each of which includes a television receiver and computer, the computers being adapted to generate and transmit overlay video signals to their associated television receivers, said overlay signals causing the display of user specific information related to said program material, and with at least some of said computers being programmed to process overlay control sigmals transmitted to their associated receivers, each of said computers being programmed to accommodate a unique user application, the steps of transmitting a video signal containing a television program signal to said receiver stations, and transmitting an instruct-to-overlay signal at a time when the corresponding overlay is not being displayed to thereby cause selected ones of said computers to generate and transmit their overlay signals to their associated television receiver to present a combined display consisting of the television program and the related computer generated overlay, the overlays displayed at a multiplicity of said receiver stations being different, with each display unique to a specific user.

5. A process according to claim 4, further including the step of transmitting an overlay modification signal to the computers which are programmed to process overlay modification signals.

6. A method according to claim 4, wherein said instruct-to-overlay signal is embedded in said video signal outside the range of the television picture.

7. In a method of communicating television program material to a multiplicity of receiver stations each of which includes a television receiver and computer, the computers being adapted to generate and transmit overlay video signals, to their associated television receivers, said overlay signals causing the display of user specific information related to said program material, and with at least some of said computers being programmed to process overlay modification control signals so as to modify the overlay video signals transmitted to their associated receivers, each of said computers being programmed to accommodate a specific user application, and wherein a video signal containing a television program signal and an instruct to-overlay signal are transmitted to said receiver stations, the steps of receiving said video signal at a plurality of receiver stations and displaying said program material on the video receivers of selected ones of said plurality of receiver stations, detecting the presence of said instruct-to-overlay signal at said selected receiver stations at a time when the corresponding overlay is not being displayed, and coupling said instruct-to-overlay signal to the computers at said selected receiver stations, and causing the computers at said selected receiver stations to generate and transmit their overlay video signals to their associated television receivers in response to said instruct-to-overlay signal, thereby to present a combined display at the selected receiver stations consisting of the television program and the related computer generated overlay, the overlays displayed at a multiplicity of said receiver stations being different, with each display specific to a specific user.

8. A method according to claim 7, further including the step of transmitting an overlay modification signal to the computers which are programmed to process overlay modification signals, and causing said last named computers to modify their respective overlay video signals in response thereto.

9. Television signal processor means, comprising carrier transmission receiving means, means for demodulating the output of said receiving means to detect a video program signal, means normally coupling said video signal to a television receiver, decoder means for determining the presence or absence of an embedded instruct-to-overlay signal in said video signal at a time when the corresponding overlay is not being displayed, computer means for generating and transmitting video overlay signals, said overlay signals causing the display of user specific information related to said program material, and means connected to said computer means and responsive to said decoder means when the presence of said embedded signal is detected for coupling said overlay signals to said television receiver, the overlays displayed at a multiplicity of said receiver stations being different, with each display specific to a specific user.

10. Television signal processor means according to claim 9, wherein said means connected to said computer means and responsive to said decoder means disconnects said video program signal from said television receiver upon detection of the absence of said embedded signal.

11. Television signal processor means according to claim 9, further including means coupled to said computer means for selectively updating said overlay signals.

12. Television signal processor means according to claim 11, wherein said embedded signal is a periodically recurring signal and wherein said means connected to said computer means and responsive to said decoder means couples said overlay video signals to said television receiver for so long as said embedded signal appears in said video program signal.

13. Television signal processor means according to claim 9, wherein said overlay video signal represents a graphic overlay.

* * * * *

(12) EX PARTE REEXAMINATION CERTIFICATE (6884th)
United States Patent
Harvey et al.

(10) Number: US 4,694,490 C1
(45) Certificate Issued: Jun. 23, 2009

(54) SIGNAL PROCESSING APPARATUS AND METHODS

(75) Inventors: John C. Harvey, New York, NY (US); James W. Cuddihy, New York, NY (US)

(73) Assignee: The Personalized Mass Media Corporation, New York, NY (US)

Reexamination Request:
No. 90/006,800, Oct. 3, 2003

Reexamination Certificate for:
Patent No.: 4,694,490
Issued: Sep. 15, 1987
Appl. No.: 06/317,510
Filed: Nov. 3, 1981

(51) Int. Cl.
*H04K 1/00* (2006.01)
*H04H 1/00* (2006.01)
*H04H 9/00* (2006.01)
*H04N 7/24* (2006.01)
*H04N 7/173* (2006.01)
*H04N 5/44* (2006.01)
*H04N 5/46* (2006.01)

(52) U.S. Cl. .................. 380/234; 348/484; 348/E5.108; 348/E5.114; 348/E7.069; 375/E7.001; 379/92.01; 380/54; 725/136

(58) Field of Classification Search .................... 725/32, 725/34–36, 151–153, 131–142, 1–22; 348/563–570, 348/460, 473, 476–484; 380/54, 234, 242; 379/92.01; 709/200
See application file for complete search history.

(56) References Cited

U.S. PATENT DOCUMENTS

| | | | |
|---|---|---|---|
| 1,927,702 A | 9/1933 | Foss | |
| 1,992,271 A | 2/1935 | Williams | |
| 2,046,381 A | 7/1936 | Hicks et al. | |
| 2,117,638 A | 5/1938 | Walter | |
| 2,192,217 A | 3/1940 | Bellamy et al. | |

(Continued)

FOREIGN PATENT DOCUMENTS

AU 481565 4/1976

(Continued)

OTHER PUBLICATIONS

Linthicum, Jack, "A Guide to the FCC's Rulemaking Procedures," IEEE, pp. 34–37, Jul. 7, 1981.*

(Continued)

*Primary Examiner*—Lynne H Browne

(57) ABSTRACT

Apparatus and methods for automatically controlling programming transmissions and presentations on television and radio equipment and monitoring the programming transmitted and presented. ("Programming" here means everything transmitted over television or radio intended for communication of entertainment or to instruct or inform.) The Apparatus can handle programming transmitted either over-the-air (hereinafter, "broadcast") or over hard-wire (hereinafter, "cablecast"). The apparatus receive transmissions from as many as one hundred or more channels that are sequentially scanned by one or more scanners/switches that transfer the transmissions to one or more receiver/decoders that identify signals in the programming and separate the signals from the programming transmissions. The signals may then be transferred through one or more decrypters. The separated and possibly wholly or partially decrypted signals are then transferred through one or more processors and buffers to external equipment and/or data recorders. The data recorders are adapted to output data to remote sites on predetermined instructions. In all these functions, the apparatus are governed by one or more controllers. The methods co-ordinate and instruct equipment in the transmission and presentation of radio and television programming, especially in multimedia and multi-channel presentations, and in certain other functions.

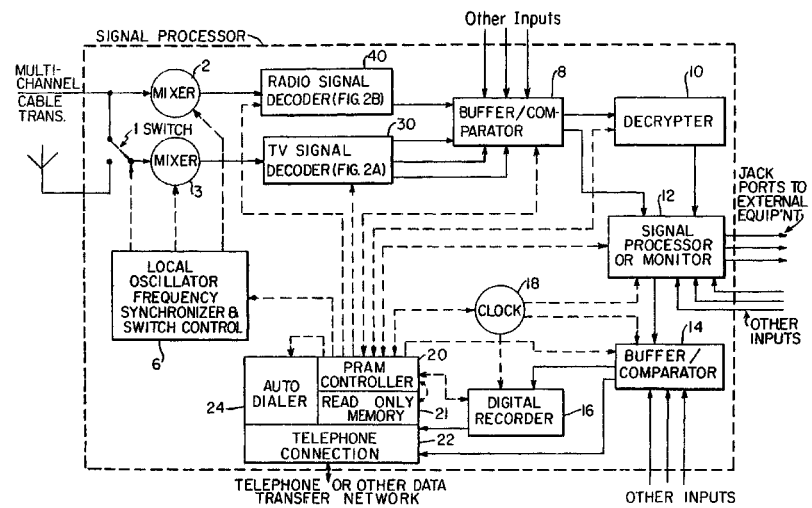

U.S. PATENT DOCUMENTS

| | | |
|---|---|---|
| 2,217,881 A | 10/1940 | Allen |
| 2,236,077 A | 3/1941 | Smith |
| 2,264,563 A | 12/1941 | Bumstead |
| 2,418,127 A | 4/1947 | Labin |
| 2,510,046 A | 5/1950 | Ellett et al. |
| 2,511,085 A | 6/1950 | Smith |
| 2,563,448 A | 8/1951 | Aram |
| 2,570,209 A | 10/1951 | Cotsworth, III |
| 2,573,349 A | 10/1951 | Miller et al. |
| 2,619,530 A | 11/1952 | Roschke |
| 2,769,023 A | 10/1956 | Loew et al. |
| 2,788,387 A | 4/1957 | Druz |
| 2,855,993 A | 10/1958 | Rahmel |
| 2,864,865 A | 12/1958 | Morris |
| 2,864,885 A | 12/1958 | Morris |
| 2,866,962 A | 12/1958 | Ellet |
| 2,875,270 A | 2/1959 | Wendt et al. |
| 2,892,882 A | 6/1959 | Hughes |
| 2,969,427 A | 1/1961 | See |
| 2,972,008 A | 2/1961 | Ridenour et al. |
| 2,995,624 A | 8/1961 | Watters |
| 3,008,000 A | 11/1961 | Morchand |
| 3,011,153 A | 11/1961 | Haselton et al. |
| 3,016,091 A | 1/1962 | Daniele |
| 3,029,308 A | 4/1962 | Adler et al. |
| 3,071,642 A | 1/1963 | Mountjoy et al. |
| 3,071,649 A | 1/1963 | Goodall |
| 3,082,402 A | 3/1963 | Scantlin |
| 3,107,274 A | 10/1963 | Roschke |
| 3,133,986 A | 5/1964 | Morris et al. |
| 3,213,201 A | 10/1965 | Flood et al. |
| 3,238,297 A | 3/1966 | Pawley et al. |
| 3,244,806 A | 4/1966 | Morris |
| 3,251,051 A | 5/1966 | Harries |
| 3,304,416 A | 2/1967 | Wolf |
| 3,336,437 A | 8/1967 | Brouard et al. |
| RE26,331 E | 1/1968 | Brothman et al. |
| 3,363,250 A | 1/1968 | Jacobson |
| 3,366,731 A | 1/1968 | Wallerstein |
| 3,368,031 A | 2/1968 | Eisele |
| 3,371,071 A | 2/1968 | Webb |
| 3,387,082 A | 6/1968 | Farber et al. |
| 3,387,083 A | 6/1968 | Farber et al. |
| 3,387,268 A | 6/1968 | Epstein |
| 3,390,234 A | 6/1968 | Glidden |
| 3,430,004 A | 2/1969 | Shenk |
| 3,440,427 A | 4/1969 | Kammer |
| 3,470,309 A | 9/1969 | Nyberg |
| 3,472,962 A | 10/1969 | Sanford |
| 3,475,547 A | 10/1969 | Sarlund |
| 3,478,164 A | 11/1969 | Southworth |
| 3,478,166 A | 11/1969 | Reiter et al. |
| 3,478,342 A | 11/1969 | Alldritt et al. |
| 3,485,946 A | 12/1969 | Jackson et al. |
| 3,493,674 A | 2/1970 | Houghton |
| 3,500,327 A | 3/1970 | Belcher et al. |
| 3,526,843 A | 9/1970 | Sanville |
| 3,531,583 A | 9/1970 | Walker |
| 3,531,586 A | 9/1970 | Bass et al. |
| 3,536,833 A | 10/1970 | Guanella |
| 3,546,684 A | 12/1970 | Maxwell et al. |
| 3,560,936 A | 2/1971 | Busch |
| 3,564,509 A | 2/1971 | Perkins et al. |
| 3,569,937 A | 3/1971 | Hoetter |
| 3,573,747 A | 4/1971 | Adams et al. |
| 3,576,391 A | 4/1971 | Houghton |
| 3,584,142 A | 6/1971 | Schoeffler |
| 3,586,757 A | 6/1971 | Morchand |
| 3,586,771 A | 6/1971 | Hamburger et al. |
| 3,588,357 A | 6/1971 | Sellari, Jr. |
| 3,601,528 A | 8/1971 | McVoy |
| 3,602,891 A | 8/1971 | Clark et al. |
| 3,606,688 A | 9/1971 | Zawels et al. |
| 3,609,697 A | 9/1971 | Blevins et al. |
| 3,612,752 A | 10/1971 | Banning, Jr. |
| 3,624,516 A | 11/1971 | Rando et al. |
| 3,627,914 A | 12/1971 | Davis |
| 3,639,686 A | 2/1972 | Walker et al. |
| 3,648,270 A | 3/1972 | Metz et al. |
| 3,649,749 A | 3/1972 | Gibson |
| 3,651,261 A | 3/1972 | Guanella |
| 3,651,471 A | 3/1972 | Haselwood et al. |
| 3,657,699 A | 4/1972 | Rocher et al. |
| 3,659,046 A | 4/1972 | Angeleri et al. |
| 3,666,888 A | 5/1972 | Sekimoto |
| 3,668,307 A | 6/1972 | Face et al. |
| 3,676,580 A | 7/1972 | Beck |
| 3,683,111 A | 8/1972 | Southworth |
| 3,684,823 A | 8/1972 | McVoy |
| 3,693,090 A | 9/1972 | Gabriel |
| 3,696,297 A | 10/1972 | Otero |
| 3,703,684 A | 11/1972 | McVoy |
| 3,712,956 A | 1/1973 | Lemelson |
| 3,716,835 A | 2/1973 | Weinberg |
| 3,723,637 A | 3/1973 | Fujio et al. |
| 3,725,672 A | 4/1973 | Reuter |
| 3,726,992 A | 4/1973 | Eguchi et al. |
| 3,728,480 A | 4/1973 | Baer |
| 3,729,581 A | 4/1973 | Anderson |
| 3,731,197 A | 5/1973 | Clark |
| 3,733,430 A | 5/1973 | Thompson et al. |
| 3,733,431 A | 5/1973 | Kirk, Jr. et al. |
| 3,736,369 A | 5/1973 | Vogelman et al. |
| 3,737,858 A | 6/1973 | Turner et al. |
| 3,743,767 A | 7/1973 | Bitzer et al. |
| 3,744,043 A | 7/1973 | Walden et al. |
| 3,746,780 A | 7/1973 | Stetten et al. |
| 3,746,799 A | 7/1973 | Gentges |
| 3,749,845 A | 7/1973 | Fraser |
| 3,752,908 A | 8/1973 | Boenke et al. |
| 3,754,211 A | 8/1973 | Rocher et al. |
| 3,755,624 A | 8/1973 | Sekimoto |
| 3,757,225 A | 9/1973 | Ukicki |
| 3,761,888 A | 9/1973 | Flynn |
| 3,764,983 A | 10/1973 | Stok |
| 3,769,579 A | 10/1973 | Harney |
| RE27,810 E | 11/1973 | Buehrle |
| 3,773,977 A | 11/1973 | Guanella |
| 3,773,979 A | 11/1973 | Kirk, Jr. et al. |
| 3,777,053 A | 12/1973 | Wittig et al. |
| 3,778,058 A | 12/1973 | Rausch |
| 3,778,721 A | 12/1973 | Moran |
| 3,789,131 A | 1/1974 | Harney |
| 3,789,137 A | 1/1974 | Newell |
| 3,790,700 A | 2/1974 | Callais et al. |
| 3,794,922 A | 2/1974 | Osborn et al. |
| 3,795,763 A | 3/1974 | Golding et al. |
| 3,798,359 A | 3/1974 | Feistel |
| 3,798,610 A | 3/1974 | Bliss et al. |
| 3,803,491 A | 4/1974 | Osborn |
| 3,806,814 A | 4/1974 | Forbes |
| 3,812,488 A | 5/1974 | Yoshino et al. |
| 3,813,482 A | 5/1974 | Blonder |
| 3,819,852 A | 6/1974 | Wolf |
| 3,824,332 A | 7/1974 | Horowitz |
| 3,824,467 A | 7/1974 | French |
| 3,825,893 A | 7/1974 | Bossen et al. |
| 3,826,863 A | 7/1974 | Johnson |
| 3,833,757 A | 9/1974 | Kirk, Jr. et al. |
| 3,835,387 A | 9/1974 | Rookes et al. |
| 3,836,888 A | 9/1974 | Boenke et al. |

| | | | | | | |
|---|---|---|---|---|---|---|
| 3,842,196 A | 10/1974 | Loughlin | | 3,990,012 A | 11/1976 | Karnes |
| 3,842,206 A | 10/1974 | Barselloti et al. | | 3,990,050 A | 11/1976 | Kolettis et al. |
| 3,845,391 A | 10/1974 | Crosby | | 3,993,955 A | 11/1976 | Belcher et al. |
| 3,848,082 A | 11/1974 | Summers | | 3,996,583 A | 12/1976 | Hutt et al. |
| 3,848,193 A | 11/1974 | Martin et al. | | 3,996,586 A | 12/1976 | Dillon et al. |
| 3,849,729 A | 11/1974 | Van Baggem | | 3,997,718 A | 12/1976 | Ricketts et al. |
| 3,858,240 A | 12/1974 | Golding et al. | | 4,004,085 A | 1/1977 | Makino et al. |
| 3,859,458 A | 1/1975 | Takezawa et al. | | 4,006,297 A | 2/1977 | Koga |
| 3,859,596 A | 1/1975 | Jannery et al. | | 4,008,369 A | 2/1977 | Theurer et al. |
| 3,875,329 A | 4/1975 | Nagel | | 4,011,414 A | 3/1977 | Warren |
| 3,882,289 A | 5/1975 | Walding et al. | | 4,013,875 A | 3/1977 | McGlynn |
| 3,882,392 A | 5/1975 | Harney | | 4,015,286 A | 3/1977 | Russell |
| 3,885,089 A | 5/1975 | Callais et al. | | 4,016,361 A | 4/1977 | Pandey |
| 3,886,302 A | 5/1975 | Kosco | | 4,019,201 A | 4/1977 | Hartung et al. |
| 3,886,454 A | 5/1975 | Oakley et al. | | 4,020,419 A | 4/1977 | Caspari et al. |
| 3,889,054 A | 6/1975 | Nagel et al. | | 4,024,574 A | 5/1977 | Nieson |
| 3,890,461 A | 6/1975 | Vogelman et al. | | 4,024,575 A | 5/1977 | Harney et al. |
| 3,891,792 A | 6/1975 | Kimura | | 4,025,851 A | 5/1977 | Hazelwood et al. |
| 3,893,031 A | 7/1975 | Majeau et al. | | 4,025,947 A | 5/1977 | Michael |
| 3,894,176 A | 7/1975 | Mellon | | 4,025,948 A | 5/1977 | Loshin |
| 3,894,177 A | 7/1975 | Howell et al. | | 4,026,555 A | 5/1977 | Kirschner et al. |
| 3,896,262 A | 7/1975 | Hudspeth et al. | | 4,027,100 A | 5/1977 | Ishiguro |
| 3,896,266 A | 7/1975 | Waterbury | | 4,027,267 A | 5/1977 | Larsen |
| 3,898,378 A | 8/1975 | Hinoshita et al. | | 4,027,331 A | 5/1977 | Nicol |
| 3,899,633 A | 8/1975 | Sorenson et al. | | 4,031,543 A | 6/1977 | Holz |
| 3,899,639 A | 8/1975 | Cleveley et al. | | 4,031,548 A | 6/1977 | Kato et al. |
| 3,906,450 A | 9/1975 | Prado, Jr. | | 4,032,972 A | 6/1977 | Saylor |
| 3,909,512 A | 9/1975 | Omori et al. | | 4,034,990 A | 7/1977 | Baer |
| 3,911,216 A | 10/1975 | Bartek et al. | | 4,035,838 A | 7/1977 | Bassani et al. |
| 3,911,419 A | 10/1975 | Bates et al. | | 4,042,958 A | 8/1977 | Saylor et al. |
| 3,916,091 A | 10/1975 | Kirk, Jr. et al. | | 4,044,376 A | 8/1977 | Porter |
| 3,919,462 A | 11/1975 | Hartung et al. | | 4,045,811 A | 8/1977 | Dingwall |
| 3,921,151 A | 11/1975 | Guanella | | 4,045,814 A | 8/1977 | Hartung et al. |
| 3,922,482 A | 11/1975 | Gabriel et al. | | 4,047,221 A | 9/1977 | Yasuda et al. |
| 3,922,492 A | 11/1975 | Lumsden | | 4,048,562 A | 9/1977 | Haselwood et al. |
| 3,924,059 A | 12/1975 | Horowitz | | 4,048,619 A | 9/1977 | Forman, Jr. et al. |
| 3,924,187 A | 12/1975 | Dormans | | 4,049,906 A | 9/1977 | Hafner et al. |
| 3,927,250 A | 12/1975 | Rainger | | 4,052,719 A | 10/1977 | Hutt et al. |
| 3,934,079 A | 1/1976 | Barnhart | | 4,052,737 A | 10/1977 | Robertson et al. |
| 3,936,593 A | 2/1976 | Aaronson et al. | | 4,054,911 A | 10/1977 | Fletcher et al. |
| 3,936,594 A | 2/1976 | Schubin et al. | | 4,055,848 A | 10/1977 | Fearnside |
| 3,936,595 A | 2/1976 | Yanagimachi et al. | | 4,056,684 A | 11/1977 | Lindstrom |
| 3,936,868 A | 2/1976 | Thorpe | | 4,057,829 A | 11/1977 | Moorehead |
| 3,943,447 A | 3/1976 | Shomo, III | | 4,058,830 A | 11/1977 | Guinet et al. |
| 3,943,492 A | 3/1976 | Gall | | 4,059,729 A | 11/1977 | Eddy et al. |
| 3,944,931 A | 3/1976 | Usami et al. | | 4,060,832 A | 11/1977 | Devimeux et al. |
| 3,947,624 A | 3/1976 | Miyake | | 4,061,577 A | 12/1977 | Bell |
| 3,947,882 A | 3/1976 | Lightner | | 4,061,879 A | 12/1977 | Wintzer |
| 3,947,972 A | 4/1976 | Freeman | | 4,064,490 A | 12/1977 | Nagel |
| 3,949,313 A | 4/1976 | Tamada et al. | | 4,068,264 A | 1/1978 | Pires |
| 3,950,607 A | 4/1976 | Southworth et al. | | 4,068,265 A | 1/1978 | Russell |
| 3,950,618 A | 4/1976 | Bloisi | | 4,070,693 A | 1/1978 | Shutterly |
| 3,956,615 A | 5/1976 | Anderson et al. | | 4,074,315 A | 2/1978 | Kawamura et al. |
| 3,958,081 A | 5/1976 | Ehrsam et al. | | 4,075,660 A | 2/1978 | Horowitz |
| 3,958,088 A | 5/1976 | Vieri | | 4,078,316 A | 3/1978 | Freeman |
| 3,961,137 A | 6/1976 | Hutt et al. | | 4,079,419 A | 3/1978 | Siegle et al. |
| 3,962,535 A | 6/1976 | Haskell | | 4,081,612 A | 3/1978 | Hafner |
| 3,970,790 A | 7/1976 | Guanella | | 4,081,753 A | 3/1978 | Miller |
| 3,971,888 A | 7/1976 | Ching et al. | | 4,081,754 A | 3/1978 | Jackson |
| 3,973,206 A | 8/1976 | Haselwood et al. | | 4,081,831 A | 3/1978 | Tang et al. |
| 3,974,451 A | 8/1976 | Maeder | | 4,081,832 A | 3/1978 | Sherman |
| 3,975,583 A | 8/1976 | Meadows | | 4,086,434 A | 4/1978 | Bocchi |
| 3,975,585 A | 8/1976 | Kirk, Jr. et al. | | 4,088,958 A | 5/1978 | Suzuki et al. |
| 3,978,449 A | 8/1976 | Sanders et al. | | 4,091,417 A | 5/1978 | Nieson |
| 3,982,064 A | 9/1976 | Barnaby | | 4,095,258 A | 6/1978 | Sperber |
| 3,982,065 A | 9/1976 | Barnaby et al. | | 4,096,524 A | 6/1978 | Scott |
| 3,984,637 A | 10/1976 | Caudill et al. | | 4,096,542 A | 6/1978 | Pappas et al. |
| 3,987,397 A | 10/1976 | Belcher et al. | | 4,099,258 A | 7/1978 | Parsons |
| 3,987,398 A | 10/1976 | Fung | | 4,104,486 A | 8/1978 | Martin et al. |
| 3,988,528 A | 10/1976 | Yanagimachi et al. | | 4,104,681 A | 8/1978 | Saylor et al. |
| 3,988,550 A | 10/1976 | Ts'ao | | 4,107,734 A | 8/1978 | Percy et al. |

| | | | | | | |
|---|---|---|---|---|---|---|
| 4,107,735 A | 8/1978 | Frohbach | | 4,225,967 A | 9/1980 | Miwa et al. |
| 4,112,317 A | 9/1978 | Everswick | | 4,228,543 A | 10/1980 | Jackson |
| 4,112,383 A | 9/1978 | Burgert | | 4,230,990 A | 10/1980 | Lert, Jr. et al. |
| 4,112,464 A | 9/1978 | Guif et al. | | 4,231,031 A | 10/1980 | Crowther et al. |
| 4,114,841 A | 9/1978 | Muhlfelder et al. | | 4,232,193 A | 11/1980 | Gerard |
| 4,115,662 A | 9/1978 | Guinet et al. | | 4,233,628 A | 11/1980 | Ciciora |
| 4,115,807 A | 9/1978 | Pires | | 4,236,217 A | 11/1980 | Kennedy |
| 4,117,605 A | 10/1978 | Kurland et al. | | 4,237,484 A | 12/1980 | Brown et al. |
| 4,118,669 A | 10/1978 | Fung | | 4,237,486 A | 12/1980 | Shimp |
| 4,120,003 A | 10/1978 | Mitchell et al. | | 4,238,773 A | 12/1980 | Tsuboka et al. |
| 4,120,030 A | 10/1978 | Johnstine | | 4,238,853 A | 12/1980 | Ehrsam et al. |
| 4,124,887 A | 11/1978 | Johnson et al. | | 4,238,854 A | 12/1980 | Ehrsam et al. |
| 4,126,762 A | 11/1978 | Martin et al. | | 4,243,984 A | 1/1981 | Ackley et al. |
| 4,130,833 A | 12/1978 | Choenet | | 4,245,245 A | 1/1981 | Matsumoto et al. |
| 4,131,881 A | 12/1978 | Robinson | | 4,245,246 A | 1/1981 | Cheung |
| 4,134,127 A | 1/1979 | Campioni | | 4,245,252 A | 1/1981 | Nagumo |
| 4,135,156 A | 1/1979 | Sanders, Jr. et al. | | 4,246,611 A | 1/1981 | Davies |
| 4,135,213 A | 1/1979 | Wintfeld et al. | | 4,247,106 A | 1/1981 | Jeffers et al. |
| 4,138,726 A | 2/1979 | Girault et al. | | 4,247,947 A | 1/1981 | Miyamoto |
| 4,139,860 A | 2/1979 | Micic et al. | | 4,249,211 A | 2/1981 | Baba et al. |
| 4,141,034 A | 2/1979 | Netravali et al. | | 4,250,489 A | 2/1981 | Dudash et al. |
| 4,142,156 A | 2/1979 | Freund | | 4,250,521 A | 2/1981 | Wright |
| 4,144,495 A | 3/1979 | Metzger | | 4,250,524 A | 2/1981 | Tomizawa |
| 4,145,717 A | 3/1979 | Guif et al. | | 4,251,691 A | 2/1981 | Kakihara et al. |
| 4,148,066 A | 4/1979 | Saylor | | 4,253,114 A | 2/1981 | Tang et al. |
| 4,148,070 A | 4/1979 | Taylor | | 4,253,157 A | 2/1981 | Kirschner et al. |
| 4,156,253 A | 5/1979 | Steudel | | 4,258,386 A | 3/1981 | Cheung |
| 4,156,931 A | 5/1979 | Adelman et al. | | 4,258,423 A | 3/1981 | Lane et al. |
| 4,160,120 A | 7/1979 | Barnes et al. | | 4,261,006 A | 4/1981 | Weintraub et al. |
| 4,161,728 A | 7/1979 | Insam | | 4,262,329 A | 4/1981 | Bright et al. |
| 4,161,751 A | 7/1979 | Ost | | 4,264,924 A | 4/1981 | Freeman |
| 4,162,483 A | 7/1979 | Entenman | | 4,264,925 A | 4/1981 | Freeman et al. |
| 4,162,513 A | 7/1979 | Beyers, Jr. et al. | | 4,266,243 A | 5/1981 | Shutterly |
| 4,163,252 A | 7/1979 | Mistry et al. | | 4,270,145 A | 5/1981 | Farina |
| 4,163,255 A | 7/1979 | Pires | | 4,271,506 A | 6/1981 | Broc et al. |
| 4,168,396 A | 9/1979 | Best | | 4,272,784 A | 6/1981 | Saito et al. |
| 4,170,782 A | 10/1979 | Miller | | 4,273,962 A | 6/1981 | Wolfe |
| 4,171,513 A | 10/1979 | Otey et al. | | 4,275,411 A | 6/1981 | Lippel |
| 4,172,213 A | 10/1979 | Barnes et al. | | 4,278,973 A | 7/1981 | Hughes et al. |
| 4,175,267 A | 11/1979 | Tachi | | 4,278,993 A | 7/1981 | Suzuki |
| 4,178,613 A | 12/1979 | Takashi et al. | | 4,283,602 A | 8/1981 | Adams et al. |
| 4,180,709 A | 12/1979 | Cosgrove et al. | | 4,284,976 A | 8/1981 | Gable et al. |
| 4,186,413 A | 1/1980 | Mortimer | | 4,286,281 A | 8/1981 | Suzuki |
| 4,189,748 A | 2/1980 | Reis | | 4,287,592 A | 9/1981 | Paulish et al. |
| 4,195,288 A | 3/1980 | Morton | | 4,288,809 A | 9/1981 | Yabe |
| 4,196,310 A | 4/1980 | Forman et al. | | 4,290,062 A | 9/1981 | Marti et al. |
| 4,196,448 A | 4/1980 | Whitehouse et al. | | 4,290,141 A | 9/1981 | Anderson et al. |
| 4,199,656 A | 4/1980 | Saylor | | 4,290,142 A | 9/1981 | Schnee et al. |
| 4,199,781 A | 4/1980 | Doumit | | 4,292,650 A | 9/1981 | Hendrickson |
| 4,199,791 A | 4/1980 | Corey | | 4,295,155 A | 10/1981 | Jarger et al. |
| 4,199,809 A | 4/1980 | Pasahow et al. | | 4,295,223 A | 10/1981 | Shutterly |
| 4,200,770 A | 4/1980 | Hellman et al. | | 4,301,542 A | 11/1981 | Weintraub et al. |
| 4,200,913 A | 4/1980 | Kuhar et al. | | 4,302,771 A | 11/1981 | Gargini |
| 4,201,887 A | 5/1980 | Burns | | 4,302,775 A | 11/1981 | Widergren et al. |
| 4,203,130 A | 5/1980 | Doumit et al. | | 4,303,940 A | 12/1981 | Ciciora |
| 4,203,166 A | 5/1980 | Ehrsam et al. | | 4,303,941 A | 12/1981 | Marti et al. |
| 4,205,343 A | 5/1980 | Barrett | | 4,304,990 A | 12/1981 | Atalla |
| 4,207,524 A | 6/1980 | Purchase | | 4,305,101 A | 12/1981 | Yarbrough et al. |
| 4,213,124 A | 7/1980 | Barda et al. | | 4,305,131 A | 12/1981 | Best |
| 4,214,273 A | 7/1980 | Brown | | 4,306,250 A | 12/1981 | Summers et al. |
| 4,215,366 A | 7/1980 | Davidson | | 4,306,289 A | 12/1981 | Lumley |
| 4,215,369 A | 7/1980 | Iijima | | 4,306,305 A | 12/1981 | Doi et al. |
| 4,215,370 A | 7/1980 | Kirk, Jr. | | 4,307,446 A | 12/1981 | Barton et al. |
| 4,216,497 A | 8/1980 | Ishman et al. | | 4,308,558 A | 12/1981 | Hernandez et al. |
| 4,217,609 A | 8/1980 | Hatori et al. | | 4,310,854 A | 1/1982 | Baer |
| 4,218,697 A | 8/1980 | Leventer | | 4,312,016 A | 1/1982 | Glaab et al. |
| 4,218,698 A | 8/1980 | Bart et al. | | 4,313,132 A | 1/1982 | Doles et al. |
| 4,222,068 A | 9/1980 | Thompson | | 4,314,367 A | 2/1982 | Bakka et al. |
| 4,222,073 A | 9/1980 | Hirashima | | 4,315,282 A | 2/1982 | Schumacher |
| 4,224,678 A | 9/1980 | Lynch et al. | | 4,316,055 A | 2/1982 | Feistel |
| 4,225,918 A | 9/1980 | Beadle et al. | | 4,316,217 A | 2/1982 | Rifken |

| | | | | | | |
|---|---|---|---|---|---|---|
| 4,316,245 A | 2/1982 | Luu et al. | | 4,374,437 A | 2/1983 | Citta et al. |
| 4,317,215 A | 2/1982 | Tabata et al. | | RE31,182 E | 3/1983 | Crager et al. |
| 4,318,047 A | 3/1982 | Dawson | | 4,375,579 A | 3/1983 | Davida et al. |
| 4,318,125 A | 3/1982 | Shutterly | | 4,375,650 A | 3/1983 | Tiemann |
| 4,318,126 A | 3/1982 | Sassler | | 4,375,651 A | 3/1983 | Templin et al. |
| 4,318,127 A | 3/1982 | Fukuda et al. | | 4,377,870 A | 3/1983 | Anderson et al. |
| 4,318,128 A | 3/1982 | Sauvanet | | 4,378,470 A | 3/1983 | Murto et al. |
| 4,319,079 A | 3/1982 | Best | | 4,379,205 A | 4/1983 | Wyner |
| 4,319,353 A | 3/1982 | Alvarez, III et al. | | 4,380,027 A | 4/1983 | Leventer et al. |
| 4,320,256 A | 3/1982 | Freeman | | 4,381,522 A | 4/1983 | Lambert |
| 4,322,745 A | 3/1982 | Saeki et al. | | 4,381,562 A | 4/1983 | Acampora |
| 4,323,921 A | 4/1982 | Guillou | | 4,382,256 A | 5/1983 | Nagata |
| 4,323,922 A | 4/1982 | den Toonder et al. | | 4,383,257 A | 5/1983 | Giallanza et al. |
| 4,325,078 A | 4/1982 | Seatom et al. | | 4,383,273 A | 5/1983 | Lunn |
| 4,329,675 A | 5/1982 | Van Hulle | | 4,385,324 A | 5/1983 | Shioda et al. |
| 4,329,684 A | 5/1982 | Monteath et al. | | 4,385,384 A | 5/1983 | Rosbury et al. |
| 4,329,711 A | 5/1982 | Cheung | | 4,386,416 A | 5/1983 | Giltner et al. |
| 4,330,794 A | 5/1982 | Sherwood | | 4,386,436 A | 5/1983 | Kocher et al. |
| 4,331,973 A | 5/1982 | Eskin et al. | | 4,388,639 A | 6/1983 | Cox et al. |
| 4,332,980 A | 6/1982 | Reynolds et al. | | 4,388,643 A | 6/1983 | Aminetzah |
| 4,333,107 A | 6/1982 | McGuire et al. | | 4,388,644 A | 6/1983 | Ishman et al. |
| 4,333,109 A | 6/1982 | Ciciora | | 4,388,645 A | 6/1983 | Cox et al. |
| 4,333,152 A | 6/1982 | Best | | 4,388,664 A | 6/1983 | Watanabe |
| 4,334,242 A | 6/1982 | Mangold | | 4,389,671 A | 6/1983 | Posner et al. |
| 4,335,402 A | 6/1982 | Holmes | | 4,390,898 A | 6/1983 | Bond et al. |
| 4,335,426 A | 6/1982 | Maxwell et al. | | 4,390,901 A | 6/1983 | Keiser |
| 4,336,553 A | 6/1982 | den Toonder et al. | | 4,390,904 A | 6/1983 | Johnston et al. |
| 4,336,559 A | 6/1982 | Koyama et al. | | 4,392,135 A | 7/1983 | Ohyagi |
| 4,337,480 A | 6/1982 | Bourassin et al. | | 4,393,277 A | 7/1983 | Besen et al. |
| 4,337,485 A | 6/1982 | Chambers | | 4,393,376 A | 7/1983 | Thomas |
| 4,338,628 A | 7/1982 | Payne et al. | | 4,393,404 A | 7/1983 | Cox et al. |
| 4,339,798 A | 7/1982 | Hedges et al. | | 4,394,687 A | 7/1983 | Hutt et al. |
| 4,340,903 A | 7/1982 | Tamura | | 4,394,691 A | 7/1983 | Amano et al. |
| 4,340,906 A | 7/1982 | den Toonder et al. | | 4,394,762 A | 7/1983 | Nabeshima |
| 4,341,925 A | 7/1982 | Doland | | 4,395,757 A | 7/1983 | Bienvenu et al. |
| 4,343,042 A | 8/1982 | Schrock et al. | | 4,396,915 A | 8/1983 | Farnsworth et al. |
| 4,344,090 A | 8/1982 | Belisomi et al. | | 4,396,946 A | 8/1983 | Bond |
| 4,347,498 A | 8/1982 | Lee et al. | | 4,396,947 A | 8/1983 | Cheung |
| 4,347,532 A | 8/1982 | Korver | | 4,398,216 A | 8/1983 | Field et al. |
| 4,347,618 A | 8/1982 | Kavouras et al. | | 4,400,587 A | 8/1983 | Taylor et al. |
| 4,348,696 A | 9/1982 | Beier | | 4,400,717 A | 8/1983 | Southworth et al. |
| 4,352,011 A | 9/1982 | Guillou | | 4,402,009 A | 8/1983 | Rathjens et al. |
| 4,353,088 A | 10/1982 | den Toonder et al. | | 4,404,589 A | 9/1983 | Wright, Jr. |
| 4,354,201 A | 10/1982 | Sechet et al. | | 4,405,942 A | 9/1983 | Block et al. |
| 4,355,372 A | 10/1982 | Johnson et al. | | 4,405,946 A | 9/1983 | Knight |
| 4,355,415 A | 10/1982 | George et al. | | 4,408,345 A | 10/1983 | Yashiro et al. |
| 4,357,548 A | 11/1982 | Preslar | | 4,410,911 A | 10/1983 | Field et al. |
| 4,358,672 A | 11/1982 | Hyatt et al. | | 4,410,917 A | 10/1983 | Newdoll et al. |
| 4,358,790 A | 11/1982 | Summers et al. | | 4,411,017 A | 10/1983 | Talbot |
| 4,359,223 A | 11/1982 | Baer et al. | | 4,412,244 A | 10/1983 | Shanley, II |
| 4,360,827 A | 11/1982 | Braun | | 4,413,281 A | 11/1983 | Thonnart |
| 4,360,828 A | 11/1982 | Briggs, Jr. et al. | | 4,413,339 A | 11/1983 | Riggle et al. |
| 4,360,881 A | 11/1982 | Martinson | | 4,414,516 A | 11/1983 | Howard |
| 4,361,730 A | 11/1982 | Barber et al. | | 4,414,621 A | 11/1983 | Bown et al. |
| 4,361,848 A | 11/1982 | Poignet et al. | | 4,415,771 A | 11/1983 | Martinez |
| 4,361,851 A | 11/1982 | Asip et al. | | 4,418,425 A | 11/1983 | Fennel et al. |
| 4,361,877 A | 11/1982 | Dyer et al. | | 4,419,699 A | 12/1983 | Christopher et al. |
| 4,361,903 A | 11/1982 | Ohta | | 4,420,656 A | 12/1983 | Freeman |
| 4,364,081 A | 12/1982 | Hashimoto et al. | | 4,420,769 A | 12/1983 | Novak |
| 4,365,110 A | 12/1982 | Lee et al. | | 4,420,833 A | 12/1983 | Noirel |
| 4,365,249 A | 12/1982 | Tabata | | 4,422,093 A | 12/1983 | Pargee, Jr. |
| 4,365,267 A | 12/1982 | Tsuda | | 4,422,105 A | 12/1983 | Rodesch et al. |
| 4,367,488 A | 1/1983 | Leventer et al. | | 4,422,486 A | 12/1983 | Maret |
| 4,367,548 A | 1/1983 | Cotten, Jr. et al. | | 4,424,532 A | 1/1984 | den Toonder et al. |
| 4,367,557 A | 1/1983 | Stern et al. | | 4,424,533 A | 1/1984 | Rzeszewski |
| 4,368,483 A | 1/1983 | Liu | | 4,425,578 A | 1/1984 | Haselwood et al. |
| 4,368,486 A | 1/1983 | Degoulet et al. | | 4,425,579 A | 1/1984 | Merrell |
| 4,369,333 A | 1/1983 | Gemperle et al. | | 4,425,581 A | 1/1984 | Scweppe et al. |
| 4,369,462 A | 1/1983 | Tomizawa et al. | | 4,425,664 A | 1/1984 | Sherman et al. |
| 4,369,464 A | 1/1983 | Temime | | 4,426,698 A | 1/1984 | Pargee, Jr. |
| 4,374,395 A | 2/1983 | Herrmann et al. | | 4,427,968 A | 1/1984 | York |

| | | | | | |
|---|---|---|---|---|---|
| 4,429,385 A | 1/1984 | Cichelli et al. | 4,495,654 A | 1/1985 | Deiss |
| 4,430,669 A | 2/1984 | Cheung | 4,496,171 A | 1/1985 | Cherry |
| 4,430,731 A | 2/1984 | Gimple et al. | 4,496,975 A | 1/1985 | Noirel |
| 4,433,207 A | 2/1984 | Best | 4,496,976 A | 1/1985 | Swanson et al. |
| 4,433,211 A | 2/1984 | McCalmont et al. | 4,498,098 A | 2/1985 | Stell |
| 4,433,379 A | 2/1984 | Schenk et al. | 4,500,987 A | 2/1985 | Hasegawa |
| 4,434,323 A | 2/1984 | Levine et al. | 4,503,287 A | 3/1985 | Morris et al. |
| 4,434,436 A | 2/1984 | Kleykamp et al. | 4,503,538 A | 3/1985 | Fritz |
| 4,434,438 A | 2/1984 | Rzeszewski | 4,504,831 A | 3/1985 | Jahr et al. |
| 4,434,464 A | 2/1984 | Suzuki et al. | 4,506,387 A | 3/1985 | Walter |
| 4,439,761 A | 3/1984 | Fleming et al. | 4,507,680 A | 3/1985 | Freeman |
| 4,439,784 A | 3/1984 | Furukawa et al. | 4,509,073 A | 4/1985 | Baran et al. |
| 4,439,785 A | 3/1984 | Leonard | 4,510,623 A | 4/1985 | Bonneau et al. |
| 4,443,660 A | 4/1984 | DeLong | 4,512,011 A | 4/1985 | Turner |
| 4,446,519 A | 5/1984 | Thomas | 4,513,174 A | 4/1985 | Herman |
| 4,449,114 A | 5/1984 | Fascenda et al. | 4,513,324 A | 4/1985 | Poetsch et al. |
| 4,449,145 A | 5/1984 | Ciciora | 4,514,761 A | 4/1985 | Merrell et al. |
| 4,449,246 A | 5/1984 | Seiler et al. | 4,518,989 A | 5/1985 | Yabiki et al. |
| 4,449,247 A | 5/1984 | Waschka, Jr. | 4,520,392 A | 5/1985 | Cox et al. |
| 4,449,249 A | 5/1984 | Price | 4,520,404 A | 5/1985 | Von Kohorn |
| 4,450,442 A | 5/1984 | Tanaka | 4,521,806 A | 6/1985 | Abraham |
| 4,450,477 A | 5/1984 | Lovett | 4,527,194 A | 7/1985 | Sirazi |
| 4,450,481 A | 5/1984 | Dickinson | 4,528,588 A | 7/1985 | Löfberg |
| 4,450,531 A | 5/1984 | Kenyon et al. | 4,528,589 A | 7/1985 | Block et al. |
| 4,451,700 A | 5/1984 | Kempner et al. | 4,531,020 A | 7/1985 | Wechselberger et al. |
| 4,451,701 A | 5/1984 | Bendig | 4,531,021 A | 7/1985 | Bluestein et al. |
| 4,454,538 A | 6/1984 | Toriumi | 4,532,540 A | 7/1985 | Wine |
| 4,454,543 A | 6/1984 | Lund et al. | 4,532,547 A | 7/1985 | Bennett |
| 4,454,594 A | 6/1984 | Heffron et al. | RE31,977 E | 8/1985 | Ott |
| 4,455,570 A | 6/1984 | Saeki et al. | 4,533,943 A | 8/1985 | Poirier |
| 4,455,651 A | 6/1984 | Baran | 4,533,948 A | 8/1985 | McNamara et al. |
| 4,456,925 A | 6/1984 | Skerlos et al. | 4,533,949 A | 8/1985 | Fujimura et al. |
| 4,458,109 A | 7/1984 | Mueller-Schloer | 4,534,024 A | 8/1985 | Maxemchuk et al. |
| 4,458,268 A | 7/1984 | Ciciora | 4,535,355 A | 8/1985 | Arn et al. |
| 4,458,315 A | 7/1984 | Uchenick | 4,536,791 A | 8/1985 | Campbell et al. |
| 4,460,922 A | 7/1984 | Ensinger et al. | 4,538,174 A | 8/1985 | Gargini et al. |
| 4,461,002 A | 7/1984 | Nanko | 4,538,176 A | 8/1985 | Nakajima et al. |
| 4,461,032 A | 7/1984 | Skerlos | 4,539,676 A | 9/1985 | Lucas |
| 4,462,076 A | 7/1984 | Smith, III | 4,540,849 A | 9/1985 | Oliver |
| 4,462,078 A | 7/1984 | Ross | 4,543,616 A | 9/1985 | Brooks |
| 4,464,679 A | 8/1984 | Wargo | 4,544,963 A | 10/1985 | Jacoby et al. |
| 4,467,139 A | 8/1984 | Mollier | 4,546,382 A | 10/1985 | McKenna et al. |
| 4,467,356 A | 8/1984 | McCoy | 4,546,387 A | 10/1985 | Glaab |
| 4,468,701 A | 8/1984 | Burcher et al. | 4,547,804 A | 10/1985 | Greenberg |
| 4,471,163 A | 9/1984 | Donald et al. | 4,550,407 A | 10/1985 | Couasnon et al. |
| 4,471,164 A | 9/1984 | Henry | 4,553,252 A | 11/1985 | Egendorf |
| 4,471,352 A | 9/1984 | Soulliard et al. | 4,554,418 A | 11/1985 | Toy |
| 4,472,801 A | 9/1984 | Huang | 4,554,584 A | 11/1985 | Elam et al. |
| 4,473,824 A | 9/1984 | Claytor | 4,558,464 A | 12/1985 | O'Brien, Jr. |
| 4,475,123 A | 10/1984 | Dumbauld et al. | 4,562,306 A | 12/1985 | Chou et al. |
| 4,475,153 A | 10/1984 | Kihara et al. | 4,562,465 A | 12/1985 | Glaab |
| 4,475,189 A | 10/1984 | Herr et al. | 4,562,495 A | 12/1985 | Bond et al. |
| 4,476,535 A | 10/1984 | Loshing et al. | 4,563,702 A | 1/1986 | Heller et al. |
| 4,476,573 A | 10/1984 | Duckeck | 4,566,030 A | 1/1986 | Nickerson et al. |
| 4,477,830 A | 10/1984 | Lindman et al. | 4,566,034 A | 1/1986 | Harger et al. |
| 4,484,027 A | 11/1984 | Lee et al. | 4,567,359 A | 1/1986 | Lockwood |
| 4,484,217 A | 11/1984 | Block et al. | 4,567,512 A | 1/1986 | Abraham |
| 4,484,218 A | 11/1984 | Boland et al. | 4,570,930 A | 2/1986 | Matheson |
| 4,484,328 A | 11/1984 | Schlafly | 4,573,072 A | 2/1986 | Freeman |
| 4,486,773 A | 12/1984 | Okubo | 4,573,151 A | 2/1986 | Jotwani |
| 4,486,853 A | 12/1984 | Parsons | 4,574,305 A | 3/1986 | Campbell et al. |
| 4,488,289 A | 12/1984 | Turner | 4,575,750 A | 3/1986 | Callahan |
| 4,489,220 A | 12/1984 | Oliver | 4,577,289 A | 3/1986 | Comerford et al. |
| 4,489,316 A | 12/1984 | MacQuivey | 4,578,536 A | 3/1986 | Oliver et al. |
| 4,491,945 A | 1/1985 | Turner | 4,578,718 A | 3/1986 | Parker et al. |
| 4,491,983 A | 1/1985 | Pinnow et al. | 4,580,134 A | 4/1986 | Campbell et al. |
| 4,492,820 A | 1/1985 | Kennard et al. | 4,580,165 A | 4/1986 | Patton et al. |
| 4,494,142 A | 1/1985 | Mistry | 4,580,779 A | 4/1986 | Kanamaru et al. |
| 4,494,156 A | 1/1985 | Kadison et al. | 4,583,128 A | 4/1986 | Anderson, Jr. et al. |
| 4,494,230 A | 1/1985 | Turner | 4,584,641 A | 4/1986 | Guglielmino |
| 4,495,623 A | 1/1985 | George et al. | 4,586,134 A | 4/1986 | Norstedt |

| | | | | | |
|---|---|---|---|---|---|
| 4,588,991 A | 5/1986 | Atalla | 4,677,466 A | 6/1987 | Lert, Jr. et al. |
| 4,589,064 A | 5/1986 | Chiba et al. | 4,677,552 A | 6/1987 | Sibley, Jr. |
| 4,590,516 A | 5/1986 | Abraham | 4,677,611 A | 6/1987 | Yanosy, Jr. et al. |
| 4,591,248 A | 5/1986 | Freeman | 4,677,685 A | 6/1987 | Kurisu |
| 4,591,664 A | 5/1986 | Freeman | 4,680,581 A | 7/1987 | Kozlik et al. |
| 4,591,906 A | 5/1986 | Morales-Garza et al. | 4,680,797 A | 7/1987 | Benke et al. |
| RE32,187 E | 6/1986 | Barda et al. | 4,682,292 A | 7/1987 | Bue et al. |
| 4,593,353 A | 6/1986 | Pickholtz | 4,684,980 A | 8/1987 | Rast et al. |
| 4,593,376 A | 6/1986 | Volk | 4,685,056 A | 8/1987 | Barnsdale, Jr. et al. |
| 4,594,609 A | 6/1986 | Romao et al. | 4,685,131 A | 8/1987 | Horne |
| 4,595,950 A | 6/1986 | Löfberg | 4,688,105 A | 8/1987 | Bloch et al. |
| 4,595,951 A | 6/1986 | Filliman | 4,688,197 A | 8/1987 | Novak et al. |
| 4,595,952 A | 6/1986 | Filliman | 4,688,247 A | 8/1987 | Davidov |
| 4,596,021 A | 6/1986 | Carter et al. | 4,689,022 A | 8/1987 | Peers et al. |
| 4,597,058 A | 6/1986 | Izumi et al. | 4,689,619 A | 8/1987 | O'Brien, Jr. |
| 4,598,288 A | 7/1986 | Yarbrough et al. | 4,689,661 A | 8/1987 | Barbieri et al. |
| 4,599,611 A | 7/1986 | Bowker et al. | 4,691,351 A | 9/1987 | Hayashi et al. |
| 4,599,644 A | 7/1986 | Fischer | 4,692,817 A | 9/1987 | Theis |
| 4,599,647 A | 7/1986 | George et al. | 4,692,819 A | 9/1987 | Steele |
| 4,600,918 A | 7/1986 | Belisomi et al. | 4,694,491 A | 9/1987 | Horne et al. |
| 4,600,921 A | 7/1986 | Thomas | 4,695,879 A | 9/1987 | Weinblatt |
| 4,600,942 A | 7/1986 | Field et al. | 4,695,880 A | 9/1987 | Johnson et al. |
| 4,602,279 A | 7/1986 | Freeman | 4,695,953 A | 9/1987 | Blair et al. |
| 4,603,232 A | 7/1986 | Kurland et al. | 4,696,034 A | 9/1987 | Wiedemer |
| 4,605,964 A | 8/1986 | Chard | 4,697,281 A | 9/1987 | O'Sullivan |
| 4,605,973 A | 8/1986 | Von Kohorn | 4,701,794 A | 10/1987 | Fröling et al. |
| 4,608,456 A | 8/1986 | Paik et al. | 4,706,109 A | 11/1987 | Murray |
| 4,611,227 A | 9/1986 | Brockhurst et al. | 4,706,121 A | 11/1987 | Young |
| 4,613,901 A | 9/1986 | Gilhousen et al. | 4,706,282 A | 11/1987 | Knowd |
| 4,614,971 A | 9/1986 | Maney et al. | 4,707,828 A | 11/1987 | Yamada |
| 4,614,972 A | 9/1986 | Motsch et al. | 4,709,418 A | 11/1987 | Fox et al. |
| 4,616,262 A | 10/1986 | Toriumi et al. | 4,710,800 A | 12/1987 | Fearing et al. |
| 4,616,263 A | 10/1986 | Eichelberger | 4,710,919 A | 12/1987 | Oliver et al. |
| 4,620,224 A | 10/1986 | Lee et al. | 4,710,955 A | 12/1987 | Kauffman |
| 4,620,227 A | 10/1986 | Levin et al. | 4,712,105 A | 12/1987 | Köhler |
| 4,620,229 A | 10/1986 | Amano et al. | 4,712,238 A | 12/1987 | Gilhousen et al. |
| 4,621,259 A | 11/1986 | Schepers et al. | 4,712,239 A | 12/1987 | Frezza et al. |
| 4,621,285 A | 11/1986 | Schilling et al. | 4,713,837 A | 12/1987 | Gordon |
| 4,623,920 A | 11/1986 | Dufresne et al. | 4,716,588 A | 12/1987 | Thompson et al. |
| 4,625,235 A | 11/1986 | Watson | 4,718,107 A | 1/1988 | Hayes |
| 4,626,892 A | 12/1986 | Nortrup et al. | 4,720,819 A | 1/1988 | Pinkham et al. |
| 4,626,909 A | 12/1986 | Oniki et al. | 4,722,526 A | 2/1988 | Tovar et al. |
| 4,630,262 A | 12/1986 | Callens et al. | 4,723,302 A | 2/1988 | Fulmer et al. |
| 4,631,585 A | 12/1986 | Wine | 4,724,491 A | 2/1988 | Lambert |
| 4,633,297 A | 12/1986 | Skerlos et al. | 4,725,886 A | 2/1988 | Galumbeck et al. |
| RE32,326 E | 1/1987 | Nagel et al. | 4,728,949 A | 3/1988 | Platte et al. |
| 4,634,807 A | 1/1987 | Chorley et al. | 4,731,679 A | 3/1988 | O'Gwynn et al. |
| 4,634,808 A | 1/1987 | Moerder | 4,733,301 A | 3/1988 | Wright, Jr. |
| 4,635,121 A | 1/1987 | Hoffman et al. | 4,734,764 A | 3/1988 | Pocock et al. |
| 4,636,851 A | 1/1987 | Drury et al. | 4,734,907 A | 3/1988 | Turner |
| 4,636,858 A | 1/1987 | Hague et al. | 4,736,420 A | 4/1988 | Katznelson et al. |
| 4,638,181 A | 1/1987 | Deiss | 4,736,422 A | 4/1988 | Mason |
| 4,638,357 A | 1/1987 | Heimbach | 4,737,993 A | 4/1988 | DeVilbiss |
| 4,638,359 A | 1/1987 | Watson | 4,739,510 A | 4/1988 | Jeffers et al. |
| 4,639,779 A | 1/1987 | Greenberg | 4,740,890 A | 4/1988 | William |
| 4,639,890 A | 1/1987 | Heilveil et al. | 4,742,516 A | 5/1988 | Yamaguchi |
| 4,641,205 A | 2/1987 | Beyers, Jr. | 4,742,543 A | 5/1988 | Frederiksen |
| 4,641,253 A | 2/1987 | Mastran | 4,744,080 A | 5/1988 | Brennand et al. |
| 4,641,307 A | 2/1987 | Russell | 4,745,468 A | 5/1988 | Von Kohorn |
| 4,644,396 A | 2/1987 | Iwasaki | 4,745,549 A | 5/1988 | Hashimoto |
| 4,646,075 A | 2/1987 | Andrews et al. | 4,745,598 A | 5/1988 | Ulug |
| 4,646,145 A | 2/1987 | Percy et al. | 4,747,081 A | 5/1988 | Heilveil et al. |
| 4,647,964 A | 3/1987 | Weinblatt | 4,747,139 A | 5/1988 | Taaffe |
| 4,647,974 A | 3/1987 | Butler et al. | 4,748,560 A | 5/1988 | Kataoka |
| 4,649,533 A | 3/1987 | Chorley et al. | 4,748,619 A | 5/1988 | Vigarie et al. |
| 4,656,629 A | 4/1987 | Kondoh et al. | 4,750,036 A | 6/1988 | Martinez |
| 4,658,093 A | 4/1987 | Hellman | 4,750,213 A | 6/1988 | Novak |
| 4,658,290 A | 4/1987 | McKenna | 4,751,578 A | 6/1988 | Reiter et al. |
| 4,658,292 A | 4/1987 | Okamoto et al. | 4,751,665 A | 6/1988 | Cappello et al. |
| 4,663,735 A | 5/1987 | Novak et al. | 4,751,732 A | 6/1988 | Kamitake |
| 4,677,434 A | 6/1987 | Fascenda | 4,752,834 A | 6/1988 | Koombes |

| | | | | | | |
|---|---|---|---|---|---|---|
| 4,754,326 A | 6/1988 | Kram et al. | | 4,908,859 A | 3/1990 | Bennett et al. |
| 4,755,871 A | 7/1988 | Morales-Garza et al. | | 4,916,539 A | 4/1990 | Galumbeck |
| 4,755,883 A | 7/1988 | Uehira | | 4,926,255 A | 5/1990 | Von Kohorn |
| 4,761,646 A | 8/1988 | Choquet et al. | | 4,930,160 A | 5/1990 | Vogel |
| 4,763,317 A | 8/1988 | Lehman et al. | | 4,937,821 A | 6/1990 | Boulton |
| 4,768,087 A | 8/1988 | Taub et al. | | 4,941,040 A | 7/1990 | Pocock et al. |
| 4,768,110 A | 8/1988 | Dunlap et al. | | 4,942,616 A | 7/1990 | Linstroth et al. |
| 4,768,144 A | 8/1988 | Winter et al. | | 4,963,994 A | 10/1990 | Levine |
| 4,768,228 A | 8/1988 | Clupper et al. | | 4,969,209 A | 11/1990 | Schwob |
| 4,768,229 A | 8/1988 | Benjamin et al. | | 4,974,252 A | 11/1990 | Osborne |
| 4,771,456 A | 9/1988 | Martin et al. | | 4,977,594 A | 12/1990 | Shear |
| 4,772,887 A | 9/1988 | Dunkerton | | 4,982,430 A | 1/1991 | Frezza et al. |
| 4,774,583 A | 9/1988 | Kellar et al. | | 4,993,066 A | 2/1991 | Jenkins |
| 4,775,935 A | 10/1988 | Yourick | | 5,010,571 A | 4/1991 | Katznelson |
| 4,777,354 A | 10/1988 | Thomas | | 5,034,807 A | 7/1991 | Von Kohorn |
| 4,780,910 A | 10/1988 | Huddleston et al. | | 5,036,537 A | 7/1991 | Jeffers et al. |
| 4,782,387 A | 11/1988 | Sabri et al. | | RE33,662 E | 8/1991 | Blair et al. |
| 4,782,401 A | 11/1988 | Faerber et al. | | 5,045,848 A | 9/1991 | Fascenda |
| 4,783,846 A | 11/1988 | Wachob | | 5,050,213 A | 9/1991 | Shear |
| 4,785,420 A | 11/1988 | Little | | 5,057,915 A | 10/1991 | Von Kohorn |
| 4,786,979 A | 11/1988 | Claus et al. | | 5,060,140 A | 10/1991 | Brown et al. |
| 4,787,063 A | 11/1988 | Muguet | | RE33,808 E | 1/1992 | Wright, Jr. |
| 4,787,085 A | 11/1988 | Suto et al. | | 5,083,271 A | 1/1992 | Thacher et al. |
| 4,789,863 A | 12/1988 | Bush | | 5,089,885 A | 2/1992 | Clark |
| 4,792,849 A | 12/1988 | McCalley et al. | | 5,099,348 A | 3/1992 | Huddleston et al. |
| 4,792,973 A | 12/1988 | Gilhousen et al. | | 5,128,752 A | 7/1992 | Von Kohorn |
| RE32,835 E | 1/1989 | Howard | | RE34,034 E | 8/1992 | O'Sullivan |
| 4,796,181 A | 1/1989 | Wiedmer | | 5,140,419 A | 8/1992 | Galumbeck et al. |
| 4,802,114 A | 1/1989 | Sogame | | 5,144,663 A | 9/1992 | Kudelski et al. |
| 4,803,725 A | 2/1989 | Horne et al. | | 5,152,011 A | 9/1992 | Schwob |
| 4,805,014 A | 2/1989 | Sahara et al. | | 5,152,012 A | 9/1992 | Schwob |
| 4,805,020 A | 2/1989 | Greenberg | | 5,163,024 A | 11/1992 | Heilveil et al. |
| 4,809,267 A | 2/1989 | Higuchi et al. | | 5,172,111 A | 12/1992 | Olivo, Jr. |
| 4,809,274 A | 2/1989 | Walker et al. | | 5,177,604 A | 1/1993 | Martinez |
| 4,812,843 A | 3/1989 | Champion, III et al. | | 5,191,410 A | 3/1993 | McCalley et al. |
| 4,813,011 A | 3/1989 | Kulakowski et al. | | 5,195,092 A | 3/1993 | Wilson et al. |
| 4,814,756 A | 3/1989 | Chauvel | | 5,208,665 A | 5/1993 | McCalley et al. |
| 4,815,129 A | 3/1989 | Griffin et al. | | 5,216,552 A | 6/1993 | Dunlap et al. |
| 4,816,904 A | 3/1989 | McKenna et al. | | 5,227,874 A | 7/1993 | Von Kohorn |
| 4,816,905 A | 3/1989 | Tweedy et al. | | 5,283,734 A | 2/1994 | Von Kohorn |
| 4,821,032 A | 4/1989 | Shimada et al. | | | | |
| 4,821,102 A | 4/1989 | Ichikawa et al. | | | FOREIGN PATENT DOCUMENTS | |
| 4,825,050 A | 4/1989 | Griffith et al. | CA | 1189612 | 6/1985 | |
| 4,827,508 A | 5/1989 | Shear | CA | 1216977 | 1/1987 | |
| 4,829,372 A | 5/1989 | McCalley et al. | DE | 2058681 | 6/1972 | |
| 4,831,526 A | 5/1989 | Luchs et al. | DE | 2338380 | 2/1975 | |
| 4,833,710 A | 5/1989 | Hirashima | DE | 2356969 | 5/1975 | |
| 4,835,777 A | 5/1989 | DeLuca et al. | DE | 2453441 | 5/1976 | |
| 4,837,858 A | 6/1989 | Ablay et al. | DE | 2550624 | 5/1977 | |
| 4,841,386 A | 6/1989 | Schiering | DE | 2904981 | 8/1979 | |
| 4,843,482 A | 6/1989 | Hegendorfer | DE | 2823175 | 11/1979 | |
| D302,178 S | 7/1989 | King | DE | 2831014 | 4/1980 | |
| 4,845,491 A | 7/1989 | Fascenda et al. | DE | 2918846 | 11/1980 | |
| 4,847,698 A | 7/1989 | Freeman | DE | 2853764 | 1/1981 | |
| 4,847,699 A | 7/1989 | Freeman | DE | 3020787 | 12/1981 | |
| 4,847,700 A | 7/1989 | Freeman | DE | 3039949 | 5/1982 | |
| 4,855,842 A | 8/1989 | Hayes et al. | DE | 3112249 | 10/1982 | |
| 4,860,379 A | 8/1989 | Schoeneberger et al. | DE | 3143627 | 5/1983 | |
| 4,862,268 A | 8/1989 | Campbell et al. | DE | 3328001 | 2/1985 | |
| 4,866,706 A | 9/1989 | Christophersen et al. | DE | 3335082 | 4/1985 | |
| 4,868,866 A | 9/1989 | Williams, Jr. | DE | 3337204 | 4/1985 | |
| 4,876,592 A | 10/1989 | Von Kohorn | EP | 20242 | 12/1980 | |
| 4,879,611 A | 11/1989 | Fukui et al. | EP | 46108 | 2/1982 | |
| 4,885,579 A | 12/1989 | Sandbank | EP | 49184 | 4/1982 | |
| 4,885,775 A | 12/1989 | Lucas | EP | 55167 | 6/1982 | |
| 4,887,172 A | 12/1989 | Steele | EP | 55674 | 7/1982 | |
| 4,888,796 A | 12/1989 | Olivo, Jr. | EP | 56649 | 7/1982 | |
| 4,890,321 A | 12/1989 | Seth-Smith et al. | EP | 77712 | 4/1983 | |
| 4,893,248 A | 1/1990 | Pitts et al. | EP | 78185 | 5/1983 | |
| RE33,189 E | 3/1990 | Lee et al. | EP | 103438 | 3/1984 | |
| 4,908,713 A | 3/1990 | Levine | EP | 128481 | 12/1984 | |

| | | |
|---|---|---|
| EP | 132007 | 1/1985 |
| EP | 133985 | 3/1985 |
| EP | 152251 | 8/1985 |
| EP | 187417 | 7/1986 |
| EP | 206821 | 12/1986 |
| EP | 217308 | 4/1987 |
| FR | 2417226 | 2/1979 |
| FR | 2496376 | 6/1982 |
| FR | 2516733 | 5/1983 |
| GB | 857862 | 1/1961 |
| GB | 959274 | 5/1964 |
| GB | 1066931 | 4/1967 |
| GB | 1204190 | 9/1970 |
| GB | 1213357 | 11/1970 |
| GB | 1370535 | 10/1974 |
| GB | 1396981 | 6/1975 |
| GB | 1515309 | 6/1978 |
| GB | 1523307 | 8/1978 |
| GB | 2016874 | 2/1979 |
| GB | 1543502 | 4/1979 |
| GB | 1554411 | 10/1979 |
| GB | 1556366 | 11/1979 |
| GB | 2033699 | 5/1980 |
| GB | 2034995 | 6/1980 |
| GB | 1582563 | 1/1981 |
| GB | 2051527 | 1/1981 |
| GB | 1584111 | 2/1981 |
| GB | 2067379 | 7/1981 |
| GB | 2081948 | 2/1982 |
| GB | 2090504 | 7/1982 |
| GB | 2103455 | 2/1983 |
| GB | 2155283 | 9/1983 |
| GB | 2126002 | 3/1984 |
| GB | 2140963 | 12/1984 |
| GB | 2141897 | 1/1985 |
| GB | 2164229 | 3/1986 |
| GB | 2167917 | 6/1986 |
| GB | 2185670 | 7/1987 |
| JP | 53-11515 | 2/1978 |
| JP | 53-068124 | 6/1978 |
| JP | 53-121420 | 10/1978 |
| JP | 55-26792 | 2/1980 |
| JP | 55-028691 | 2/1980 |
| JP | 55-045248 | * 3/1980 |
| JP | 55-49084 | 4/1980 |
| JP | 55-79585 | 6/1980 |
| JP | 55-500886 | 10/1980 |
| JP | 56-47179 | 4/1981 |
| JP | 56-51161 | 5/1981 |
| JP | 56-116385 | 9/1981 |
| JP | 57-199377 | 12/1982 |
| JP | 58-156279 | 9/1983 |
| JP | 58-209276 | 12/1983 |
| JP | 59-154886 | 9/1984 |
| JP | 59-224988 | 12/1984 |
| JP | 60-61935 | 4/1985 |
| JP | 60-123182 | 7/1985 |
| JP | 60-146587 | 8/1985 |
| JP | 60-149281 | 8/1985 |
| JP | 60-256289 | 12/1985 |
| JP | 61-50470 | 3/1986 |
| JP | 61-148988 | 7/1986 |
| JP | 61-174889 | 8/1986 |
| JP | 61-236284 | 10/1986 |
| JP | 61-267474 | 11/1986 |
| JP | 62-12285 | 1/1987 |
| JP | 62-060378 | 3/1987 |
| PL | 204525 | 2/1978 |
| WO | WO 80/00292 | 2/1980 |
| WO | WO 80/02093 | 10/1980 |
| WO | WO 80/02901 | 12/1980 |
| WO | WO 81/02961 | 10/1981 |
| WO | WO 83/00789 | 3/1983 |
| WO | WO 85/03604 | 8/1985 |
| WO | WO 85/03830 | 8/1985 |
| WO | WO 87/04884 | 8/1987 |

OTHER PUBLICATIONS

Marti, "Broadcast Text Information in France", 1980.*
CBS, "Petition for Rulemaking", Jul. 29, 1980.*
Federal Register, pp. 60851–60859, Dec. 14, 1981.*
CBS, "Petition for Rulemaking", filed with the FCC on Jul. 29, 1981.*
Letter from the FCC to Senator Jackson dated Aug. 26, 1980, pp. 1–2.*
Reply/Comment to CBS petition filed with the FCC on Oct. 2, 1980 by GTE Telenet Communications Corporation, pp. 1–9.*
Reply/comment to CBS petition filed with the FCCC on Oct. 9, 1980 by the "Subscriptionn Television Association", pp. 1–2.*
"landmark Forms Cable Weather News Network," Editor & Publisher, Aug. 8, 1981, p. 15.*
Smart Digital TV Sets May Replace The Boob Tube, Business Week, Sep. 26, 1983, p. 160, 2 pages.
. . . the Recordable Laser Videodisc—RLV, product description , Optical Disc Corporation , 2 pages.
1981 Annual Report, Quotron Systems, Inc.
1983 Annual Report, Quotron Systems, Inc.
Kinghorn, J.R., "New Features in World System Teletext," IEEE Transactions on Consumer Electronics, Aug. 1984, vol. CE–30, No. 3, pp. 437–440.
1986 Annual Report to Shareowners, Customers and Employees, The Dun & Bradstreet Corporation.
"7609 Sat–A–Dal Decoder/Controller," Group W Satellite Communications (advertisement) 2 pages.
A Touch–Screen Disc (Devlin Interviews the Producer), reprinted from E&ITV magazine, vol. 16, No. 5, May 1984, 4 pages.
A Videotex Pioneer Pushes Into The U.S. Market, Business Week, Apr. 16, 1984, p. 63.
UCSD p–System Languages, Version IV UCSD Pascal, Fortran–77, Basic and Assembler, Softech Microsystems, product description, 2 pages.
"Advanced Minicomputer–based Systems for Banking and Financial Institutions," Money Management Systems, Incorporated, brochure, 1980, 9 pages.
"Advanced Transmission Techniques," SMPTE Journal, Report on the 121st Technical Conference, Jan. 1980, vol. 89, pp. 31–32.
Advertisers Guide to Cable TV Terms, brochure, Cable Ad Associates, Inc.
Advertising On Cable "Automatic Commercial Insertion–Plus–Automatic Print–Out Verification With the New Ad Machine and Ad Log," Advertisement, Tele–Engineering Corporation, 4 pages.
Allen Communication Introduces Integrated Interactive Video Systems, brochure, 2 pages.
Allen Communication Price List, Allen Communication, 1 page.
"American National Standard" "dimensions of video, audio and tracking control records on 2–in video magnetic tape quadruplex recorded at 15 and 7.5 in/s," SMPTE Journal, Oct. 1981, pp. 988–989.

"American National Standard" "time and control code for video and audio tape for 525–line/60–field television systems," SMPTE Journal, Aug. 1981, pp. 716–717.
Baldwin, J. L. E., et al., "A Standards Converter Using Digital Techniques," IBA Technical Review, vol. 3, Jun. 1973, Digital Television, pp. 15–35.
"Anderson: Progress Committee Report for 1979—Television," SMPTE Journal, May 1980, vol. 89, pp. 324–328.
Annual Index 1982, SMPTE Journal, vol. 91, Jan.–Dec. 1982, pp. 1253–1263.
Application of Direct Broadcast Satellite Corporation for a Direct Broadcast Satellite System, Before the Federal Communications Commission, Washington, D.C., Gen. Docket No. 80–603, Jul. 16, 1981.
Applications Information VCR–3001A Universal Videocassette Control Module, Channelmatic, Inc., product description, 5 pages, Mar. 1984.
Art To Go "The Business Builder in a Box," advertisement, Multi–Image Systems, 1 page.
"Asynchronous Data Transmission System Series 2100 Vidata," Wagener Communications, Inc. (advertisement), 2 pages.
At Sequent Computer, One Size Fits All, Business Week, Sep. 17, 1984, 1 page.
Audio Level Detector ALD–3000A, Channelmatic, Inc., product description, Mar. 1984, 1 page.
Hawker, P., "An Introduction to Integrated Circuits and Digital Electronics," IBA Technical Review, vol. 3, Jun. 1973, Digital Television, pp. 5–13.
Audio–Video Emergency Alert System, Channelmatic, Inc., product description, Mar. 1984, 2 pages.
Automation, Control and Monitoring Systems, brochure, Jasmin Electronics Limited.
Brighton's Experience with Software for Broadcast (Draft) 1981.
Broadcast Break Sequencer Model BBS–3006A, Channelmatic, Inc., product description, Mar. 1984, 1 page.
Broadcast Quality Random Access Commercial Insert System Featuring the Channelmatic Spotmatic Z, Channelmatic, Inc., product description, 1 page.
Broadcasting Services, brochure, PSN, Private Satellite Network, Inc., 6 pages.
Broadway Video, Brochure, Feb. 1987.
Business news breakthrough from Dow Jones, advertisement, The Wall Street Journal, Jun. 10, 1982, p. 47.
Business Television Services, Irwin Communications, Inc., brochure, 1 page.
Business Television "Changing the Way America Does Business," PSN, 1986.
C–100 Series Micro Earth Stations for Satelite Data Distribution, product description, Equatorial Communications Company, 4 pages.
C–200 Micro Earth Station for Satellite Data Communications, product description, Equatorial Communications Company, 3 pages.
Cable Audience Measurement Study, A Prospectus based upon recommendations of the Ad Hoc Cable Measurement Committee, pamphlet.
Cable TV Advertising, Paul Kogan Associates, Inc., No. 22, Feb. 18, 1981, 6 pages.
Camp, Arbitron Cable, The Arbitron Company, product brochure, May 1980, 8 pages.

Channelmatic ADA–1A, ADA–2A, ADA–3A Audio Distribution Amplifier, Channelmatic, Inc., product description, 1 page.
Channelmatic ADA–3006A Audio Distribution Amplifier, Channelmatic, Inc., product description, 1 page.
Channelmatic AVS–10A Patchmaster, Channelmatic, Inc., product description, 2 pages.
Channelmatic BBX–1A Billbox Bypass and Test Switcher, Channelmatic, Inc., product description, 2 pages.
Channelmatic CMG–3008A 8–Page Color Message Generator Module, Channelmatic, Inc., product description, 1 page.
Channelmatic PCM–3000A Superclock Programmable Controller Module Channelmatic, Inc., product description, 2 pages.
Channelmatic SDA–1A Sync Stripping Pulse Distribution Amplifier, Channelmatic, Inc., product description, 1 page.
Channelmatic Spotmatic Random Access Commercial Insert System, Channelmatic, Inc., product description, Jul. 1983.
Channelmatic Television Switching and Control Equipment 3000 Series, Channelmatic, Inc., product descriptions, 1984.
Channelmatic UAA–6A Universal Audio Amplifier, Channelmatic, Inc., product description, 1 page.
Channelmatic VDA–1A, VDA–2A, VDA–3A Video Distribution Amplifier, Channelmatic, Inc., product description, 1 page.
Channelmatic VDA–3006A Video Distribution Amplifier, Channelmatic, Inc., product description, 1 page.
Channelmatic's Handimod I, Channelmatic, Inc., product description, 2 pages.
Charting A More Profitable Course For Your Portfolio, advertisement, Dow Jones News/Retrieval, The Wall Street Journal, Jun. 24, 1982, p. 40.
CIS–1A Spotmatic Jr. & CIS–2A Li'l Moneymaker, Channelmatic, Inc., Installation and Operations Guide, 950–0066–00, V1.0.
City of Seal Beach Channel Utilization Guide, 3 pages.
Clock Switching System Model CCS–3000A–1, Channelmatic, Inc., product description, Mar. 1984, 1 page.
"Colloquium on Broadcast and Wired Teletext Systems—Ceefax, Oracle, Viewdata," Tuesday, Jan. 13, 1976, IEE Electronics Division, Professional Group E14 (Television and Sound), Digest No. 1976/3.
"Colormax Cable captioning—16,000,000 Subs Need It!," Colormax Electronic Corp. (advertisement), 3 pages.
Computer Controls for Video Production, EECO EECODER Still–Frame Decoder VAC–300, product brochure, 1984, 4 pages.
Comsat's STC: Poised for blastoff into TV's space frontier, Broadcasting, Feb. 22, 1982, pp. 38–45.
Consumer Electronics: A $40–Billion American Industry, a report prepared by Arthur D. Little, Inc. for the Electronic Industries Association/Consumer Electronics Group, Apr. 1985.
Consumer Systems Industry Service, research notes, Gartner Group, Inc., Jun. 22, 1983, 13 pages.
"Context" A Complete Teletext Origination System Developed By Logica and the BBC, Advertisement, 8 pages.
"Contraband code," Closed Circuit, Broadcasting, Sep. 28, 1970, 1 page.
Corporate Capabilities, Irwin Communications, Inc., brochure, 1 page.
Correspondence School Via Computer Is Planned, The New York Times, Sep. 13, 1983, 1 page.

CVS–3000A Commercial Verification System, Channelmatic, Inc., product description, Mar. 1984, 1 page.
Data Communications Network Description, product description, Equatorial Communications Company, 5 pages.
Hutt, P., "A System of Data Transmission in the Field Blanking Period of the Television Signal," IBA Technical Review, Jun. 1973, Digital Television, pp. 37–44.
Development Software, Visage, Inc., product description, 4 pages.
Did the ad run?, Media Decisions, Jul. 1969, pp. 44 et seq.
Digisonics pushes its coding method, Broadcasting, Dec. 7, 1970, p. 37.
Digisonics TV Monitor System Finds Defenders, Advertising Age, Dec. 8, 1969, 1 page.
Digisonics violated standards, says BAR, Broadcasting, Oct. 5, 1970, pp. 21–23.
Digisonics' Aim Is Info Bank, Not Just Proof of Performance, Advertising Age, Nov. 9, 1970, 4 pages.
Digisonics' dilemma, Media Decisions, Jun. 1971, 6 pages.
Digital TV set to burst on U.S. mart, New York Post, 2 pages.
"Do You Want to be Making $5–$10 a Subscriber—Right Now? Join Us In Our Success!", Advertisement, Multi–Image Systems.
Dow Jones Cable Information Services, Company Brochure, 1982.
Dow Jones Cable News Service Daily Features Financial Markets, product summary, 1 page.
Dowalert, Brochure, 1983, 6 pages.
E.F. Hutton to Start A Videotex Service, newspaper article, 1 page.
eca, brochure, Effective Communication Arts, Inc., 4 pages.
Electronic Surveys, Inc. Signs NTN Contract, News Release, NTN Communications, Inc. Carlsbad, CA, 2 pages.
Elite 2000 Creation System, IBM Compatible Information Display System, advertisement, Display Systems International, Inc., 1 page.
ELRA Group Cablemark Reports vol. 1, SAT Guide, Feb. 1982, 1 page.
Ethernet, 10mbit per second Local Area Network, Silicon Graphics, Inc., product specification, 2 pages.
Eurom—a single–chip c.r.t. controller for videotex, Mullard, Technical publication, 1984, 12 pages.
Eurom "A display IC for CEPT Videotex," Mullard, product information, Feb. 1984, 6 pages.
European Security Prices Are Now Available As New Service From Quotron Systems, News Release, Sep. 21, 1984, 1 page.
Everything you've always wanted to know about TV Ratings, A.C. Nielsen Company, brochure, 1978.
"Digisonics pushes its coding method," Broadcasting, Dec. 7, 1970, p. 37.
"Digisonics violated standards, says BAR," Broadcasting, Oct. 5, 1970, pp. 21–23.
Fast Forth "No Other Forth Comes Close," IEV Corporation, product brochure.
Few Things In Life Work As Well As Tapscan, advertisement, Tapscan Incorporated, 6 pages.
Financial News Network Eyeing Teletext Service Tied To Home Computers, International Videotex Teletext News, Dec. 1983, 1 page.
Financial News Network The Business Connection, brochure, Financial News Network, 8 pages.
Five Authoring Languages Now Available For Use With Visage Interactive Video Systems, Visage News Release, Visage, Inc., Mar. 18, 1985, 5 pages.
Flexible programmieren mit VPS, Funkschau, (German publication), 1985. (translation provided).
FNN Financial News Network, advertisement, brief review of research from the Standard Research Institute's VALS study, and research from ELRA Group Cablemark Reports vol. I, 4 pages.
Four–Channel Commercial Insert System Featuring the Channelmatic CIS–1A Spotmatic Jr, Channelmatic, Inc., product description, 1 page.
GraphOver 9500, Hi–Res Graphics Overlays for NTSC Video, New Media Graphics, product description, 1983, 4 pages.
GraphOver 9500, Hi–Res Hi–Speed Graphics Overlays For Videodisc, New Media Graphics, product description, 1985, 4 pages.
High Technology, Business Week, Jan. 11, 1982, pp. 74–79.
Highlights, SMPTE Journal, Jan. 1986, p. 3.
Highlights, SMPTE, SMPTE Journal, Apr. 1983, p. 355.
Highlights, SMPTE, SMPTE Journal, Apr. 1985, p. 361.
Highlights, SMPTE, SMPTE Journal, Aug. 1983, p. 803.
Highlights, SMPTE, SMPTE Journal, Aug. 1985, p. 801.
Highlights, SMPTE, SMPTE Journal, Dec. 1983, p. 1269.
Highlights, SMPTE, SMPTE Journal, Feb. 1983, p. 163.
Highlights, SMPTE, SMPTE Journal, Feb. 1985, p. 181.
Highlights, SMPTE, SMPTE Journal, Jan. 1984, p. 3.
Highlights, SMPTE, SMPTE Journal, Jan. 1985, p. 3.
Highlights, SMPTE, SMPTE Journal, Jul. 1983, p. 715.
Highlights, SMPTE, SMPTE Journal, Jul. 1985, p. 721.
Highlights, SMPTE, SMPTE Journal, Jun. 1983, p. 627.
Highlights, SMPTE, SMPTE Journal, Jun. 1985, p. 641.
Highlights, SMPTE, SMPTE Journal, Mar. 1983, p. 267.
Highlights, SMPTE, SMPTE Journal, Mar. 1985, p. 265.
Highlights, SMPTE, SMPTE Journal, May 1983, p. 547.
Highlights, SMPTE, SMPTE Journal, May 1985, p. 545.
Highlights, SMPTE, SMPTE Journal, Nov. 1983, p. 1173.
Highlights, SMPTE, SMPTE Journal, Oct. 1983, p. 1027.
Highlights, SMPTE, SMPTE Journal, Sep. 1983, p. 907.
Highlights, SMPTE Journal, Dec. 1985, p. 1243.
Highlights, SMPTE Journal, Nov. 1985, p. 1155.
Highlights, SMPTE Journal, Oct. 1985, p. 1001.
Highlights, SMPTE Journal, Sep. 1985, p. 881.
Hitachi CD–ROM Drive CDR–1502S, product description, Hitachi, Ltd., 6 pages.
Hitachi New CD–ROM Drive CDR–2500, product description, Hitachi, Ltd., 2 pages.
Homecast, A Consumer Market Service from ICM Services, Chase Econometrics, product brochure, 2 pages.
How personal computers can backfire, Business Week, Jul. 12, 1982, pp. 56–59.
How to find the pot of gold at the end of this rainbow, Scotch Videodisc, 3M, brochure.
"Digisonics' Aim Is Info Bank, Not Just Proof of Performance," Advertising Age, Nov. 9, 1970, 4 pages.
How to increase training productivity through Videodisc and Microcomputer systems, seminar brochure, 1981.
IDC begins monitoring, At Deadline, Broadcasting, Sep. 14, 1970, p. 9.
IDC encoding system still alive at FCC, Broadcasting, Sep. 27, 1971, p. 31.
IEV Graphics and Interactive Video Products, IEV Corporation, product information, 1 page.

IEV–10 A Direct Replacement for the IBM Color/Graphics Adapter Card with Video Overlay Capability, IEV Corporation, product description, 1 page.

IEV–20 High–Resolution Color Graphics For The IBM–PC, IEV Corporation, product description, 1 page.

IEV–40 Graphics Overlay and Video Disc and Tape Control for the IBM–PC, IEV Corporation, product description, 1 page.

IIAT International Institute of Applied Technology, Inc., company description, 4 pages.

IIAT ST–1000A IIAT Training Station, product description, IIAT, International Institute of Applied Technology, Inc., 2 pages.

IIAT ST–1000B IIAT Training Station, product description, IIAT, International Institute of Applied Technology, Inc., 2 pages.

Imager monitors the bloodstream, High Technology, Mar. 1987, 1 page.

In this corner, Digisonics!, Media Decisions, Jun. 1968, 5 pages.

Index to SMPTE–Sponsored American National Standards and Society Recommended Practices and Engineering Guidelines, SMPTE Journal, Annual Index 1987, pp. 1258, 1260–1262.

Index to SMPTE–Sponsored American National Standards, Society Recommended Practices, and Engineering Committee Recommendations, 1980 Index to SMPTE Journal, pp. I–15 to I–20.

Index to Subjects—Jan.–Dec. 1976—vol. 85, 1976 index to SMPTE Journal, SMPTE Journal, vol. 85, pp. I–5 to I–13, I–15.

Index to Subjects—Jan.–Dec. 1977—vol. 86, 1977 Index to SMPTE Journal, SMPTE Journal, vol. 86, pp. I–5 to I–14.

Index to Subjects—Jan.–Dec. 1979• vol. 88, 1979 Index to SMPTE Journal, SMPTE Journal, vol. 88, pp. I–4 to I–10.

Index to Subjects—Jan.–Dec. 1980• vol. 89, 1980 Index to SMPTE Journal, SMPTE Journal, pp. I–5 to I–11.

Index to Subjects—Jan.–Dec. 1985• vol. 94, Annual Index 1985, SMPTE Journal, pp. 1351–1357.

Index to Subjects—Jan.–Dec. 1983• vol. 92, Annual Index 1983; SMPTE Journal, pp. 1385–1391.

Index to Subjects—Jan.–Dec. 1984• vol. 93, Annual Index, SMPTE Journal, pp. 1211–1217.

Index to vol. 87 Jan.–Dec. 1978, SMPTE Journal, Part II to Jan. 1979 SMPTE Journal, pp. I–1, I–4 to I–14.

Industrial Skills Training With The Touch Of A Finger . . . Introducing . . . Activ, Advariced Concepts In Touch–Interactive Video, advertisement, Industrial Training Corporation, 4 pages.

Information Package For MDS Applicants, Department of Communications Radio Frequency Management Division, Oct. 1986.

Inter Active Video from . . . , BCD Associates, brochure, 1985.

Interactive Data Communication Network Services, product description, Equatorial Communications Company, 3 pages.

Interactive Football For The Home, Advertisemnet, U.S. Videotel, 2 pages.

Interactive Video Served on a disc, Scotch Laser Videodisc, 3M, brochure, 8 pages.

Interactive Videodisc In Education And Training, Seventh Annual Conference, Society For Applied Learning Technology, conference agenda, Aug. 1985.

Interactive Videodisc In Education And Training, Sixth Annual Conference, Society For Applied Learning Technology, conference agenda, Aug. 1984, 2 pages.

Introducing DowAlert, brochure, 1982, 8 pages.

Introducing RSVP: The latest breakthrough for cable!, advertisement, Arbitron, 1 page.

Introducing Spot Data, "Cable Ad Sales Just Got Better," advertisement, TV Data Technologies, 4 pages.

Iris 1000/1200, High Performance Geometry Terminals, Silicon Graphics, Inc., product specification, 2 pages.

Iris 1400, High Performance Geometry Computer, Silicon Graphics, Inc., product specification, 2 pages.

Iris 1500, High Performance Geometry Computer, Silicon Graphics, Inc., product specification, 2 pages.

Iris Graphics Library, Programming Support for Iris Systems, Silicon Graphics, Inc., product specification, 1 page.

Jasmin Process Control Systems, advertisement, Jasmin Electronics Limited, 4 pages.

Jasmin Teletext Systems, advertisement, Jasmin Electronics Limited, 4 pages.

Jasmin, company brochure, Jasmin Electronics Limited, 4 pages.

KBTV Kodak Business TeleVision, Kodak, brochure, Sep. 1987.

"Digisonics' dilemma," Media Decisions, Jun. 1971, 6 pages.

"Everything you've always wanted to know about TV Ratings," A.C. Nielsen Company, brochure, 1978.

"Landmark forms cable weather news network," Editor & Publisher, (Aug. 8, 1981) p. 15.

Laserdata Announces Trio Encoder at the Salt Show, News release, Aug. 21, 1985, 3 pages.

Laserdata Still Frame Audio Premastering Guide, advertisement, 3 pages.

Laserdata Trio Encoder Product Description, product description, 4 pages.

LD–V6000, Industrial Laserdisc Player, A Technical Perspective, Pioneer Video, Inc., May 1984.

Listener, Closed Circuit, Broadcasting, 1 page.

Local Program Playback System Featuring the Channelmatic VCR–3005A–5 Videocassette Sequencer, Channelmatic, Inc., product description, 1 page.

"IDC encoding system still alive at FCC," Broadcasting, Sep. 27, 1971, p. 31.

Management With The Nielsen Retail Index System, A.C. Nielsen Company, 1980.

Measuring The Cable Audience, Ogilvy & Mather, Advertising, 1980, pp. H1–H8.

Mediastar, "the message is clear," brochure, Multi–Image Systems, 6 pages.

Merrill Lynch Advanced Applications Systems, Advanced Automation Systems Department, system description, publication date unknown.

Merrill Lynch and IBM Form Joint Venture To Market Financial Data Systems and Services, News Release, Mar. 1984, 2 pages.

Merrill Lynch bullish on new data service, Electronic Media, Feb. 28, 1985, p. 4.

Merrill Lynch Joins I. B. M. In Venture, The New York Times, Mar. 22, 1984, 1 page.

Merrill Lynch Plans Stock–Quote Service Linked to IBM's PC, The Wall Street Journal, Mar. 21, 1984, p. 60.

Merrill Lynch sinks $4M into FNN's Data Cast service, Cable Vision, Mar. 11, 1985, p. 23.

Micro Key System, Video Associates Labs, product description.
"In this corner, Digisonics!", Media Decisions, Jun. 1968, 5 pages.
Model 60 Graphics Overlay and Disc or Tape Controller, IEV Corporation, product description, 1 page.
Most Valuable Peripheral, product description, Allen Communication, 2 pages.
"Multi–Level Teletext and Interactive Videotex," Operational Systems Worldwide, Information Sheets.
Museum Image Series, product information, Online Products Corporation, 2 pages.
New Horizons In Interactive Video, Puffin product advertisement, IEV Corporation, 2 pages.
New In Teleconferencing Resources, advertisement, Parker Associates, 4 pages.
New Publications for 1987 from The Videodisc Monitor, advertisement, 2 pages.
No Digisonics friends show in comments, Broadcasting, May 24, 1971, p. 62.
Now The Future Is Clear, Visage Visual Information Systems, brochure, Visage, Inc., 4 pages.
Now You Can Find Just The Right Image Every Time Quickly and Easily with Image Search and The IBM PC/XT, advertisement, Online Computer Systems, Inc., 1 page.
Now you can get the precise business and financial news you want . . . throughout the business day. "Dow Alert," brochure, 1982.
"Now," World System Teletext, Advertisement, 6 pages.
NTN—The Company, NTN Communications, Inc., company description, 1 page.
NTN Communications, Inc. Entertainment Network Program Schedule, Advertisement, NTN Communications, Inc., 2 pages.
NTN Programming, Advertisement, NTN Communications, Inc., 2 pages.
ODC 610 Videodisc Recording System, product description, Optical Disc Corporation, 2 pages.
ODC 612 Encoder/Generator, product description, Optical Disc Corporation, 2 pages.
Off–the–shelf raster scan display generator creates composite video image, reprinted by Defense Systems Review and Military Communications, Jan. 1985, p. 55.
Omega Vision, product description, Omega Management Group Corp., 2 pages.
PBS Project With Merrill, newsarticle, Apr. 4, 1983.
PC Trio, Laserdata, product description, 2 pages.
PC–GraphOver, Interactive Video With Graphics Overlays, New Media Graphics, product description, 1985, 4 pages.
PC–VideoGraph, Hi–Res PC Graphics For Videotaping or Display, New Media Graphics, product description, 1985, 4 pages.
People Meters, The New Yorker, pp. 24–25, Mar. 2, 1987.
Personal Portfolio Button, brochure, JS&A, 1982.
Pilot plus Course Authoring Interpreter, IIAT Products, product description, 1 page.
PL–1A Price List, 3000 Series Equipment, Channelmatic, Inc., Feb. 1985, 2 pages.
PL–2B 1000 Series Price List, 1.75×19 Inch Rack Mounting, Channelmatic, Inc., Jul. 1985.
PL–3A Price List Videocassette Changers, Channelmatic, Inc., Nov. 1984, 1 page.
PL–5A Price List Typical Systems, Channelmatic, Inc., Nov. 1984.

Point–To–Multipoint Data Communication Network Services, product description, Equatorial Communications Company, 5 pages.
Preliminary List of Papers, SMPTE Journal, Sep. 1980, vol. 89, p. 677.
Pro 68 Advanced Technology 16/32 Bit Co–Processor For IBM PC, PC/XT, PC/AT, and Capatibles, Hallock Systems Company Inc., product description, 7 pages.
Pro 68 Software Facts, Hallock Systems Company, Inc., product description, 6 pages.
Pro CAD A Pro 68 Software Product, Hallock Systems Company, Inc., product description, 4 pages.
Products From The VideoDisc Monitor, order form, 2 pages.
Proposed American National Standard for component digital video recording—19–mm type D–1 cassette–tape cassette, SMPTE Journal, Mar. 1986, pp. 362–363.
Proposed SMPTE Recommended Practice "Vertical Interval Time and Control Code for Video Tape for 525–Line/ 60–Field Television Systems," SMPTE Journal, Sep. 1981, pp. 800–801.
Proposed SMPTE Recommended Practice, Control Message Architecture, SMPTE Journal, Sep. 1985, pp. 990–991.
Proposed SMPTE Recommended Practice, Data Tracks on Low–Dispersion Magnetic Coatings on 35–mm Motion–Picture Film, SMPTE Journal, Aug. 1985, pp. 877–878.
Proposed SMPTE Recommended Practice, Storage of Edit Decision Lists on 8–in. Flexible Diskette Media, SMPTE Journal, Mar. 1985, pp. 353–354.
Video Hi–Tech Component TV, CV 1950, CV 510, CV 540, CV 520, CV 150, advertisement, Zenith Radio Corporation, 4 pages.
Proposed SMPTE Recommended Practice, Time and Control Codes for 24, 25, or 30 Frame–Per–Second Motion–Picture Systems, SMPTE Journal, Aug. 1985, pp. 874–876.
Proposed SMPTE Recommended Practice, Tributary Interconnection, SMPTE Journal, Sep. 1985, pp. 992–995.
PSN Signs Fourth High Technology Customer As Amdahl Corporation Implements Business Television, PSN News, News Release, Private Satellite Network, Inc., 2 pages.
Publishers Go Electronic, Business Week, Jun. 11, 1984, pp. 84–97.
"Index to Subjects–Jan.–Dec. 1977 • Volume 86," Index to SMPTE Journal, SMPTE Journal, vol. 86, pp. I–5 to I–14.
Quotron's Central Position In Statistics Service Is Facing Competition From Challengers, The Wall Street Journal, Feb. 2, 1984, p. 59.
Ratings Brawl (Is Nielsen losing its grip?) Time, p. 57, Jul. 20, 1987.
Ratings War, Forbes, Aug. 1, 1983, 1 page.
Round Two For Home Computer Makers, Business Week, Sep. 19, 1983, pp. 93–95.
"Index to Subjects—Jan. –Dec. 1979 • Volume 88," 1979 Index to SMPTE Journal, SMPTE Journal, vol. 88, pp. I–4 to I–10.
Satellite–Delivered Text Service Signs 4 Carriers, Multichannel News, Jun. 18, 1984, p. 18.
Second Senior Executive Conference on Productivity Improvement, SALT, Society for Applied Learning Technology, Dec. 4–6, 1986.
Series 3000 Satellite Receiver Controllers, Channelmatic, Inc., product description, 2 pages.
Serious Software Helps the Home Computer GrowUp, Business Week, Jun. 11, 1984, pp. 114–118.

Show or Tell?, Advertising material, The Weather Star 4000, The Weather Channel, 8 pages.
SMPTE Journal Five–Year Index 1971–1975, SMPTE Journal.
SMPTE Journal Five–Year Index 1976–1980, SMPTE Journal.
SMPTE Journal Five–Year Index 1981–1985, SMPTE Journal, vol. 95, No. 1, Jan. 1986.
SMPTE Journal Five–Year Index 1986–1990, SMPTE Journal, vol. 100, No. 1, Jan. 1991.
SMPTE Recommended Practice, Video Record Parameters for 1–in Type C Helical–Scan Video Tape Recording, SMPTE Journal, Aug. 1985, pp. 872–873.
"Index to Subjects—Jan.–Dec. 1980•Volume 89," 1980 Index to SMPTE Journal, SMPTE Journal, pp. I–5 to I–11.
Sony engineering introduces to industry the new Sony Laser VideoDisc, Sony Video Communications, product brochure, 12 pages.
Space–Age Navigation For The Family Car, reprinted from Business Week, Jun. 18, 1984, 2 pages.
Speak Through The Power Of Today's Technology, Quest, product description, Allen Communication, 4 pages.
Spotmaticd Jr. Single VCR Commercial Insert System, Channelmatic, Inc., product description, 4 pages.
"Index to Volume 87 Jan.–Dec. 1978," SMPTE Journal, Part II to Jan. 1979 SMPTE Journal, pp. I–1, I–4 to I–14.
Still Frame Audio Encoder, Laserdata, product description, 2 pages.
Sunny Outlook for Landmark's John Wynne; Landmark Communications Inc., Broadcasting, Lexis–Nexis, Jul. 27, 1987.
SWSD System, Stills With Sound and Data, Pioneer Video, Inc., product description, Aug. 1984, 2 pages.
Videographic Systems of America, Advertisement for "Systems—Nabt—Naples" (KC026867).
Taking control of computer spending, Business Week, Jul. 12, 1982, pp. 59–60.
Talent pay code put off, At Deadline, Broadcasting, Nov. 9, 1970, p. 9.
Technical Specifications For Hardware And Software Products, Online Products Corporation, 9 pages.
Teleprompter of Denver Channel Line Up, 2 pages.
Teleproof 2, IDC Services, Inc. product description, 6 pages.
Teleproof I "An Exciting New Development Of International Digisonics Corporation," product brochure, 13 pages.
"SMPTE Journal Five–Year Index 1971–1975," SMPTE Journal.
"SMPTE Journal Five–Year Index 1976–1980," SMPTE Journal.
"Teletext Acquisition and Control Circuit (SAA5040 Series)," Mullard (Jun. 1980), pp. 1–16.
"Teletext Timing Chain Circuit (SAA5020)," (Aug. 1978), pp. 109.
"Teletext Video Processor (SAA 5030)," Mullard (Dec. 1979), pp. 1–9.
Television Systems and Broadcast Technology, SMPTE Journal, Jan. 1985, pp. 172–175.
Television, SMPTE Journal, May 1981, pp. 375–379.
"The Best Reason To Buy Odetics On–Air Automation Systems Today?" Advertisement, Odetics Broadcast, 1 page.
The Consultant, advertisement, Co–Opportunities, Sales Development Information Systems, a division of Jefferson–Pilot Communications Company.

The Dawn of a New Era in Financial News Broadcasting, advertisement, Financial News Network, 1 page.
"Index to Subjects—Jan.–Dec. 1976• Volume 85," 1976 Index to SMPTE Journal, SMPTE Journal, vol. 85, pp. I–5 to I–13, I–15.
The IRIS Graphics System, Silicon Graphics, Inc., system description, 1983, 6 pages.
The IRIS System, Silicon Graphics, Inc., product brochure, 1983.
The Leader In Interactive Video, advertisement, Allen Communication, 2 pages.
The Most Exciting Customer and Revenue Building Program Since Sports were First Shown on T.V., NTN Communications, Inc., QB1 product brochure, 1986, 4 pages.
The NTN Entertainment Network, NTN Entertainment Network, programming information sheet, 2 pages.
The OASYS Authoring System, advertisement, Online Computer Systems, Inc., 1 page.
The Portable Plus Personal Computer, Hewlett–Packard, advertisement, Mar. 1986.
The Revolution Continues . . . , Regency Systems, Inc., company brochure, 1984, 6 pages.
The TCR–119 Reader, Gray Engineering Laboratories, SMPTE Journal, May 1980, vol. 89, p. 438, (advertisement).
The UCSD p–System Version IV, Softech Microsystems, product description, 2 pages.
The University of Delaware Videodisc Music Series presents Interactive Videodisc Instruction in Music, advertisement, 8 pages.
The Videodisc Monitor, vol. IV: No. 10, Oct. 1986.
The Videodisc Monitor, vol. IV: No. 12, Dec. 1986.
Threat to Quotron Discounted, The New York Times, 1984, 2 pages.
Time Inc. May Drop Teletext, newspaper article, 1 page.
Times Mirror Videotex/Infomart Joint Venture, Times Mirror, Background, Jan. 8, 1982, 3 pages.
Tone Switching System Model TSS–3000A–1, Channelmatic, Inc., product description, 1 page.
Total Teleconferencing Solutions For Your Communication And Training Needs, brochure, Parker Communications Corporation, Parker Associates.
Totally Integrated Interactive System—TII–PC, product description, Allen Communication, 2 pages.
Touch Monitor/Videodisc Player Interface Card and Video Switch Box, IIAT Products, product description, 1 page.
Touch Sensitive Monitor Interface Card for Apple II, IIAT Products, product description, 1 page.
Touch the Future Today, advertisement, MetaMedia Systems, Inc., 1 page.
Touché Interactive Videodisc System, product description, IIAT, International Institute of Applied Technology, Inc., 2 pages.
Touché Interactive videodisc training by IIAT, advertisement, IIAT, International Institute of Applied Technology, Inc., 1 page.
Touchpoint, A Total Eclipse of Existing Technology, product description, Allen Communication, 2 pages.
Training solutions for the 80's and beyond, advertisement, Online Computer Systems, Inc., 2 pages.
Training Systems, brochure, WICAT systems, Training Systems Division, 4 pages.
Trio 110, Laserdata, product description, 2 pages.
"U.S. TV Station to Write Viewdata Software Link," newspaper article, Jan. 22, 1979, p. 81.

U.S. Video presents . . . True Computer–Video Overlays, The Raster Master RM–110, product description, U.S. Video, 2 pages.

Rice, Michael, "Toward Improved Computer Software for Education and Entertainment in the Home," Report of an Aspen Institute Planning Meeting, Communications and Society Forum Report, Jun. 3–4, 1987.

United Satellite Racing Competitors, newspaper article, 1 page.

Universal Remote Control, Radio Shack, Owner's Manual, 4 pages.

Universal Video Controller, product description, Allen Communication, 2 pages.

UNIX, Operating System for the IRIS Geometry Computer, Silicon Graphics, Inc., product specification, 1 page.

Unleashing IBM Could Help A Satellite Venture Blast Off, Business Week, May 28, 1984, 2 pages.

Upgrade Packages, Visage, Inc., product description, 1 page.

UCSD p–System, Version IV.1, Softech Microsystems, product description, 4 pages.

USTV Direct Satellite to Home Television Service, General Instrument News Release, Aug. 1982.

V: Link 1000, Visage, Inc., product description, 1984, 2 pages.

V: Link 1910: The Single–Slot VGA Interactive Video Solution, product description, Visage, Inc., 4 pages.

V: Link Modules, Visage, Inc., product description, 4 pages.

V: Station 2000 System, Visage, Inc., product description, 2 pages.

VCR Automation System LPS–300OA, Channelmatic, Inc., product description, Mar. 1984, 2 pages.

Viacom Unit Will Tap Into Pay Networks, newspaper article, 1 page.

Damouny, N.G. "Teletext Decoders—Keeping Up with the Latest Technology Advances," Consumer Electronics, vol. CE–30, No. 3, Aug. 1984, pp. 429–436.

Dumaine, Brian, "Who's Gypping Whom in TV Ads?", Fortune, pp. 78–79, Jul. 6, 1987.

Vidbits, Advertising Age, Sep. 21, 1981, p. 70.

Video Database Management . . . When Words Are Not Enough, advertisement, U.S. Video, 2 pages.

Video Kitchen "Commercial Prospects For Food Data–Base Management," Prospectus for a Multiclient Study from American Information Exchange, 1982.

Video Tape Recording Glossary, SMPTE Journal, Oct. 1980, vol. 89, p. 733.

"Video Text Decoder Systems (Signetics)", Phillips IC Product Line Summary (May 1981), pp. 15–16.

Video Visionaries, Review, Sep. 1982, pp. 95–103.

Video–Game Boom Continues Despite Computer Price War, Technology, The Wall Street Journal, Oct. 1, 1982, p. 33.

Video–Microcomputer Interface, product description, Allen Communication, 2 pages.

Videoconferencing: No Longer Just a Sideshow, Business Week, Nov. 12, 1984, pp. 116–120.

Visage Visual Information Systems, Interactive Video Products, brochure, Visage, Inc.

VPD–3001A Signal Presence Detector, Channelmatic, Inc., product description, Mar. 1984, 1 page.

Will Knight–Ridder Make News With Videotex?, Media Business Week, Aug. 8, 1983, pp. 59–60.

Window on the World "The Home Information Revolution," Business Week, Jun. 29, 1981, pp. 74–83.

Zenith and Taft Co. In Teletext Venture, The New York Times, p. D3.

Zenith, "Virtext System, VI.6, Hardware and Software Reference Manual," Zenith Radio Corporation, Apr. 1981.

1986 Annual Report, The Allen Group Inc.

Aarsteinsen, Barbara, "How the Chip Spurs TV Growth," "The promise of digital television has stirred the U.S. Industry," The New York Times, May 20, 1984, 1 page.

Adams, D.M., "The Place of Viewdata in Relation to Other Communications Techniques in the Travel Industry: A Personal View," Viewdata & Videotext, 1980–81: A Worldwide Report, 1980, pp. 379–397.

Advertisement, "CTVM 3 series of Barco master control color monitors", "Barco TV Modulator, Model VSBM 1/S", "VICMACS Type 1724 Vertical Interval Machine Control System", "Videotape Editing Controllers by US JVC Corp., RM–70U, RM–82U, RM–88U", SMPTE Journal, Oct. 1980, vol. 89, p. 820 et seq.

Albright, Thomas G. (Printer Terminal Communications Corporation), "Cable Service: A Data Distribution Link," Visions of the 80's—Technical Papers, National Cable Television Association 29th Annual Convention, Dallas, TX, May 18–21, 1980 ("Visions of the 80's "), pp. 30–34.

Allan, J.J., III, et al., "A Computer–Controlled Super–8 Projector," SMPTE Journal, Jul. 1977, vol. 86, pp. 488–489.

Alvord, Charles, Dr. (Communications Technology Management, Inc.), "Creating Standards for Interconnect Systems," Cable '82, pp. 190–196.

Amell, Richard L. (Cox Cable Communications, Inc.), "Computer–Aided CATV System Design," Visions '79, pp. 126–133.

Anderson, T., "The Vertical Interval: A General–Purpose Transmission Path," IEEE Transactions On Broadcasting, vol. BC–17, No. 3, Sep. 1971, pp. 77–82.

Andrews, Edmund L., "AT&T Sees the Future in Games," The New York Times, Business Day, 2 pages.

Anon, "Television Network Automated By Microcomputer–Controlled Channels," Computer Design, vol. 15, No. 11 (Nov. 1976), pp. 50, 59, 62, 66 and 70.

Anon, "Updating databases by off–peak TV," New Scientist, Oct. 21, 1976, p. 162.

Anon, Videotex '81, International Conference & Exhibition, May 20–22, 1981, Toronto, Canada (Northwood Hills, UK: Online Conferences, Ltd; 1981), pp. 78–84.

Arenson, Karen W., "CBS, I.B.M., Sears Join In Videotex Venture," newspaper article, 1 page.

Bacon, John C. (Scientific–Atlanta, Inc.), "Is Scrambling the Only Way?," Visions of the 80's, pp. 95–98.

Baer, Ralph H., "Tele–Briefs–A Novel User—Selectable Real Time News Headline Service for Cable TV," Consumer Electronics, pp. 406–408.

Baer, W. S., "Interactive Television: Prospects for Two–Way Services on Cable," Rand Corporation, Nov. 1971, pp. 1–88.

Baran, Paul (Packetcable Inc.), "Packetcable: A New Interactive Cable System Technology," Cable '82—Technical Papers, National Cable Television Association 31st Annual Convention, Las Vegas, NV, May 3–5, 1982 ( Cable '82), pp. 1–6.

Barbetta, F., "CBS Joins EIA in Test of Foreign TV Data System," newspaper article, 1979, p. 23.

Barbieri, Rich, "Perfecting the Body Count," Channels, p. 15, Jun. 1987.

Barlow et al., "A Universal Software for Automatic Swithchers", SMPTE Journal, Oct. 1978, vol. 87, p. 682–683.

Barlow, "Some Features of Computer–Controlled Television Station Switchers", Journal of the SMPTE, Mar. 1972, vol. 81, p. 179–183.

Barlow, "The Assurance of Reliability", SMPTE Journal, Feb. 1976, vol. 85, p. 73–75.

Barlow, "The Automation of Large Program Routing Switchers", SMPTE Journal, Jul. 1979, vol. 88, pp. 493–497.

Barlow, "The Computer Control of Multiple–Bus Switchers", SMPTE Journal, Sep. 1976, vol. 85, p. 720–723.

Barlow, "The Design of an Automatic Machine Assignment System", Journal of the SMPTE, Jul. 1975, vol. 84, p. 532–537.

Barlow, M., Letter to the Editor, "Re: Automation of Telecine Equipment," Journal of the SMPTE, Apr. 1970, vol. 79, pp. 345–346.

Barlow, M., Letter to the Editor, "Re: Coding and Packaging Film for Broadcasting," Journal of the SMPTE, Oct. 1969, vol. 78, p. 889.

Barlow, M.W.S., "The Remote Control of Multiplexed Telecine Chains," SMPTE Journal, Apr. 1971, vol. 80, pp. 270–275.

Barlow, Michael W.S., "Application of Personal Computers in Engineering," SMPTE Journal, Jan. 1985, pp. 27–30.

Barren, J., "Electronic Publishing and the Government," Viewdata & Videotext, 1980–81: A Worldwide Report, 1980, pp. 295–300.

Bates, George W. et al., "Time Code Error Correction Utilizing a Microprocessor," SMPTE Journal, Oct. 1979, vol. 88, pp. 712–715.

Bates, George W., "Cut/Lap: A New Method for Programmable Fades and Soft Edit Transitions Using a Single Source VTR," SMPTE Journal, Mar. 1979, vol. 88, pp. 160–161.

Beakhust, D. J., et al., "Teletext and Viewdata—A Comprehensive Component Solution," Proceedings, IEEE, vol. 126, Dec. 1979, pp. 1374–1396.

Beck, Ann et al. (Manhattan Cable TV), "An Automated Programming Control System for Cable TV", Visions of the 80's, pp. 122–127.

Behrens, Steve, "People Meters vs. The Gold Standard," Channels, p. 72, Sep. 1987.

Behrens, Steve, "People Meters' Upside," Channels, p. 19, May 1987.

Berkman, S., "A Videotex Trial," Viewdata & Videotext, 1980–81: A Worldwide Report, 1980, pp. 447–460.

Berss, Marcia, "Tune in," Forbes, p. 227, Sep. 24, 1984.

Biggs, A.J. et al. "Broadcast data in television," GEC Journal of Science and Technology, vol. 41, No. 4, 1974, pp. 117–124.

Blank, John, "System and Hardware Considerations of Home Terminals With Telephone Computer Access," Consumer Electronics, pp. 311–317.

Blineau, Joseph J. (Centre Commun d'Etudes de Télévision et Tél´´communications), "Measuring Methods and Equipments for Data Packet Broadcasting," Visions of the 80's, pp. 35–39.

Bochmann, G.V., et al., "Towards Videotex Standards," Viewdata & Videotext, 1980–81; A Worldwide Report, 1980, pp. 253–262.

Bonney, R.B. et al., "A Proposed Standard Time and Control Code for Video–Tape Editing," Journal of the SMPTE, Mar. 1970, vol. 79, pp. 186–190.

Botten, B., "Providing Business Information to Prestel," Viewdata & Videotext, 1980–81: A Worldwide Report, 1980, pp. 73–81.

Bowers, P.G., et al., "Telidon and Education in Canada," Viewdata & Videotext, 1980–81: A Worldwide Report, 1980, pp. 7–17.

Bown, H.G. et al., "Telidon: A New Approach to Videotex System Design," Consumer Electronics, pp. 256–268.

Bown, H.G., et al., "Telidon Technology Development in Canada," Viewdata & Videotext, 1980–81: A Worldwide Report, 1980, pp. 547–558.

Brack, Fred, "QB1 Anyone?" Alaska Airlines, Aug. 1986.

Branch, Charles, "Text Over Video," PC World, Dec. 1983, pp. 202–210.

Bright, Roy D., "Prestel—The World's First Public Viewdata Service," Consumer Electronics, pp. 251–255.

Herman, James C., "Application of Fiber Optics in CATV Distribution Systems," Technical Papers, NCTA 31st Annual Convention & Exposition, May 3–5, 1982.

Brown, Jr., Robert R. (Cima Telephone and Television), "Inter Bridger Trunking for Information Services," Cable '82, pp. 183–189.

Brown, Larry C. (Pioneer Communications of America), "Addressable Control—A Big First Step Toward the Marriage of Computer, Cable, and Consumer," Cable: '81, pp. 42–46.

Browning, E.S., "Sony's Perseverance Helped It Win Market For Mini–CD Players," Wall Street Journal, Feb. 27, 1986, 2 pages.

Busby, E.S., "Digital Component Television Made Simple," SMPTE Journal, Jul. 1985, pp. 759–762.

Butler, "PCM–Multiplexed Audio in a Large Audio Routing Switcher", SMPTE Journal, Nov. 1976, vol. 85, p. 875–877.

Cable Advertising Conference Feb. 9, 1982, conference agenda, Cabletelevision Advertising Bureau, Inc., 6 pages.

Campbell, Keith D., "An Automated Video–Tape Editing System," Journal of the SMPTE, Mar. 1970, vol. 79, pp. 191–194.

Camrass, R., "Viewdata: A Practical Medium for Electronic Mall," Viewdata & Videotext, 1980–81: A Worldwide Report, 1980, pp. 173–184.

Castell, S., "Prestel and the Law," Viewdata & Videotext, 1980–81: A Worldwide Report, 1980, pp. 301–312.

CBS/CCETT, "North America Broadcast Teletext Specification," Jun. 22, 1981, pp. 1–240.

CCITT, "Recommendation S.100—International Information Exchange for Interactive Videotex," Geneva, 1980, pp. 165–205.

Chambers, J.P., "Potential of Extended Teletext," Television: Journal of the Royal Television Society, Sep./Oct. 1980, pp. 43–45.

Channelmatic, Inc., advertisement, Looking at Local Ad Sales?.

Chase, Scott, "Corporate Satellite Networks No Longer A Luxury But Rather A Necessity," Via Satellite, Jul. 1987, pp. 18–21.

Chew, J.R. "CEEFAX: evolution and potential," BBC Research Department Report No. BBC RD 1977/26, Aug. 1977, table of contents, pp. 1–14 and appendix.

Chiddix, "Videocassette Banks Automate Delayed Satellite Programming," Aug. 1978, TV Communications, pp. 38–39.

Chitnis, A.M. et al., "Videotex Services: Network and Terminal Alternatives," Consumer Electronics, pp. 269–278.

Christopher, Maurine, "BAR cable service set," Advertising Age, Sep. 21, 1981, pp. 68 & 72.

Ciciora, Ph.D., W.S. (Zenith Radio Corporation), "Virtext & Virdata: Adventures in Vertical Interval Signaling," Cable: '81, pp. 101–104.

Ciciora, W.S., "The Role of the Television Receiver Manufacturer in the United States," Viewdata & Videotext, 1980–1981: A Worldwide Report, 1980 pp. 533–546.

Ciciora, W.S., "Twenty–Four Rows of Videotex in 525 Scan Lines," IEEE Transactions on Consumer Electronics, vol. CE–27, No. 4, Nov. 1981, pp. 575–587.

Ciciora, W.S., "Virtext & Virdata—A Present U.S. Teletext Application," Videotex '81, May 1981, pp. 77–84.

Ciciora, Walter et al., "An Introduction to Teletext and Viewdata with Comments on Compatibility," IEEE Transactions on Consumer Electronics, vol. CE–25, No. 3, Jul. 1979 ("Consumer Electronics"), pp. 235–245.

Ciciora, Walter, "Teletext Systems: Considering the Prospective User," SMPTE Journal, Nov. 1980, vol. 89, pp. 846–849.

Clarke, K.E., "What Kind of Pictures for Videotex?," Viewdata & Videotext, 1980–81: A Worldwide Report, 1980, pp. 83–92.

Clifford, C., "A Universal Controller for Text Display Systems," IEEE Transactions on Consumer Electronics, (1979) pp. 424–429.

Collins, Glenn, "For Many, a Vast Wasteland Has Become a Brave New World," New York Times, no date, 2 pages.

COMSAT, "Annual Report 1981."

COMSAT, "Communications Satellite Corporation Magazine," No. 7, 1982.

COMSAT, "Satellite to Home Pay Television," no date.

Connell, Steve, "Arm–Chair Quarterbacking (Computer football game makes fans the play–callers)," The Sacramento Union, Jan. 23, 1986, 3 pages.

Connelly, Mike, "Knight–Ridder's Cutbacks at Viewtron Show Videotex Revolution Is Faltering," The Wall Street Journal, Nov. 2, 1984, p. 42.

Connolly, W.G. et al., "The Electronic Still Store: A Digital System for the Storage and Display of Still Pictures," SMPTE Journal, Aug. 1976, vol. 85, pp. 609–613.

Connolly, William G., "Videotape Program Production at CBS Studio Center," SMPTE Journal, Nov. 1978, vol. 87, pp. 761–763.

Connor, Denis J., "Network Distribution of Digital Television Signals," SMPTE Journal, Dec. 1980, vol. 89, pp. 935–938.

Conte, J.J., et al., "A NOAA/National Weather Service Teletext Type Weather Experiment," Nov. 1979.

Cooney, John E., "Counting Cable's Gold Coins," View, Sep. 1981, 4 pages.

Courtney, J.F., "Videotel," Viewdata & Videotext, 1980–81: A Worldwide Report, 1980, pp. 371–377.

Couzesa, Michael, "Invasion of the People Meters," Channels, Jun. 1986, pp. 40–45.

CRC Electronics, Inc. Product Description, "Model P–1000 Videocassette Programmer," 4 pages.

CRC Electronics, Inc. Product Description, "Model TD–100—Time Delay Videotape Controller," 2 pages.

CRC Electronics, Inc., Net Price List—Jul. 31, 1981 (P–1000 Video Machine Programmer), 1 page.

CRC Electronics, Inc., Net Price List—Mar. 1, 1980 (TD–100 Time Delay Videotape Controller), 1 page.

Crowther, G.O., "Teletext and Viewdata Costs As Applied to the U.S. Market," Consumer Electronics, pp. 339–344.

Crowther, G.O., "Teletext and Viewdata Systems and Their Possible Extension to Europe and USA," Consumer Electronics, pp. 288–294.

Crudele, J., "TI Tests Home Information System," Electronic News, Nov. 6, 1978, pp. 24–25.

Curnal, et al., "Automating Television Operating Centers," Bell Laboratories Record, Mar. 1978, pp. 65–70.

Dahlquist, John (Jerrold Division, General Instrument Corporation), "Techniques for Improving Continuity of Service in a CATV Distribution System," Abstract, Cable '82, p. 138.

Daly IV, Raymond E. (Computer Cablevision, Inc.), "Potential Use of Microcomputers—The Threats to Technical Personnel, Manufacturers And Owners," Visions '79, pp. 124–126.

Davis, Allen (Home Box Office), "Satellite Security," Visions of the 80's , pp. 99–100.

Davis, John T., "Automation of a Production Switching System," SMPTE Journal, Oct. 1980, vol. 89, pp. 725–727.

Davis, M., "Prestel and the Travel Industry," Viewdata & Videotext, 1980–81: A Worldwide Report, 1980, pp. 595–602.

Day, Alexander G., "From Studio to Home—How Good is the Electronic Highway?", SMPTE Journal, Feb. 1985, pp. 216–217.

Denning, D.E., et al., "Timestamps in Key Distribution Protocols," Communications of the ACM, vol. 24, No. 8, Aug. 1981, pp. 533–536.

Department of Transport and Communications Radio Frequency Management Division, Licensing Procedures for Ancillary Communications Services (ACS).

Diamond, David, "Why Television's Business Programs Haven't Turned a Profit," The New York Times, Jun. 16, 1985, pp. F10–F11.

Diamond, Edwin, "Attack of the People Meters," New York, pp. 38–41, Aug. 24, 1987.

Diamond, Sam, "Turning Television Into A Business Tool," High Technology, Apr. 1987, 2 pages.

Dickey, Glenn, "A Game That's Better Than The Real Thing," San Francisco Chronicle, Dec. 17, 1985, p. 63.

Dickey, Glen, "QB1: Bringing The Game Into The Bar," Sport Magazine, Oct. 1986, 1 page.

Dickinson, Robert V.C. (E–Com Corporation), "A Versatile, Low Cost System for Implementing CATV Auxiliary Services," Visions '79—Technical Papers, National Cable Television Association 28th Annual Convention, Las Vegas, NV, May 20–23, 1979, ("Visions '79"), pp. 65–72.

Dickinson, Robert V.C. (E–Com Corporation), "Carriage of Multiple One–Way and Interactive Service on CATV Networks," Cable '82, pp. 16–21.

Dickson Bonnie J., "An Automated Network Control Center", Journal of the SMPTE, July 1975, vol. 84, p. 529–532.

Digital, "Vax Producer, A System for Creating Interactive Applications," product bulletin, May 1984, 8 pages.

Dolnick, Edward, "Inventing The Future," The New York Times Magazine, Aug. 23, 1987.

Dougherty, Philip, "Gathering Intelligence For Profit," newspaper article, 1981, p. D7.

Douglas, W. Gordon, "PBS Satellite Interconnection Technical Operations and Maintenance," SMPTE Journal, March 1979, vol. 88, pp. 162–163.

Download, Monthly Newsletter, vol. 1, No. 1, May 1984.

Dragutsky, Paula, "Data in the bank is booming biz," New York Post, Apr. 29, 1985, 1 page.

Dufresne, Michel (Videotron Communications LTEE), "New Services: An Integrated Cable Networks's Approach," Cable '82, pp. 156–160.

Dunn, Donald H., editor, "Devices That Let You Track Stocks Like A Floor Trader," Personal Business, Business Week, Jul. 25, 1983, pp. 83–84.

Dunn, Donald H., editor, "How to Pick Your Stocks by Computer," Personal Business, Business Week, Sep. 12, 1983, pp. 121–122.

Edmondson et al., "NBC Switching Central", SMPTE Journal, Oct. 1976, vol. 85, p. 795–805.

Edwardson, S.M., "CEEFAX: A Proposed New Broadcasting Service," Journal of the SMPTE, January 1974, p. 14–19.

Eisenhammer, John, "Will Europe's Satellite TV Achieve Lift–Off?", Business, Aug. 1986, pp. 56–60.

Eissler, Charles (Oak Communications Systems), "Addressable Control for the Small System," Cable '82, p. 32–38.

Eissler, Charles O. (Oak Communications Inc.), "Addressable Control," Cable: '81 The Future of Communications—Technical Papers, National Cable Television Association 30th Annual Convention, Los Angeles, Ca., May 29–Jun. 1, 1981 ("Cable: '81"), pp. 29–33.

Evans, William E. et al. (Manitoba Telephone System), "An Intercity Coaxial Cable Electronic Highway," Visions '79, pp. 73–79.

Everton, J.K., "A Hierarchical Basis for Encryption Key Management in a Computer Communications Network," Conference Record—1978 International Conference on Communications; vol. 3, pp. 46.4.1 through 46.4.7.

Everton, J.K., "Adaptation of the Basic Hierarchy for Encryption Key Management to Serve Applications with Conflicting Requirements," Proceedings, Computer Networking Symposium, December 1979, pp. 186–191.

Fannetti, John D. et al. (City of Syracuse), "The Urban Market: Paving the Way for Two–Way Telecommunications," Cable 78, pp. 29–33.

Fantel, Hans, "Videotex to Expand What a TV Can Do," article, 1 page.

Ferretti, Fred, "For Major–League Addicts, A Way to Win a Pennant," The New York Times, Jul. 8, 1980, 1 page.

Fisher, Lawrence M., "TV: Growing Corporate Tool," The New York Times, 2 pages.

Flemming, "NBC Television Central—An Overview", SMPTE Journal, Oct. 1976, vol. 85, p. 792–795.

Frandon, P. et al., "Antiope LSI," Consumer Electronics, pp. 334–338.

Friedman, Jack, "The Most Peppery Game Since The Hot Stove League? It's Rotisserie Baseball," People weekly, Apr. 23, 1984, 2 pages.

Gaines, B.R. and Sams, J., "Minicomputers in Security Dealing," Computer, September, 1976, pp. 6–15.

Gano, Steve, "A Draft of a Request for Proposals Concerning the Adoption of Computer Technology in the Home," Jan. 1988, Draft 1987 Steve Gano.

Geise, Heinz–Dieter, "The Use of Microcomputers and Microprocessors in Modern VTR Control," SMPTE Journal, Dec. 1979, vol. 88, pp. 831–834.

Gilbert, Bill et al. (Texscan Corporation), "Automatic Status Monitoring for a CATV Plant," Cable: '81, pp. 124–128.

Gleick, James, "U.S. Is Lagging on Forecasting World Weather," The New York Times, Feb. 15, 1987, 2 pages.

Glover, S. "Automatic Switching at the Edmonton Television Studios," SMPTE Journal, November 1966, vol. 75, pp. 1089–1092.

Goldberg, Efrem I. (GTE Laboratories Incorporated), "Videotex on Two–Way Cable Television Systems—Some Technical Considerations," Cable '82, pp. 166–174.

Gosch, John, "Code accompanying TV program turns on video cassette recorder in proposed scheme," Electronics, Feb. 10, 1981, pp. 80–82.

Government of Canada, Department of Communications, "Broadcast Specification: Television Broadcast Videotex," Jun. 19, 1981.

Goyal, Shri K. et al., "Reception of Teletext Under Multipath Conditions," Consumer Electronics, pp. 378–392.

Grabenstein, James B. (Potomac Valley Television Co., Inc.), "System Design and Operation with 'Basic'," Visions '79 (Appendix B), p. 127.

Grabowski, Ralph E. (Visiontec), "The Link Between the Computer and Television," Cable: '81, pp. 99–100.

Green, N., et al, "Oracle on Independent Television," IBA Technical Review, vol. 9, September 1976, Digital Television Developments, pp. 18–31.

Gregg, Gail, "The Boom in On–Line Information," New Businesses, Venture, Mar. 1984, pp. 98–102.

Gross, William S., "Info–Text, Newspaper of the Future," Consumer Electronics, pp. 295–297.

Guillermin, J., "Development & Applications of the Antiope–Didon Technology," Viewdata '80, Mar. 1980, pp. 29–38.

Gunn, H., et al., "A Public Broadcaster's View of Teletext in the United States."

Gunn, William, "Get Ready For Monday Night Football," Night Club and Bar, Jul. 1986, pp. 20–22.

Haimes, A.R., "IVS–3 as a Private Viewdata System," Viewdata '80, Mar. 1980, pp. 332–336.

Hamalainen, K.J., "Videotape Editing Systems Using Microprocessors," SMPTE Journal, Jun. 1978, vol. 87, pp. 379–382.

Hanas et al., "An Addressable Satellite Encryption System For Preventing Signal Piracy", Nov. 1981, pp. 631–635.

Harden, Brian, "Teletext/Viewdata LSI," Consumer Electronics, pp. 353–358.

Harrar, George, "Opening Information Floodgates," American Way, Oct. 1982, pp. 53–56.

Haslam, G., "Information Provider Activities in Canada," Viewdata '80, Mar. 1980, pp. 1–6.

Hathaway, R.A. et al., "Development and Design of the Ampex Auto Scan Tracking (AST) System," SMPTE Journal, Dec. 1980, vol. 89, p. 931.

Hayashi, Alden, M., "Can Logic Automation model its way to success?", Electronic Business, Aug. 1, 1986.

Hayes, Donald R., "Vertical–Interval Encoding for the Recordable Laser Videodisc," SMPTE Journal, Aug. 1985, pp. 814–820.

Hayes, Thomas C., "New M.C.C. Chief's Strategy: To Speed Payoff on Research," The New York Times, Jun. 24, 1987, 2 pages.

Hedger, J. "Telesoftware: Home Computing Via Broadcast Teletext," Consumer Electronics, pp. 279–287.

Hedger, J., "Broadcast Telesoftware: Experience with Oracle," 1980, pp. 413–429.

Hershberger, S., "Form Mktg. Unit for Antiope System," newspaper article, Apr. 2, 1979, p. 27.

Hershberger, S., "Say French in Talks on Teletext," newspaper article, May 14, 1979, p. 48.

Heuer, D.A. "A Microprocessor Controlled Memory Tuning System," Consumer Electronics, vol. CE–25, No. 4, Aug. 1979, pp. 677–683.

Heys, F.A., et al., STC's Approach to In–House Viewdata Systems, Viewdata '80, Mar. 1980, pp. 313–322.

Hoffman, Paul, "The Next Leap in Computers," The New York Times Magazine, Dec. 7, 1986, 6 pages.

Hopkins, Robert S., Jr., "Report of the Committee on New Technology," SMPTE Journal, Jun. 1980, vol. 89, pp. 449–450.

Horowitz, "CBS" New–Technology Station, WBBM–T, SMPTE Journal, Mar. 1978, vol. 87, p. 141–146.

Howard, Niles, A., "IDC drops tv monitoring; mullis revival," reprint from Advertising Age, Feb. 3, 1975, 1 page.

I/NET Corporation, Company Brochure.

IEV Feb. 1985 Price List, 1 page.

Inoue, R., "The Index System of the Captain System Experimental Service," Viewdata '80, Mar. 1980, pp. 113–122.

J. Chiddix, "Automated Videotape Delay of Satellite Transmissions," Satellite Communications Magazine, May 1978 (reprint—2 pages).

J. Chiddix, "Tape Speed Errors in Line–Locked Videocassette Machines For CATV Applications," TVC, Nov. 1977 (reprint—2 pages).

James, A., "Oracle—Broadcasting the Written Word," Wireless Word, Jul. 1975.

Johnson, G.A., et al., "The Networking of Oracle," Developments in Teletext, Independent Broadcasting Authority, May 1983, pp. 27–36.

Jones, Stacy V., "Patents/Monitoring Display of TV Ads," The New York Times, Oct. 19, 1985, p. 34.

Jubert, Jay (Wang Laboratories, Inc.), "Wangnet, A Cable–Based Localnet," Cable '82, pp. 79–81.

Kalowski, Nathan, "Player, Monitor, Interface," reprinted from Jan. 1985 issue of Data Training, 4 pages.

Kane, Sharyn et al., "Technology in the First Person," reprint from Delta Air Lines' Sky magazine, 4 pages.

Kanner, Bernice, "Now, People Meters," New York, 3 pages, May 19, 1986.

Kary, Michael Loran, "Video–Assisted Film Editing System," SMPTE Journal, Jun. 1982, pp. 547–551.

Katz, Harold W. (Interactive Systems/3M), "Status Report on EIA Broadband Modem Standards," Visions of the 80's, pp. 40–44.

Kaufman, Paul A. et al., "The Du Art Frame Count Cueing System," SMPTE Journal, Oct. 1981, pp. 979–981.

Keyfax—National Teletext Magazine, Advertisement, 4 pages.

Keyfax—National Teletext Magazine, Technical Bulletin, 1 page.

Keyfax, Keyfax by Satellite, Advertisement, 2 pages.

Killion, Bill, "Advertising," SAT Guide, Jul. 1982.

Killion, Bill, "Automatic Commercial Insertion Equipment For The Unattended Insertion Of Local Advertising," paper presented at 33rd Annual National Cable Television Association Convention, Jun. 1984.

Kindel, Stephen, "Pictures at an exhibition," Forbes, Aug. 1, 1983, pp. 137–138.

King, P. T., "A Novel TV Add–On Data Communication System," 5 pages.

Klink, et al., "A Network Control System For Television Distribution By Satellite," Journal of The SMPTE, Feb. 1975, vo. 84, No. 2, pp. 63–67.

Klare, Stephen W. (Scientific—Atlanta), "Bandwidth–Efficient, High–Speed Modems for Cable Systems," Cable '82, pp. 72–78.

Kneale, Dennis, "Merrill Lynch Plans Stock–Quote Service Linked to I.B.M.'s PC," The Wall Street Journal, Mar. 21, 1984, 1 page.

Kneale, Dennis, "Stations That Show Only Ads Attract a Lot of TV Watchers," The Wall Street Journal, Sep. 23, 1982, 1 page.

Kneale, Dennis, et al., "Merrill Lynch and IBM Unveil Venture To Deliver Stock–Quote Data to IBM PCs," The Wall Street Journal, Mar. 22, 1984, p. 8.

Kokado et al., "A Programmable TV Receiver", Feb. 1976, pp. 69–82.

Korda, A., "Private Viewdata Systems," Viewdata & Videotext, 1980–81: A Worldwide Report, 1980, pp. 515–521.

Kowalchuk, J., et al., "Communications Privacy: Integration of Public and Secret Key Cryptography." NTC 1980—Conference Record, Nov. 1980, pp. 49.1.1 through 49.1.5.

Krochmal et al., "Television Transmission Audio Facilities at NBC New York", SMPTE Journal, Oct. 1976, vol. 85, p. 814–816.

KSL–TV–Salt Lake City, Utah, Press Release About Teletext Signal, pp. 1–7d.

Kubota et al., "The Videomelter", SMPTE Journal, Nov. 1978, vol. 87, p. 753–754.

Kuca, Jay, et al., "A Fifth–Generation Routing Switcher Control System," SMPTE Journal, May 1985, pp. 566–571.

Kumamoto, T., et al., "Captain System Features—Presentation Capability and Transmission Method," Viewdata '80, Mar. 1980, pp. 93–105.

Kurushima, N., "The Cooperative Association of Captain Information Providers and Present State of Information Supply for the Experimental Service," Viewdata '80, Mar. 1980, pp. 123–132.

Lafayette, Jon, "TV ad monitor system starts tests here Mon.," New York Post, Oct. 18, 1985, p. 63.

Lambourne, A.D., "Newfor—An Advanced Subtitle Preparation System," Developments in Teletext, Independent Broadcasting Authority, May 1983, pp. 57–63.

Landro, Laura, "CBS, AT&T May Start Videotex Business In '83 if 7–Month Home Test Is Successful," The Wall Street Journal, Sep. 28, 1982, p. 8.

Landro, Laura, "Satellite Company Signs Merrill Lynch For Its Video Service," The Wall Street Journal, 1 page.

Langley, Don et al. (University of Cincinnati and Rice–Richter Associates), "Interactive Split Screen Teleconferencing," Cable '82, pp. 47–50.

Laserdata, price list, Aug. 1, 1985, 4 pages.

Leonard, Eugene, "Considerations Regarding the Use of Digital Data to Generate Video Backgrounds," SMPTE Journal, Aug. 1978, vol. 87, pp. 499–504.

Lieberman, David, "The Networks' Big Headache," Business Week, pp. 26–28, Jul. 6, 1987.

Limb, J.O. et al., "An Interframe Coding Technique for Broadcast Television," SMPTE Journal, Jun. 1980, vol. 89, p. 451.

Lipoff, Stuart J. "Mass Market Potential for Home Terminals," Consumer Electronics, vol. unk., pp. 169–184.

Long, Michael, E., "The VCR Interface," 1986 NCTA Technical Papers, 1986, pp. 197–202.

Lopinto, John J. (Home Box Office), "Considerations for Implementing Teletext in the Cable System," Visions of the 80's, pp. 45–48.

Mannino, Joseph A. (Applied Date Research, Inc.), "Computer Applications in Cable Television," Visions of the 80's, pp. 116–117.

Mapp, L., et al., Telesoftware & Education Project—Final Report, BBC/ITV and Brighton Polytechnic, Jul. 1982, pp. 1–111.

Marti, B. et al., The Antiope Videotex System, Consumer Electronics, pp. 327–333.

Marti, B., "Broadcast Text Information in France," Viewdata '80, Mar. 1980, pp. 359–370.

Marti, Bernard et al., "Antiope, service de télétexte," journal unk., pp. 17–22.

Marti, Bernard, "New Ancillary Services Using a Television Channel," SMPTE Journal, vol. 86, Nov. 1977, pp. 815, 817, 818.

Martin, Vivian B., "Companies use TV talk shows to inform workers," The Hartford Journal, Business Weekly, 1 page.

Maslin, J.M., "An evaluation of viewdata for training in industry," Viewdata & Videotext, 1980–81: A Worldwide Report, 1980, pp. 523–531.

Matley, J. Brian, "A Digital Framestore Synchronizer," SMPTE Journal, Jun. 1976, vol. 85, pp. 385–388.

Maury, J.P., "Plans and Projection for the Electronic Directory Service," Viewdata '80, Mar. 1980, pp. 39–50.

Mausler, "Versatile Transmission Video Facilities at NBC New York", SMPTE Journal, Oct. 1976, vol. 85, pp. 811–814.

Mayer, Martin, "Here comes Ku–band," Forbes, May 21, 1984, pp. 65–72.

McCoy, Reginald F.H., "A New Digital Video Special–Effects Equipment," SMPTE Journal, Jan. 1978, vol. 87, pp. 20–23.

McCroskey, Donald C., "Television," SMPTE Journal, Apr. 1985, pp. 382–395.

McKenzie, G.A., "Oracle—An Information Broadcasting Service Using Data Transmission in the Vertical Interval," Journal of the SMPTE, vol. 83, No. 1, Jan. 1974, pp. 6–10.

McNamara, R.P. et al. (Sytek, Incorporated), "MetroNet: An Overview of a CATV—Regional Data Network," Cable '82, pp. 22–31.

Merrell, Richard G., "TAC–Timer," 1986 NCTA Technical Papers, 1986, pp. 203–206.

Merritt, Christopher R.B., M.D., "Doppler blood flow imaging: Integrating flow with tissue data," Diagnostic Imaging, Nov. 1986, pp. 146–155.

Meserve, Everett T., "A History of Rabbits," Datamation, pp. 188–192.

Meserve, Everett T. (Bill), "The Future of Rabbitts," Datamation, Jan. 1982, pp. 130–136.

Meslya, M.F. et al. (Times Fiber Communications, Inc.), "Mini–Hub Addressable Distribution System for Hi–Rise Application," Cable '82, pp. 37–42.

Messerschmid, U., "Teletext in the Federal Republic of Germany," Viewdata '80, Mar. 1980, pp. 431–445.

Middleton, Teresa, "The Education Utility," American Educator, Winter 1986, pp. 18–25.

Minister for Communications Guidelines for Provision of Video and Audio Entertainment and Information Services, Oct. 13, 1986.

Money, Steve A. Teletext and Viewdata (London: Butterworth & Co., Ltd., 1981), preface, pp. 1–145, glossary and index.

Montague, P.M., "The Electronic Newspaper," Viewdata '80, Mar. 1980, pp. 63–71.

Moore, J.K., et al., "A Recent Innovation in Digital Special Effects, The CBS 'Action Track' System," SMPTE Journal, Oct. 1978, vol. 87, pp. 673–676.

Morgan, G., "Britains Teletext Services are a Commercial Success," Viewdata '80, Mar. 1980, pp. 341–357.

Moril, Yutaka, et al., "A New Master Control System for NHK's Local Stations," SMPTE Journal, May 1985, pp. 559–564.

Morioka, F.K., "An Experiment with Computer–Based Educational Services in a General Public Environment," Viewdata & Videotext, 1980–81: A Worldwide Report, 1980, pp. 613–623.

Mothersole, Peter L., "Teletext Signal Generation Equipment and Systems," Consumer Electronics, pp. 345–352.

Mullard Application Laboratory, "Integrated Circuits for Receivers," De3velopments in Teletext, Independent Broadcasting Authority, May 1983, pp. 43–56.

Neal, C. Bailey et al., "A Frequency–Domain Interpretation of Echoes and Their Effect on Teletext Data Reception," Consumer Electronics, pp. 362–377.

Negri, "Hardware Interface Considerations for a Multi–Channel Television Automation System", SMPTE Journal, Nov. 1976, vol. 85, p. 869–872.

Nelson, J., "Implementations of Encryption in an Open Systems' Architecture," Proceedings, Computer Networking Symposium, Dec. 1979, pp. 198–205.

New York Stock Exchange, Inc., Computer Input Services, Schedule of Monthly Charges, Aug. 1, 1981, 1 page.

New York Stock Exchange, Inc., Market Data Services, Schedule of Monthly Charges, Jan. 1, 1982, 1 page.

News Release, Industrial Training Corporation, Merger of IIAT with and into ITC, Jun. 11, 1985, 1 page.

Nicholls, William C., "A New Edit Room Using One–Inch Continuous–Field Helical VTRs," SMPTE Journal, Nov. 1978, vol. 87, pp. 764–766.

Nocera, Joseph, "Death of a Computer," Texas Monthly, Apr. 1984.

Norris, Bryan L. et al., "Teletext Data Decoding," IEEE Transactions on Consumer Electronics, Aug. 1976, pp. 248–253.

NTN Communications, Inc., "Trivia Countdown," and "Trivia Showdown," product descriptions, 1 page.

O'Brien, Jr., Thomas E. (General Instrument Corporation), "System Design Criteria of Addressable Terminals Optmized for the CATV Operator," Visions of the 80's, pp. 89–91.

O'Connor, Robert A., "Teletext Field Tests," Consumer Electronics, pp. 304–310.

O'Donnell, John et al., "Videodisc Program Production Manual," Sony, 1981.

Oliphant, Andrew et al., "A Digital Telecine Processing Channel," SMPTE Journal, Jul. 1979, vol. 88, pp. 474–483.

Oacle, Advertisement Rate Card No. 1, Sep. 1, 1981, 8 pages.

Ost, Clarence S. et al. (Electronic Mechanical Products Co.), "High–Security Cable Television Access System," Visions of the 80's, pp. 92–94.

Pace, Eric, "Videotex in Years To Come," Advertising, The New York Times, Sep. 1, 1982, p. D15.

Pace, Eric, "Videotex: Luring Advertisers," The New York Times, Oct. 14, 1982.
Paganuzzi, "Communication in NBC Television Central", SMPTE Journal, Nov. 1976, vol. 85, p. 866–869.
Pandey, K. "Second generation teletext and viewdata decorders," Proceedings IEE, vol. 126, Dec. 1979, pp. 1367–1373.
Park, R.F., "The Role of Viewdata in Electronic Funds Transfer," Viewdata '80, Mar. 1980, pp. 185–201.
Parker, Edwin B., "Satellite micro earth stations—a small investment with big returns," Data Communications, Jan. 1983; 5 pages.
PC Ideas International Corp., product catalog, 7 pages, 1985.
Perlez, Jane, "Teachers Act to Increase Decision–Making Power," The New York Times, Jul. 8, 1986, 1 page.
Pioneer Video, Inc., "Customer Support Publications," 2 pages.
Pioneer Video, Inc., "LD–V1000 Laserdisc Player," product description, Feb. 1985, 2 pages.
Pioneer Video, Inc., "LD–V4000 Industrial Laserdisc Player," product description, Feb. 1984, 2 pages.
Pioneer Video, Inc., "LD–V4000 Laserdisc Player," products price list, Dec. 1983, 1 page.
Pioneer Video, Inc., "LD–V6000 Industrial Laserdisc Player," product description, May 1985, 2 pages.
Pioneer Video, Inc., "Pioneer LD–V1000 Laserdisc Player," price list, Feb. 1984, 1 page.
Pioneer Video, Inc., Price List, Industrial Disc Replication and Program Development Services, May 1984, 4 pages.
Plummer, Robert P. et al., "4004 Futures for Teletext and Videotex in the U.S.," Consumer Electronics, pp. 318–326.
Polishuk, Paul Dr. (Information Gatekeepers, Inc.) "Present Status of Fiber Optics Technology and its Impact on the CATV Industry," Cable '82, pp. 142–147.
Pollack, Andrew, "As Usual, Here Come The Japanese," The New York Times, May 20, 1984, 1 page.
Pollack, Andrew, "Computer Programs as University Teachers," The New York Times, 4 pages.
Pollack, Andrew, "Electronic Almanacs Are There for the Asking," The New York Times, Mar. 18, 1984, 1 page.
Pollack, Andrew, "Putting 25,000 Pages on a CD," New York Times, 1 page, Mar. 4, 1987.
Pollack, Andrew, "Teletext is Ready for Debut," The New York Times, Feb. 18, 1983, 2 pages.
Pollack, Andrew, "Time Inc. Drops Teletext Experiment," newspaper article, 1 page.
Pollack, Andrew, "Videodisk's Data Future," The New York Times, Oct. 7, 1982, p. D2.
Popek, G.J., et al., Encryption and Secure Computer Networks, Computing Surveys, vol. 11, No. 4, Dec. 1979, pp. 331–356.
Pottle, Jack T. et al., "The Impact of Competitive Distribution Technologies on Cable Television," Report, prepared for The National Cable Television Association, Mar. 1982.
Powers, Kerns H., "A Hierarchy of Digital Standards for Teleproduction in the Year 2001," SMPTE Journal, Dec. 1981, pp. 1150–1151.
Powers, S., et al., "Memo: An Application of Secret Key Cryptography and Public Key Distribution," CompSac '80, Oct. 1980, pp. 821–827.
Promotional letter, "Dow Jones Cable News," Dow Jones & Company, Inc., Jan. 1, 1982, 2 pages.
Proposed American National Standard, "Electrical and Mechanical Characteristics for Digital Control Interface," SMPTE Journal, Sep. 1982, pp. 888–897.
Propectus, Cheyenne Software, Inc., Oct. 3, 1985.
Prospectus, Color Systems Technology, Inc., Aug. 13, 1986.
Propectus, Digitext, Inc., Feb. 27, 1986.
Prospectus, Financial News Network, Inc., Jul. 13, 1982.
Prospectus, Quotron Systems, Inc., Nov. 1982.
Prospectus, Vikonics, Inc., Jul. 14, 1987.
Prosser, Howard F., "Set Top Adapter Considerations for Teletext," Consumer Electronics, pp. 393–399.
PSN, Private Satellite Network, Inc., product information for MISTS, Mass Interactive Simultaneous Telecommunications System, 6 pages.
Rayner, Bruce, "High–Level Switcher Interface Improves Editing Techniques," SMPTE Journal, Aug. 1985, pp. 810–813.
Remley, F.M., "Television Technology," SMPTE Journal, May 1982, pp. 458–462.
Rice, Michael, "Toward Enhancing the Social Benefits of Electronic Publishing," Report of an Aspen Institute Planning Meeting, Communications and Society Forum Report, Feb. 25–26. 1987.
Rice, Phillip, et al., "Development of the First Optical Videodisc," SMPTE Journal, Mar. 1982, pp. 277–284.
Risher, Carol A., "Electronic Media and the Publishers, Part 1: Teletext," Videodisc Videotex, vol. 1, No. 3, Summer 1981, pp. 162–167.
Robinson, Gary et al., "'Touch–Tone' Teletext—A Combined Teletext–Viewdata System," Consumer Electronics, pp. 298–303.
Rodgers, Richard W., "Design Considerations for a Transmission and Distribution System for SMPTE Time–Code Signals," SMPTE Journal, Feb. 1977, vol. 88, pp. 69–70.
Rogers, B.J., "The Options for Data Transmission Methods in Public Service Broadcasting," pp. 1–3.
Roizen, Joseph. "Teletext in the USA," SMPTE Journal, vol. 90, Jul. 1981, pp. 602–610.
Roth et al., "Functional Capabilities of a Computer Control System for Television Switching", SMPTE Journal, Oct. 1976, vol. 85, p. 808–811.
Rourke, "Television Studio Design—Signal Routing and Measurement", SMPTE Journal, Sep. 1979, vol. 88, p. 607–609.
Ruiten, P.J.G.M., "Viewdata in the Netherlands," Viewdata '80, Mar. 1980, pp. 133–138.
Russell, R.T. "Teletext remote control," part 1, Wireless World, Apr. 1979, 4 pages.
Russell, R.T. "Teletext remote control", part 2, Wireless World, May 1979, pp. 83–86.
Sabatier, J. et al., "The D2–MAC–Packet System for All Transmission Channels," SMPTE Journal, Nov. 1985, pp. 1173–1179.
Sadashige, K., "Overview of Time–Base Correction Techniques and Their Applications," SMPTE Journal, Oct. 1976, vol. 85, pp. 787–791.
Saddler, Jeanne et al., "Comsat, Citing Risks, Ends Negotiations With Prudential on Satellite—TV Venture," The Wall Street Journal, Dec. 3, 1984, p. 51.
Sandberg–Diment, Erik, "Instruction Without Inspiration," Personal Computers, The New York Times, Sep. 6, 1983, p. C4.
Sanger, David E., "A Computer Full of Surprises," The New York Times, May 8, 1987, 2 pages.

Sanger, David E., "Public TV Joins Venture to Send Finance Data to Computer Users," The New York Times, Feb. 21, 1985, pp. 1 and D8.

Sanger, David E., "Trading Stock By Computer," Technology, The New York Times, Mar. 29, 1984, 1 page.

Schloss, Robert E. et al. (Omega Communications, Inc.), "Controlling Cable TV Head Ends and Generating Messages by Means of a Micro Computer," Visions of the 80's, pp. 136–138.

Schnee Rolf M. et al. (Heinrich–Hertz–Institut Berlin (West)), "Technical Aspects of Two–Way CATV Systems in Germany," Cable 78, pp. 34–41.

Schoeneberger, Carl F. (Tocom, Inc.), "Addressable Terminal Control Using the Vertical Interval," Cable: '81, pp. 34–40.

Schrock, Clifford B. (C.B. Schrock and Associates, Inc.), "Pay Per View, Security, and Energy Controls Via Cable: The Rippling River Project," Visions '79, pp. 80–85.

Schrock, Clifford B. (Cable Bus Systems Corporation), "Can Noise and Ingress Coexist with Two–Way Services?," Cable '82, pp. 205–209.

Scotch Laser Videodisc, Master Tape Specification, May 1984, 2 pages.

Scotch Laser Videodisc, Price List, May 1, 1984, 2 pages.

Scotch Laser Videodisc, Prices for Special Services, Feb. 15, 1984, 2 pages.

Sedman, E.C., "The Use of MicroCobol for Telesoftware," Viewdata '80, Mar. 1980, pp. 399–411.

Sheets, Kenneth R., "No go. TV networks nix new high–tech rating system," U.S. News & World Report, p. 39, Jul. 20, 1987.

Sherry, L.A., "Teletext Field Trials in the United Kingdom," Consumer Electronics, pp. 409–423.

Shiraishi, Yuma, "History of Home Videotape Recorder Development," SMPTE Journal, Dec. 1985, pp. 1257–1263.

Shrimpton, W., "International Business Applications of Viewdata," Viewdata '80, Mar. 1980, pp. 147–158.

Sigel, Efrem et al. Videotext: The Coming Revolution in Home/Office Information Retrieval, (White Plains, NY: Knowledge Industry Publications, Inc., 1980), pp. 6, 7, 13, 28, 33, 34, 36, 37.

Siocos, C.A., "Satellite Technical and Operational Committee—Television (STOC–TV) Guidelines for Waveform Graticules," SMPTE Journal, Nov. 1976, vol. 85, pp. 878–879.

Skrobko, John (Scientific–Atlanta Incorporated), "Improving CATV System Reliability with Automatic Status Monitoring and Bridger Switching," Cable '82, pp. 133–137.

Smirle, J.C., et al., "International Videotex Standardization: A Canadian View of Progress Towards the Wired World," Viewdata '80, Mar. 1980, pp. 271–280.

Smith, Charles C., "Computer Update" "Program Notes," TWA Ambassador, Sep. 1982, pp. 74–90.

Smith, M.G., "Prestel—The Private System or Both?," Viewdata '80, Mar. 1980, pp. 337–339.

SMPTE Journal, Apr. 1985, pp. 366–368, 473–478.

SMPTE Journal, Jan. 1983, pp. 64, 69–70, 87–90, 92–98.

SMPTE Journal, May 1980, vol. 89, p. 391, no title.

Softech Microsystems, Product Order Form, Oct. 1982, 2 pages.

Somers, Eric, "Appropriate Technology for Text Broadcasting," Viewdata and Videotext, 1980–81: A Worldwide Report, Transcript of viewdata '80, first world conferences on viewdata, videotex, and teletext, Knowledge Industry Publications, Inc., White Plains, New York, Copyright 1980 by Online Conference, Ltd., pp. 499–514.

Sony—Video Communications, "LDP–1000A Laser Videodisc Player," product description, 1983, 2 pages.

Sony Video Communications, "Videodisc, Premastering and Formatting," brochure, 1982.

Sony, "LDP–2000 Series, VideoDisc Players," brochure, 1985, 12 pages.

Sony, "Sony View System; The Intelligent Video System," product description, 1985, 2 pages.

Sony, Sony Video Communications, "PVM–1910/PVM–1911 19" Trinitron Color Video Monitors, product brochure, 1984, 8 pages.

Southworth, Glen (Colorado Video, Inc.), "Narrow–Band Video: The UPI 'Newstime' Technology," Visions '79, pp. 86–88.

Special Report, Business Week, Jul. 16, 1984, pp. 84–111.

Stanton, Gary W. (Southern Satellite Systems), "Downloading and Addressing via Teletext," Cable '82, pp. 161–165.

Stern, Joseph L. (Stern Telecommunications Corporation), "Addressable Taps," Cable: '81, p. 41.

Suzuki, Tadahiko et al., Television Receiver Design Aspects for Employing Teletext LSI, Consumer Electronics, pp. 400–405.

Swanson, E. et al., "An Integrated Serial to Parallel Converter for Teletext Application," Consumer Electronics, pp. 359–361.

Swetland, George R., "Applying the SMPTE Time and Control Code to Television Audio Post Production," SMPTE Journal, Aug. 1978, vol. 87, pp. 508–512.

Switzer, I. (Cable America, Inc.), "Cable TV Advances and TV Receiver Compatibility Problems," Cable '82, pp. 114–118.

Table of Contents, SMPTE Journal, Apr. 1981, vol. 90, No. 4, 1 page.

Table of Contents, SMPTE Journal, Aug. 1981, vol. 90, No. 8, 1 page.

Table of Contents, SMPTE Journal, Dec. 1981, vol. 90, No. 12, 1 page.

Table of Contents, SMPTE Journal, Feb. 1981, vol. 90, No. 2, 1 page.

Table of Contents, SMPTE Journal, Jan. 1981, vol. 90, No. 1, 1 page.

Table of Contents, SMPTE Journal, Jul. 1981, vol. 90, No. 7, 1 page.

Table of Contents, SMPTE Journal, Jun. 1981, vol. 90, No. 6, 1 page.

Table of Contents, SMPTE Journal, Mar. 1981, vol. 90, No. 3, 1 page.

Table of Contents, SMPTE Journal, May 1981, vol. 90, No. 5, 1 page.

Table of Contents, SMPTE Journal, Nov. 1981, vol. 90, No. 11, 1 page.

Table of Contents, SMPTE Journal, Oct. 1981, vol. 90, No. 10, 1 page.

Table of Contents, SMPTE Journal, Sep. 1981, vol. 90, No. 9, 1 page.

Tagliabue, John, "ITT's Key West German Unit," The New York Times, Apr. 29, 1985, p. D8.

Tagliaferro, John, "Tag Lines," 1982, 1 page.

Tantawi, A.N., et al., "Workstations in the Electronic Office," Viewdata '80, Mar. 1980, pp. 159–171.

Tanton, N.E. "UK Teletext—Evolution And Potential," Consumer Electronics, pp. 246–250.

Taylor, John P., "Comsat bit to FCC for DBS authorization: Is direct broadcasting the wave of the future?", Television/Radio Age, Mar. 23, 1981, pp. A–22–24 and A–26 and A–28–31.

Taylor, John P., "Comsat bid to FCC for DBS authorization: Questions of finances, 'localism,' monopoly," Television/Radio Age, May 4, 1981, pp. 42–44 and 80–81.

Taylor, John P., "Fourteen DBS authorization applications to FCC differ greatly in both structure and operations," Television/Radio Age, Oct. 5, 1981, pp. 40–42 and 116–119.

Taylor, Thayer C., "Laptops and the Sales Force: New Stars in the Sky," pp. 81–84.

Termens, M., "Teletel—The Planned French Videotex Service," Viewdata '80, Mar. 1980, pp. 25–28.

The Videodisc Monitor, vol. II: No. 8, Aug. 1984, 16 pages.

The Weather Channel, "The Weather STAR Satellite Transponder Addressable Receiver," Operation/Installation Manual, Rev. 01.5/82.

Thomas, L. Merle, "Television," SMPTE Journal, Apr. 1983, pp. 407–410.

Thomas, William L. (Zenith Radio Corporation), "Full Field Tiered Addressable Teletext," Cable '82, pp. 44–46.

TMS Inc., Digital Laser Technology, product information, 1984, 16 pages.

Tooms, Michael S. et al., "The Evolution of a Comprehensive Computer Support System for the Television Operation," SMPTE Journal, Aug. 1983, pp. 824–833.

Trachtenberg, Jeffrey A., "Anybody home out there?", Forbes, pp. 169–170, May 19, 1986.

Troughton, P., "Prestel Operational Strategy," Viewdata '80, Mar. 1980, pp. 51–62.

True Stereo Television, Series 1600 Warner–Amex Stereo Processers, Wegener Communications, Inc., product description, 1982, 3 pages.

Tunmann, E.O. et al. (Tele–Engineering Corp.), "Microprocessor For CATV Systems," Cable 78—Technical Papers, National Cable Television Association 27th Annual Convention, New Orleans, La, Apr. 30–May 3, 1978 ("Cable 78"), pp. 70–75.

Tunmann, Ernest O. (Tele–Engineering Corporation), "Two–Way Cable TV Technologies," Cable '82, pp. 7–15.

UltiTech, Inc., "The Portable Interactive Videodisc System 3," brochure, 1985.

Vaughan, Kimithy, "Evolution of Corporate Television Networks," Teleconference, The Business Communication Magazine, pp. 38–40.

Vega, Richard L. (Telecommunications Systems, Inc.), "From Satellite to Earth Station to Studio to S–T–L To MDS Transmitter To The Home; Pay Television Comes To Anchorage, Alaska," Cable 78, pp. 76–80.

Visage, Price List, Visage, Inc., Apr. 1985, 4 pages.

Vivian, R. H., et al., "Telesoftware Makes Broadcast Teletext Interactive," pp. 277–280.

Enhanced graphics for Teletext, R.H. Vivian, Aug. 1981, IEEE pp. 541–550.

Vivian, R.H., "Level 4 Enhanced UK Teletext Transmits Graphics Through Efficient Alpha–Geometric Coding," IBA, pp. 1–6.

von Meister, William F. (Digital Music Company), "The Home Music Store," Cable '82, pp. 180–182.

Waters, Harry F. et al., "Tuning In on the Viewer," Newsweek, p. 68, Mar. 4, 1985.

Watson, K., "Prestel User Market Research," Viewdata '80, Mar. 1980, pp. 281–284.

Wayne, Leslie, "Dismantling the Innovative D.R.I.," The New York Times, Dec. 16, 1984, 2 pages.

Wetmore, R. Evans, "System Performance Objectives and Acceptance Testing of the Public Television Satellite Interconnection System," SMPTE Journal, Feb. 1979, vol. 88, pp. 101–111.

Williams, D., "Oak, Micro TV in Talks for Teletext," Electronic News, Nov. 13, 1978, pp. 25 & 88.

Wilson, Donald H., "A Process For Creating A National Legal Computer Research Service In The United States," remarks at the conference on World Peace Through World Law and World Assembly of Judges, Belgrade, Yugoslavia, Jul. 23, 1971.

Winsbury, R., "Prestel as a publishing medium: the elements of success or failure," Viewdata '80, Mar. 1980, pp. 285–293.

Winsbury, Rex, ed. Viewdata in Action: A Comparative Study of Prestel (London: McGraw–Hill, Ltd., 1981), pp. 10–12, 31, 35, 36, 57–61, 102, 103, 109, 202–204, 211–219.

Woolfe, R., "The emerging markets for videotex," Viewdata '80, Mar. 1980, pp. 217–231.

Wright, James B. et al. (Rockford Cablevision, Inc.), "The Rockford Two–Way Cable Project: Existing and Projected Technology," Cable 78, pp. 20–28.

Yamamoto, Toshiaki, et al., "An Experimental System of FM Data–Broadcasting," NHK Laboratories Note, Dec. 1983, Serial No. 293, 12 pages.

Yanney, Sixty–Device Remote–Control System for NBC's Television Central Project, SMPTE Journal, Nov. 1976, vol. 85, p. 873–877.

Yasuda, K., "Conception of Captain System—Background, Experiment and Future Plans," Viewdata '80, Mar. 1980, pp. 107–111.

Yoshino, Hirokazu et al. (Matsushita Electric Industrial Co., Ltd.), "Multi–Information System Using Fiber Optics," Visions '79, pp. 134–137.

Young et al., "Developments in Computer–Controlled Television Switches", Journal of the SMPTE, Aug. 1973, vol. 82, p. 658–661.

Young et al., "The Automation of Small Television Stations", Journal of the SMPTE, Oct. 1971, vol. 80, p. 806–811.

Zaludek, Jerry P., "Videotape—Past, Present, and Future," SMPTE Journal, Apr. 1982, pp. 356–360.

Zborowski, "Automatic Transmission Systems for Television", SMPTE Journal, Jun. 1978, vol. 87, p. 383–385.

Zenith, Video Hi–Tech Component TV, product brochure, Aug. 1982, 8 pages.

Zimmerman, Frank, "Hybrid Circuit Construction for Routing Switchers," SMPTE Journal, Oct. 1985, pp. 1015–1019.

Zimmerman, R., "Future Utilization of Interactive and Broadcast Videotex in Germany and its Effects on Standardization," Viewdata '80, Mar. 1980, pp. 263–269.

Zoglin, Richard, "Peering Back at the Viewer," Time, p. 84, Jun. 30, 1986.

Anderson, The Vertical Interval: A General–Purpose Transmission Path, Sep. 1971.

Charles Gerrish, "Qube"—Interactive Video on the Move.

Hughes et al., Some Design Considerations for Home Interactive Terminals, IEEE Transaction on Broadcasting, vol. BC–17, No. 2, Jun. 1971.

Mothersdale, Peter L., "Teletext and viewdata: new information systems using the domestic television receiver", Electronics Record (1979), pp. 1349–1354.

Adding a new dimension to British television, Electronic Engineering (1974).

Hanas, O. J., et al., "An Addressable Satellite Encryption System for Preventing Signal Piracy," IEEE Transactions on Consumer Electronics, vol. CE–27, November 1981, pp. 631–635.

Kahn, et al., "Advances in Packet Radio Technology," Proceedings of the IEEE, vol. 66, No. 11, Nov. (1978) pp. 1468–1495.

Lopinto, John, "The Application of DRCS within the North American Broad cast Teletext Specification", IEEE Transactions on Consumer Electronics (1982), pp. 612–617.

Scala Info Channel Advertisement, "The Art of Conveying A Message".

BBC Microcomputer: BBC Microcomputer with Added Processor and Teletext Adapter (Manual).

B.B.C.I.B.A., Specification of Standards for information transmission by digitally coded signals in the field—blanking Interval of 625–line systems (1974), pp. 5–40.

"Brighton's Experience with Educational Software for Broadcast," 10 pages.

Memo—Re: British Teletext—ABC.

Hinton, J. H., "Character Rounding for the Wireless World teletext decoder," Wireless World, vol. 84 No. 1515, November 1978, pp. 49–53.

Noirel, Yves (CCETT/Rennes, France), "Abstract of paper entitled Data Broadcasting: "Didon" and "Diode" Protocols," Cable '82, pp. 175–179.

Chambers, John et al., "The Development of a Coding Hierarchy for Enhanced Teletext," IEEE Transaction on Consumer Electronics, (1981), pp. 536–540.

Jones, Keith, The Development of Teletext, pp. 1–6.

Didon: Diffusion de donnees par aprquets.

Huth, Gaylord K., Digital Television System Design Study: Final Report (Nov. 28, 1976), prepared for NASA Lyndon B. Johnson Space Center.

Weston, J.D., "Digital TV Transmission for the European Communications Satellite" (1974), pp. 318–325.

Maegele, Manfred, "Digital Transmissions of Two Television Sound Channels in Horizontal Banking", pp. 68–70.

Haberle, H. et al., "Digital TV Transmission vis Satellite", Electrical Communications (1974).

Shorter, D.E.L., "The Distribution of Television Sound by Pulse–Code Modulation Signals Incorporated in the Video Waveform".

Chambers, J.P., A Domestic Television Program Delivery Services, British Broadcasting Corporation, pp. 1–5.

Kaplinsky, C.H., "The D**(2)B A One Logical Wire Bus for Consumer Applications" IEEE Transactions on Consumer Electronics, vol. CE–27, Feb. 1981, pp. 102–109.

Crowther, "Dynamically Redefinable Character Sets—D.R.C.S.," IEEE Transaction on Consumer Electronics, (1980), pp. 707–716.

EIA Teletext SubCommittee Meetings, Report on USA Visit.

Electronic Industries Association—Teletext Subcommittee Task Group A—Systems Minutes of Meeting Mar. 30, 1981 at Zenith plus attachments.

Electronic Industries Assoc.—Teletext Subcommittee—Steering Committee Minutes of Meeting on Mar. 31, 1981.

Electronic Industries Association—Teletext Subcommittee Task Group A—Systems Interim Report, Mar. 30, 1981 by Stuart Lipoff, Arthur D. Little Inc.

"Enhanced Computer Controlled Teletext for 525 Line Systems (Usecct) SAA 5245 User Manual"0 report by J.R. Kinghorn, Aug. 1, 1981.

McKenzie, G.A., UK Teletext—The Engineering Choices, Independent Broadcasting Authority, pp. 1–8.

DeGoulet, et al., "Automatic Program Recording System" Radio diff. Et TV Nov. 1975.

Golding, L., "F1–Ditec–A–Digital Television Communications System for Satellite Links," Telecommunications Numeriques Par Satellite.

Golding, L., "A 15 to 25 Mhz Digital Television System for Transmission of Commercial Color Television" (1967), pp. 1–26.

Article, "50 Different Uses For At Home 2–Way Cable TV Systems" by Morton Dubin.

"Fernsehemfang rund um die Uhr" Funk Technik, Mar. 1981, Vo. 36.

IBA Technical Review of Digital Television by F. Howard Steele, pp. 1–64, Jun. 1973.

The Implementation of the Sound–in–Sync project for Eurovision (Feb. 1975), pp. 18–22, No. 140 E.B.U. Review.

Various Articles following cover sheet titled "QVP—Pay Per View" Nov. 29, 1982.

Derwent Info Ltd. search, Integrated broadcasting & Computer Processing system, Inventor J. Harvey/J. Cuddihy.

Chorafas, D., "Interactive Videotex—The Domesticated Computer," 1981, pp. 171–183 & preface.

Dalton,C.J., "International Broadcasting Convention" (1968), Sponsors: E.E.A., I.E.E., I.E.E.E., I.E.R.E., etc.

Chorky, J.M., Shorter, D.E.L., "International Broadcasting Convention" (1970), pp. 166–169.

Alfonzetti, Salvatore, "Interworking between teletext and OSI systems," Computer Communications (1989).

Letter to Peter Hatt Re: BVT: Advisory UK Industry Contact Group, Jun. 24, 1981.

Memo to Bernie Kotten about National Cable TV Association meeting and efforts to encourage Sony to Integrate teletext chip sets into its TV, Mar. 25, 1986.

Rogers, B.J., "Methods of measurement on teletext receivers and decoders", Proc.IEE (1979), pp. 1404–1407.

Clifford, Colin et al., "Microprocessor Based, Software Defined Television Controller", IEEE Transaction on Consumer Electronics (1978), pp. 436–441.

Minutes of Electronic Industries Association Teletext Subcommittee Task Force B—Laboratory & Field Tests Mar. 30, 1981.

MacKenzie, G.A., A Model for the UK Teletext Level 2 Specification (Ref: GTV2 242 Annex 6" based on the ISO Layer model.

National Captioning Institute, Comments on the Matter of Amendment of Part 73, Subpart E. of the Federal Communications Rules Government Television Stations to Authorize Teletext (before F.C.C.) Mar. 26, 1981.

Nat'l Online Meeting: Proceedings—1982 sponsored by: Online Review, pp. 547–551.

Article re: New services offered by a packet data broadcasting system, No. 149 Feb. 1975.

Rzeszeewski, T., "A New Telletex Channel".

Notations by Walt Ciciora dated Aug. 19, 1981 referring to Virtext figures, Aug. 19, 1981.
Oak Industries 1981 Annual Report.
Voorman, J.O. et al., A one–chip Automatic Equalizer for Echo Reduction in Teletext, IIEE Transactions on Consumer Electronics, pp. 512–529.
Talygin, N.V. et al., The "Orbita" Ground Station for Receiving Television Programs Relayed by Satellites, Elecktrovinz, pp. 3–5.
Collin, Simon, PC Text II (Hardware Review (Shortlist), PC User (1990).
Petition to FCC dated Mar. 26, 1981 titled, "Petition for Rulemaking of Unighted Kingdom Teletext Industry Group," also 1 page of handwritten notes from Walter Ciciora.
Green, N.W., "Picture Oracle," On Independent Television Companies Association Limited Letterhead.
Portions of Electronic Engineer's Reference Book (1989)—Multichannel sound systems, Teletext transmission, cable television, ISDN applications, etc.
"Preliminary Specification for Basic Text" Stamped Zenith Confidential, Feb. 17, 1981.
"Questions and Answers about Pay TV" by Ira Kamen, 1973.
"Relevant papers for Weather Channel V PMMC".
Report and Order of FCC on the Matter of Amendment of Parts 2,73, and 76 of the Commission's Rules to Authorize the Transmission of Teletext by TV Stations, pp. 1–37, May 20, 1983.
Kruger, H.E., "Speicherfernsehen, Das Digitale Kennungssystem ZPS," Proceedings 9th International Congress Microelectronics, pp. 39–45.
Ando, Heilchero et al., Still–Picture Broadcasting—A new Informational and Instructional Broadcasting System, IEEE Transactions on Broadcasting (1973), pp. 68–76.
Green, N., "Subtitling using teletext service—technical and editorial aspects", Proc.IEE (1979), pp. 1408–1416.
"Teletext and Viewdata Costs as Applied to the U.S. Market" Published by Mullard House (1979), pp. 1–8.
Nicholas Negroponte in SID 80 Digest titled, "17.4/10:25 a.m.: Soft Fonts", pp. 184–185.
Article re: "Teletext—Applications in Electronic Publishing".
Article re: Teletext signals transmitted in U.K . . . .
Harden, B., "Teletext/Viewdata LSI," IEEE Transactions on Consumer Electronics, (1979), pp. 353–358.
Chambers, M.A., "Teletext—enhancing the basic system", Proc.IEE (1979), pp. 1425–1428.
Tarrant, D.R., "Teletext for the World" (date unknown).
Vincent,A.et al., "Telidon Teletest System Field Trials" IEEE Transactions on Consumer Electronics, vol. CE–27, No. 3, Aug. 1981, pp. 530–335.
Hutt, P.R., "Thical and practical ruggedness of UK teletext transmission", Proc.IEE (1979), pp. 1397–1403.
Weston, J.D., "Transmission of Television by Pulse Code modulation", Electrical Communication (1967), pp. 165–172.
Dirks, H. et al., TV–PCM6 Integrated Sound and Vision Transmission System, Electrical Communication (1977), pp. 61–67.
Various Commissioner statements on Authorization of Teletext Transmissions by TV Stations, BC Docket No. 81–741, Mar. 31, 1983.

Balchin, C. "Videotext and the U.S.A." I.C. Product Marketing Memo.
AT&T, "Videotex Standard Presentation Level Protocol", 1981.
Betts, W.R., "Viewdata: the evolution of home and business terminals", Proc.IEE (1979), pp. 1362–1366.
Report by Cablesystems Engineering Ltd. on, "Zenith Addressable System and Operating Procedures" and Advertising documents, Nov. 1981.
Zenith Corporation's Z–Tac Systems Information Includes Z–tac specifications, access list, etc. (varous articles).
Notes to Section 22.4: Simple BLock Encipherment Algorithm.
The Institution of Electronic and Radio Engineers, Conference on Electronic Delivery of Data and Software, Pub. No. 69, Sep. 1986.
Videotext '81 published by Online Conferences Ltd., for the May 20–22, 1981 Confernece, pp. 1–470.
Breeze, E. G., "Television Line 21 Encoded Information and Its Impact on Receiver Design," Aug. 20, 1972, pp. 234–237.
9 Digital Television Developments, Independent Broadcasting Authority (Iba) Technical Review, pp. 19–31.
VSA's Teletext Products, Videographic Systems of America.
BS–14, Broadcast Specification, Television Broadcast Videotext, Telecommunication Regulatory Service, Jun. 19, 1981.
Diederich W., "Electronic Image and Tone Return Equipment With Switching System and Remote Control Receiver for Television Decoder," May 22, 1975.
Crowther, G. O., "Teletext and Viewdata Systems and Their Possible Extension to the USA," Proceedings, IEE, vol. 126, No. 12, Dec. 1979, pp. 1417–1424.
Parker, F.G., "The Impact of Digital Techniques on Studio Equipment," pp. 267–272.
Ferre, "Goodbye, TV Snow", Electronic Servicing, May 1977, pp. 14–22.
Howell, "A Primer on Digital Television" Journal of the SMPTE, Jul. 1975, 538–541.
"Telesoftware and Education Project: Summary of Report," A Joint BBC/ITV & Brighton Research Project, Summer 1982, 111 p. and appendix.
McArthur, David, "The television as a receive only terminal".
Money, "CEEFAX/Oracle: reception techniques (part 1)" Television, Jul. 1975, vol. 25, No. 9, pp. 396–398.
Barlow, Automatic Switching in the CBC—An Update, Sep. 1, 1976.
Kombinierer fur Videotextsignal, "Runfunktechnische Mitteilungen," Jahrgang 28, (1984), Heft 6, pp. 273–289.
Grethlein, M., "Videotext und Bildschirmtext," Funkschau, Heft 5, 1981, pp. 69–73.
Heider, et al., "Videotext und Bildschirmtext," Grundig Technische Informationen, Heft 4/5, 1980, pp. 171–195.
Davidoff, Frank, "The All–Digital Television Studio," SMPTE Journal, vol. 89, No. 6.
Kazama et al., Automatic Storage and Retrieval of Videotaped Programs, Apr. 1, 1979.
Gaucher, et al., Automatic Program Recording System, Nov. 1, 1975.
Zetti, Television Production Handbook (second edition), Jan. 1, 1969.
Marsden, "Master Control Techniques," v 9 of the "Journal of the Television Society," Nov. 1, 1959.

Byloff, "Automatic Control of Video Tape Equipment at NBC, Burbank," by the National Broadcasting Company, Inc., Jan. 1, 1959.

Skilton, "The Digitrol 2—Automatic VTR Programme Control," Mar. 1. 1981.

Gautier, J.P., "Language Telediffuse de Messagerie du Projet Ecrans Hybrides," Antiope/Didon system.

Benson, K. B. et al. "CBS New York Video Tape Facilities". Viewdata, First World Conference on Viewdata, Videotext and Teletext, Mar. 26, 1980, pp. 431–445.

Anderson: Progress Committee Report for 1979—Television, SMPTE Journal, May 1980, vol. 89, pp. 324–328.

Automated Videotape Delay Of Satellite Transmission, Chiddix, Satellite Communicatins Magazine.

Veith, Richard H., "Television's Teletext," Elsevier Science Publishing, Inc., New York, 1983, pp. 180+.

Brown et al., Project Score, pp. 624–630, 1960.

Enhanced graphics for Teletext, R.H. Vivian; Aug. 1981, IEEE pp. 541–550.

Baldwin, J. L. E., "The Digital Future of Television Studio Centres," IBA Technical Review, vol. 3, Jun. 1973, Digital Television, pp. 45–51.

Kaneko et al., "Digital Transmission of Broadcast Television with Reduced Bit Rate."

Burkhardt et al., "Digital Television Transmission With 34 Mbit/s".

Present Status Of Still Picture Television, Research & Development, Nhk.

Yanagimachi, Akio, "An Experimental Second–Generation Japanese Teletext System," NHK Laboratories Note, Oct. 1983, Serial No. 291.

Numaguchi, Y, et al., "A Teletext System for Ideographs," NHK Laboratories Note, Feb. 1982, Serial No. 271, 14 pages.

"Method for the Transmission of Additional Information," German Patent Application submitted by Blaupunkt Werke GMBH, filed May 31, 1980.

"Eine Neue Generation Mikroprozessorgesteuerter Datensender Und–Empfänger Für Alle Varianten Der DatenÓbertragung in Der V–Lücke Des Fernsehisgnals", A. Ebner and K. Schuster, Rundfunktechnische Mitteilungen, vol. 26, No. 5, pp. 215–220.

"A Novel Television Add–On Data Communication System", Jan. 1974, Patrick T. King, Society of Motion Picture and Television Engineers Journal, vol. 83.

"Actual Two–Way Systems," Ronald K. Jurgen, IEEE Spectrum, Nov. 1971.

"Additional Information Within the Television Signal", Sep. 1970, R. A. O'Connor, Journal of the Society of Motion Picture and Television Engineers, vol. 79, No. 9, p. 824.

"Applications of Information Networks," J.C.R. et al, Proceedings of the IEEE, vol. 66, No. 11, pp. 1330–1346, Nov. 1978.

"Automated Control Units for Advertising On Cable," G. Morgan, Image Technology, vol. 68, No. 9, pp. 457, 460, Sep. 1986.

"Coded Information Within the Picture Area", Feb. 1974, Wilton R. Holm, Society of Motion Picture and Television Engineers Journal, vol. 83.

"Color Decode a PCM NTSC Television Signal", Jun. 1974, John P. Rossi, Society of Motion Picture and Television Engineers Journal, vol. 83.

"Comparison of Technology and Capital Costs of New Home Services," Metin B. Akgun, IEEE Transactions on Cable Television, vol. CATV, No. 3, Jul. 1980.

"Codifica Numeric Del Segnale Sonoro–Interfaccia Per Gli Apparati Professionali", Oct. 1985, M. Barbero and M. Occhiena, Elettronica e Telecommunicazi oni, vol. 34, No. 5, pp. 209–216.

"Encryption–based security systems", May 29, 1987–Jun. 1, 1987, Wechselberger, NCTA Convention Records.

"Experiences with Piolot Projects in North America, Japan, and Europe", 1977, Eds. W. Kaiser, H. Marko, and E. Witte, Two–Way Cable Television.

"Going for The Microcomputer Market with Commercial Telesoftware", 1982, M. Shain, Viewdata 82.

"Hard encrypted video & audio television system", Mar. 15, 1986–Mar. 18, 1986, Jeffers, Glaab 8&. Griffin, NCTA Convention Records pp. 232–234.

"Hybrid Addressability," Stubbs & Holobinko, National Cable Television Association Convention, pp. 255–265, Jun. 3–Jun. 6, 1984.

"Individualized Still–Picture Communication on a Two–Way Broad–Band CATV System," Koji Maeda, IEEE Transactions on Communications, vol. COM23, No. 1, Jan. 1975.

"Low Cost Interactive Home TV Terminal," Stetten & Mason, National Cable Television Association Convention, pp. 49–53, Jul. 6–Jul. 9, 1971.

"Automatic Measurement and Control of Unattended TV Transmitters," Shelley and Smart, Society of Motion Picture and Television Engineers Journal, vol. 80, Nov. 1971.

"Off Premises Addressability," Preschutti, National Cable Television Association Convention, pp. 48–57, Jun. 2–Jun. 5, 1985.

"Operational Implementation of a Broadcast Television Frame Synchronizer", Mar. 1975, Robert J. Butler, Society of Motion Picture and Television Engineers Journal, vol. 84.

"Pilot Two–Way CATV Systems," Ernest K. Smith, IEEE Transactions on Communications, vol. 23, No. 1, Jan. 1975.

"Some Methods of Automatic Analysis of Television Test Signals", Dec. 1971, R. H. Vivian, Society of Motion Picture and Television Engineers Journal, vol. 80.

"SRS El Segundo Interim Test Report," Callais, National Cable Television Association Convention, pp. 384–407, May 17, 1972.

"Status Monitoring System," Hale, National Cable Television Association Convention, pp. 153–158; 1974.

"Television Applications and Transmission of Digital Data in the Vertical Blanking Interval", 1980, J. J. Lopinto, ITC/USA/'80, International Telemetering Conference, p. 650, pp. 345–349.

"Television Central," Society of Motion Picture and Television Engineers Journal, vol. 85, Oct. 1976.

"The Digital Video Effects System," Patten, Society of Motion Picture and Television Engineers Journal, vol. 87, Apr. 1978.

"The Magnavox Premium TV System," Forbes & Cooley, National Cable Television Association Convention, pp. 100–104, Jun. 17–Jun. 20, 1973.

"The Subscriber Response System," Durfee & Callais, National Cable Television Association Convention, pp. 28–48, Jul. 6–Jul. 9, 1971.

"TV Frame Synchronizer," Kano, et al., Society of Motion Picture and Television Engineers Journal, vol. 84, Mar. 1975.

"Two-Way Coax TV System Handles All Communication Needs," George F. Benton, Communications News, Apr. 1975.

"Use of Low Frequency Bi-Directional Digital Transmission On Cable," Ellis, National Cable Television Association Convention, pp. 38–45, Apr. 17–Apr. 20, 1977.

"Videotex & Teletext," Technical Panel, National Cable Television Association Convention, pp. 160–164, Jun. 12–Jun. 15, 1983.

"Videotex Networks," J. Stynen and M. Keymolen, Revue HF, vol. 1, No. 12, pp. 413–424, 1981.

"Videotex Technologies," Technical Panel, National Cable Television Association Convention, pp. 99–123, May 29–Jun. 1, 1981.

Das Digitales Fernsehkennungssystem ZPS, H. Eckhard Krüger, ntz Bd. 35 (1982) Helft 6 ("The Digital Television Identification System ZPS," ntz, vol. 35, No. 6, 1982, pp. 368–376).

Digitales Kennungssystem ZPS, Dr. H. E. Krüger, Forderungsvorhaben TK 0054/3 ("Digital Identification System ZPS," Dr. H. E. Krüger, Research Project TK 0054/3, Final Report, Oct. 1, 1978 to Oct. 31, 1979).

Hi-Ovis Development Project, M. Kawahata, Presented in Two-Way Cable Television, Experiences with Pilot Projects in North America, Japan and Europe, Proceedings of a Symposium Held in Munich, Apr. 27–29, 1977, pp. 135–142.

Kinghorn, J.R., 11/00/85, "Using Extensions to World System Teletext," IEEE Transactions on Consumer Electronics, vol. CE–31, No. 4, pp. 661–666.

The Videotex and Teletext Handbook, Hurly et al., Harper and Row Publishers, Inc., 1985.

Two-Way Applications for Cable Television Systems in the '70s, Ronald K. Jurgen, Editor, IEEE Spectrum, Nov. 1971.

Vereinbarung ZVEI/ARD/ZDF Zur ZRD/ZDF/ZVEI–Tichtlinie "Video–Programm–System (VPS)," AARD/ZDF, Dec. 4, 1984 (Memorandum of Understanding ZVEI/ARD/ZDF on the ARD/ZDF/ZVEI Guideline For a 'Video Programming System (VPS)').

Videoprogrammsystem der 2. Generation, Von Gunther Stacker, net 40 (1986), Heft 7/8 ("Second-Generation Video Programming Systems," Von Gunther Stacker, net vol. 7/8 No. 40 (1986), pp. 311–315).

Videotext Programmiert Videoheimgerate (VPV), Gerhard Eitz, Karl–Ulrich Oberlies, Fundfunktechnische Mitteilungen, Jahrg. 30 1988), H. 5 ("VCR Programming Via Teletext").

Videotext Programmiert Videorecorder, Von Gunther Hofmann, Andreas Neuman, Karl–Ulrich, Oberlies and Eckhard Schadwinkel, Rundfunktech Mitteilunger, Jahrg. 26 (1982) H. 6 ("Videotext Programs Video Recorder").

Videotext Und Bildschirmtext Mit Den LSI–Schaltungden SAA 5020, SAA 5030, SAA 5041 und SAA 5051, Valvo, Technische Information fur die Industrie, Apr. 1980 (Videotext and Interactive Videotex With the LSI–Circuits SAA 5020, SAA 5030, SAA 5041 and SAA 5051).

Viewdata: A Public Information Utility, Second Edition, 1980, Dr. Adrian V. Stokes.

Wunschprogramm Aus Der Fernsehzeitschrift, Funkschau Dec. 1981, pgs. 6070 ("Recording Programs from the Program Guide," Funkschau Dec. 1982, pp. 60–70).

Hinton, "Character rounding for the Wireless Word Teletex Decoder," Wireless World, Nov. 1978, pp. 49–53, vol. 84 No. 1515, IPC Business Press, United Kingdom.

Chorafas, "Interactive Videotex: The Domesticated Computer," 1981, Petrocelli Books, New York.

"Fernsehempfang rund um die Uhr" Funk Technik, Mar. 1981, vol. 36.

"LSI circuits for teletext and viewdata, The Lucy Generation," Mullard Limited, Technical Publication M81–0001, Jun. 1981.

Internal Correspondence to John Meyer from mike Clader RE: Teletext Business Posture, Sep. 18, 1981 and Internatl Correspondence to Mike Calder from John Nemec RE: Trip to Zenith, Sep. 9, 1981.

Memorandum to G. Kelly from W. Thomas RE: Modified ZTAC/Multi Channel SSAVI Requirements for Videoptex Products, Jan. 21, 1982.

Davidge, C. "America's Talk–Back Television Experiment Qube," Wired Cities—Shaping the Future of Communications.

Memo, RE: Next Moves by British teletext and video proponents toward gaining support of systems in US, Jun. 11, 1981 (includes attachments).

Martl, B., et al. "Discret, service de television cryptee", Revue de radiodiffusion–television, No. 40, 1975, pp. 24–30.

Heller, A. VPS–Ein Neues System Zuragsgersteurten Programmantzeichnung, Rundfunk technisde Mitteilungen, pp. 162–169.

Graf, P.H., "Antiope–Ueberragung fuer Breitbandige Videotex–Verteildienste", (1981).

Strauch, D. "Las Media De Telecommunication Devant la Rapture, Les Nonvellas Methods Presentees a L'Exposition Int'l 1979 de Radio (et TV)" 1979 (Abstract).

Carne, B.E., "The Wired Household," IEEE Spectrum, Oct.1979, pp. 61–66.

Baran, P. "On Distributed Communications," Defense Documentation Center for Scientific anbd Technical Information, Unclassified Technical Report, vols. 1–10.

Dages, C.L., "Videotex Services via CATV–Hybrid Systems Appraoch," pp. 14–25.

"Order No. 50: Initial Determination Granting Motion for Summary Determination of Invalidity of Claim 35 of the '277 Patent," In the Matter of Certainn Digital Satellite System (DSS) Receivers and Components Thereof (Inv. No. 337–TA–392), United States International Trade Commission, May 20, 1997.

"Initial and Recommended Determinations Paul J. Luckern, Administrative Law Judge," in the Matter of Certainn Digital Satellite System (DSS) Receivers and Components Thereof (Inv. No. 337–TA–392), United States International Trade Commission, Oct. 31, 1997.

"Notice of Final Commission Determination of No Violation of Section 337 of the Tariff Act of 1930," in the Matter of Certain Digital Satellite System (DSS) Receivers and Components Thereof (Inv. No. 337–TA–392), United States International Trade Commission, Dec. 4, 1997.

"Notice of Commission Decision to Terminate the Investigation and To Vacate Portions of Initial Determination," in the Matter of Certainn Digital Satellite System (DSS) Receivers and Components Thereof (Inv. No. 337–TA–392), United States International Trade Commission, May 13, 1999.

Decision in *PMC* v. *ITC/DirecTV/Thomson* (98–160), US Court of Appeals for the Federal Circuit, Nov. 24, 1998.

Decision in *PMC* v. *ITC/DirecTV/Thomson* (97–1532); US Court of Appeals for the Federal Circuit, Jan. 7, 1999.

"Report and Recommendation of Special Master Regarding Claim Construction," *Pegasus* v. *DirecTV, Thomson, and PMC et al.* (CA No. 00–1020–GMS), US District Court for the District of Delaware.

"Memorandum and Order," *Pegasus* v. *DirecTV et al.* (CA No. 00–1020–GMS), US District Court for the District of Delaware, May 14, 2003.

Chambers, J.P., "Teletext—The Potential of an Extended System," International Broadcasting Convention (UK) pp. 114–117.

Gautier, C. et al. "EPEOS—Automatic Program Recording System".

Raggett, Michael. "Broadcast Telesoftware," Computer Graphics World, vol. 6, No. 9, Sep. 1983, table of contents, pp. 49, 50, 52.

McKenzie, G.A., "Teletext—The First Ten Years," Developments in Teletext, Independent Broadcasting Authority, May 1983, pp. 4–10.

Hutt, P., "Oracle–A Fourth Dimension in Broadcasting," IBM Technical Review, Sep. 1976, Digital Television Developments, pp. 3–9.

Lucas, K., "The Numerical Basis for Oracle Transmission," IBA Technical Review, vol. 9, September 1976, Digital Television Developments, pp. 10–16.

Kaplinsky, C. H., "The D2B a One Logical Wire Bus for Consumer Applications," IEEE Transactions on Consumer Electronics, vol. CE–27, Feb.1981, pp. 102–109.

Numaguchi, Y., et al., "Experimental Studies of Transmission Bit–Rate for Teletext Signal in the 525–Lane Television System," IEEE Transactions on Broadcasting, vol. BC–25, Dec. 1979, pp. 137–142.

Crowther, G.O., "Subscription T.V., A Concept For A Multi Satellite, Multi Programme Source Environment," Apr. 27, 1987, 2 pages.

Draft, North American Broadcast Teletext Specification (NABTS), EIA/CVCC, Sep. 20, 1983, 85 pages.

Arnold, W. F., "Britons Mull 'Magazine' Via TV," Consumer Electronics, Feb. 5, 1976, pp. 68–69.

Telesoftware, Systems International, Jun. 1980, p. 43.

International Telecommunications Union, "Recommendations and Reports of the CCIR, 1982," XVth Plenary Assembly Geneva, 1982, 393 pages.

Murata, M., et al., "A Proposal for Standardization of Home Bus System for Home Automation," IEEE Transactions on Consumer Electronics, Nov. 1983, vol. CE–29, No. 4, pp. 524–529.

Yamamoto, Kazuyuki, et al., A Home Terminal System Using the Home Area Information Network, IEEE Transactions on Consumer Electronics, Nov. 1983 vol. CE–30, No. 4, pp. 608–616.

Broadcast Teletext Telesoftware Specification, Apr. 1983, 31 pages.

Lukaart, A. "Dutch Telesoftware Standard," Netherlands PTT, Sep. 1984, 24 pages.

Lentz, J., et al., "Television Captioning for the Deaf Signal and Display Specifications," Report No. E–7709–C, PBS Engineering and Technical Operations, May 1980.

Pulses on a Television Signal Control Stations in Network, Electronics, Feb. 6, 1967, pp. 101–102.

Demonstration of the Principle of Data Transmission in the Vertical Interval of the Television Video Waveform, Oct. 22, 1968, 4 pages.

Kruesi, William R., et al., "Residential Control Considerations," IEEE Transactions on Consumer Electronics, Nov. 1982, vol. CE–28 No. 4, pp. 563–570.

Rayers, D.J., "The UK Teletext Standard for Telesoftware Transmission," Telesoftware, Cavendish Conference Center, Sep. 27 & 28, 1984, IERE Publication No. 60, pp. 1–8.

Kinghorn, J.R., "Receiving Telesoftware with CCT," Telesoftware, Cavendish Conference Center, Sep. 27 & 28, 1984, IERE Publication No. 60, pp. 9–14.

Sharpless, G.T., "Telesoftware: Adding Intelligence to Video," Telesoftware, Cavendish Conference Center, Sep. 27 & 28, 1984, IERE Publication No. 60, pp. 15–19.

Blineau, J., et al., "How to Execute TeleSoftware within the Terminals," Telesoftware, Cavendish Conference Center, Sep. 27 & 28, 1984, IERE Publication No. 60, pp. 21–24.

Brown, L., "Telesoftware: Experiences of Providing a Broadcast Service," Telesoftware, Cavendish Conference Center, Sep. 27 & 28, 1984, IERE Publication No. 60, pp. 25–28.

White, M., "Educational Telesoftware," Telesoftware, Cavendish Conference Center, Sep. 27 & 28, 1984, IERE Publication No. 60, pp. 29–33.

Yeates, N.J., "Monitoring and Evaluation of the Telesoftware and Primary Education Project" Telesoftware, Cavendish Conference Center, Sep. 27 & 28, 1984, IERE Publication No. 60, pp. 35–37.

Stanton, G.W., "Implementation of Teletext on Cable Television System in the United States," Telesoftware, Cavendish Conference Center, Sep. 27 & 28, 1984, IERE Publication No. 60, pp. 39–43.

Dowsett, C., "Telesoftware in the Development of Wideband Cable Systems and Services," Telesoftware, Cavendish Conference Center, Sep. 27 & 28, 1984, IERE Publication No. 60, pp. 45–48.

Pim, D.N., "Telesoftware via Full Channel Teletext," Telesoftware, Cavendish Conference Center, Sep. 27 & 28, 1984, IERE Publication No. 60, pp. 49–54.

Havelock, T.J., "Games Telesoftware on Cable," Telesoftware, Cavendish Conference Center, Sep. 27 & 28, 1984, IERE Publication No. 60, pp. 55–58.

Shain, M., "Microcomputer Publishing," Telesoftware, Cavendish Conference Center, Sep. 27 & 28, 1984, IERE Publication No. 60, pp. 59–69.

Sweet, A., "The Development of a Commercial Telesoftware Service," Telesoftware, Cavendish Conference Center, Sep. 27 & 28, 1984, IERE Publication No. 60, pp. 71–74.

Maurer, H., et al., "Teleprograms—The Right Approach to Videotex . . . If You Do It Right," Telesoftware, Cavendish Conference Center, Sep. 27 & 28, 1984, IERE Publication No. 60, pp. 75–76.

Harris, A., "A European Standard Protocol for Videotext TeleSoftware," Telesoftware, Cavendish Conference Center, Sep. 27 & 28, 1984, IERE Publication No. 60, pp. 79–82.

Institution of Electronic and Radio Engineers, "Programme and Registration Form, International Conference on 'Telesoftware, ' Cavendish Conference Centre, London: Sep. 27 and 28 1984," 4 pages.

Pim, D.N., "The World System Teletext Specification," IERE Conference on Electronic Delivery of Data and Software, London, Sep. 16 & 17, 1986, Publication No. 69, pp. 3–8.

Dowsett, C., "Code of Practice for Second Generation Teletext," IERE Conference on Electronic Delivery of Data and Software, London, Sep. 16 & 17, 1986 pp. 9–26.

Foster, R.A.L., et al., "The European Videotext Standard," IERE Conference on Electronic Delivery of Data and Software, London, Sep. 16 & 17, 1986 pp. 27–32.

Brown, Lawson, J., "BBC Telesoftware—3 Years On," IERE Conference on Electronic Delivery of Data and Software, London, 9/16&17/86 pp. 35–38.

Harris, Anthony, "A European Standard for Videotex Processable Data," IERE Conference on Electronic Delivery of Data and Software, London, Sep. 16 & 17, 1986 pp. 39–42.

Waters, A.G., "The Use of Broadcast and Multicast Techniques on Computer Networks," IERE Conference on Electronic Delivery of Data and Software, London, Sep. 16 & 17, 1986 pp. 45–50.

Conway, Paul A., "'Acotuda' An adaptive Technique for Optimum Channel Useage in Data Broadcasting," IERE Conference on Electronic Delivery of Data and Software, London, Sep. 16 & 17, 1986 pp. 51–56.

Robinson, C.J., "Interactive Video Cable," IERE Conference on Electronic Delivery of Data and Software, London, Sep. 16 & 17, 1986 pp. 59–66.

Boyd, R.T., "Interactive Service Development on the BT Switched–Star Network," IERE Conference on Electronic Delivery of Data and Software, London, Sep. 16 & 17, 1986 pp. 67–73.

Mason, A., "The Principles of the Over–Air Addressed Pay–Per–View Encryption System for Direct Broadcasting by Satellite and for Teletext," IERE Conference on Electronic Delivery of Data and Software, London, Sep. 16 & 17, 1986 pp. 77–85.

Stow, R.G., et al., "Privacy and Security in Broadcast Teletext Systems," IERE Conference on Electronic Delivery of Data and Software, London, Sep. 16 & 17, 1986 pp. 87–91.

Chambers, J.P., "BBC Datacast—The Transmission System," IERE Conference on Electronic Delivery of Data and Software, London, Sep. 16 & 17, 1986 pp. 93–98.

Bradshaw, D.J., et al., "BBC Datacast—Conditional Access Operation," IERE Conference on Electronic Delivery of Data and Software, London, Sep. 16 & 17, 1986 pp. 99–105.

Brown, Lawson, J., "BBC Datacast—Implementing A Data Service," IERE Conference on Electronic Delivery of Data and Software, London, Sep. 16 & 17, 1986 pp. 107–110.

Givertz, M.J., "Practical Implementation of an Information Provision Service Using Teletext," IERE Conference on Electronic Delivery of Data and Software, London, Sep. 16 & 17, 1986 pp. 111–116.

Tarrant, D.R, "Data Link Using Page–Format Teletext Transmission," IERE Conference of Electronic Delivery of Data and Software, London, Sep. 16 & 17, 1986 pp. 119–125.

Hinson, C.R., "'A Full Level One+' World System Teletext Decoder," IERE Conference on Electronic Delivery of Data and Software, London, Sep. 16 & 17, 1986 pp. 127–132.

Kinghorn, J.R., et al., "Packet and Page Format Data Reception Using a Multistandard Acquisition Circuit," IERE Conference on Electronic Delivery of Data and Software, London, Sep. 16 & 17, 1986 pp. 133–140.

Gill, B., "A New Teletext Data Acquisition Circuit in CMOS, The MV1812," IERE Conference on Electronic Delivery of Data and Software, London, Sep. 16 & 17, 1986 pp. 141–145.

Martin, James, Viewdata and the Information Society, Prentice Hall, 1982, p. 293.

Alber, Antone F., "Videotex/Teletext, Principles and Practices," McGraw–Hill Book Company, pp. 37, 138–139, 142–147, 188–191.

Videotex/Teletext Presentation Level Protocol Syntax, North American PLPS, ANSI X3.110–1983, CSA T500–1983, ANSI & CSA, Dec. 1983, p. 105.

Joint EIA/CVCC Recommended Practice for Teletext: North American Basic Teletext Specification (NABTS), IS–14, CVCC–TS100, Mar. 1984.

Money, S. A., et al., "Teletext Decoder Update—Part 1," Television, Jun. 1979; pp. 407–409.

Money, S. A., et al., "Teletext Decoder Update—Part 2," Television, Jun. 1979; pp. 479–481.

Money, S.A., et al., "Teletext Decoder Update—Part 3," Television, Aug. 1979, pp. 538–541.

Peters, H., "Teletext the Philips Way," Television, Apr. 1980, pp. 298–301.

Shortland, D., "Teletext with Infra–Red Remote Control," Practical Electronics, Aug. 1980, pp. 39–44.

Mokhoff, N., "Consumer Electronics," Technology '80, pp. 64–68.

Insam, E., et al., "An Integrated Teletext and Viewdata Receiver," The SERT Journal, vol. 11, Oct. 1977, pp. 210–213.

Wright, J. B., et al., "An Evolutionary Approach to the Development of Two–Way Cable Technology Communication," IEEE Transactions on Cable Television, vol. CATV–2, No. 1, Jan, 1977, pp. 52–61.

Fedida, S., et al., "Viewdata—The Post Office's Textual Information and Communications System," Wireless World, Feb. 1977, pp. 32–35.

Fedida, S., et al., Videodata Revolution, Halsted Press, New York, 1979, pp. 1–31 and 170–183.

Thomas, H. B., et al., "Methods of Designing and Evaluating Videotex," Online: A Transcript of the Online Conference on Videotex, Videodata and Teletext, 1980, pp. 203–216.

Fletcher, Carol, "Videotext: Return Engagement," IEEE Spectrum, Oct. 1985, pp. 34–38.

Bortz, Paul I., et al., Great Expectations; A Television Manager's Guide to the Future, National Association of Broadcasters, Apr. 1986, pp. 101–103, 133–136.

Blatt, J. et al., "The Promise of Teletext for Hearing Impaired Audiences," IEEE Transactions on Consumer Electronics, vol. CE–26, Nov. 1980, pp. 717–722.

Sillman, David, "Television Captioning for the Deaf," IEEE Transactions on Consumer Electronics, May 1984, vol. CE–30, No. 2, pp. 62–65.

Rupp, C. R., "A Stand–Alone CAI System Based on Procedural Grammars," EASCON '76 Record, Sep. 1976, pp. 1153–A through 1153–Z.

Vezza, A., et al., "An Electronic Message System: Where Does It Fit?," Trends and Applications 1976: Computer Networks, Nov. 17, 1976, pp. 89–97.

Henderson, Jr., D., et al., "Issues in Message Technology," Proceedings, Fifth Data Communications Symposium, Sep. 27–29, 1977, pp. 6–1 –6–9.

Myer, T. H., et al., "Message Technology in the Arpanet," NTC '77, 21: 2–1 through 2–8.

Kuo, F. F., "Message Services in Computer Networks," Interlinking of Computer Networks, Reidel Publishing Co., 1978, pp. 387–395.

Rinde, J., "Packet Network Access in Electronic Mail System," NTC 1980—Conference Record, Nov. 1980, pp. 60.4.1–60.4.4.

Wendlinger, F., et al., "Systems for Corporate Text Communication," NTC 1980—Conference Record, Nov. 1980, pp. 65.5.1–65.5.4.

Naffah, N., "Communication Protocols for Integrated Office Systems," Computer Networks, vol. 5, No. 6, 1981, pp. 445–454.

Treves, S.R., et al., "Text, Image, and Data Integration In a Distributed Control Digital Voice Switching System," ISS '81, Sep. 1981.

Wiest, G., et al., "An Integrated Service Broadband Network for Voice, Text, Data and Video,"ISS '81, Sep. 1981.

Raag, Helmo, "International Electronic Mail," NTC Record—1981, National Telecommunications Conference, Nov. 29, 1981–Dec. 3, 1981, pp. A9.1.1–A9.1.5.

Holmes, Edith, "Electronic Mail Debuts," ASIS Bulletin, Dec. 1981, pp. 40–42.

Dickson, E.M. et al., The Video Telephone, Praeger Publishers, 1973, pp. v. and 9–78.

Rayner, B., "The Application of Switcher–Intelligent Interfaces to Video Tape Editing," SMPTE Journal, vol. 88, Oct. 1979, pp. 715–717.

Baer, R., "Innovative Add–On TV Products," IEEE Transactions on Consumer Electronics, vol. CE–25, Nov. 1979, pp. 765–771.

Davies, D.W., et al., Computer Networks and Their Protocols, John Wiley & Sons, 1979, pp. v–xiii and 390–417.

Lyons, R.E., "A Total Aautodin System Architecture," IEEE Transactions on Communications, vol. Com–28, No. 9, Sep. 1980, pp. 1467–1471.

Allgaier, G.R., et al., "Navy Command and Control (c2) Using Local Networks," NTC 1980—Conference Record, Nov. 1980, vol. 1, pp. 41.3.1 through 41.3.5.

Harris, Dr. Thomas G., et al., "Development of the MIL-NET," Conference Record, Eascon 82, 1982, pp. 77–80.

Veith, Richard H., "Teletext (Broadcast Videotext) Begins in the United States," National Online Meeting Proceedings—1982, pp. 547–551.

Beville, Hugh M. Jr., "The Audience Potential of the New Technologies: 1985–1990," Journal of Advertising Research, Apr./May 1985, pp. RC–3–RC–10.

Proceedings, Fifth Data Communications Symposium, Sep. 27–29, 1977, Table of Contents.

Braden, R., "A Server Host System on the Arpanet," Proceedings, Fifth Data Communications Symposium, Sep. 27–29, 1977, p. 4–1–4–9.

Takizawa, M., et al., "Resource Integration and Data Sharing on Heterogeneous Resource Sharing System," Evolutions In Computer Communications, 1978, pp. 253–258.

Smith, R.G., et al., "Considerations for Microprocessor–based Terminal Design," Conference Record—12th Asilomar Conference on Circuits, Systems and Computers, Nov. 1978, pp. 437–441.

Mowafi, O.A., et al., "Integrated Voice/Data Packet Switching Techniques for Future Military Networks," Proceedings, Computer Networking Symposium, 1979, pp. 216–223.

Rosen, E.C., "The Updating Protocol of Arpanet's New Routing Algorithm," Computer Networks, vol. 4, 1980, pp. 11–19.

Hasuike, K., et al., "Text and Facsimile Integrated Terminal," NTC 1980—Conference Record, 1980, p. 60.5.1 through 60.5.5.

Cerf, V.G., et al., "An Experimental Service for Adaptable Data Reconfiguration," IEEE Transactions on Communications, vol. COM–20, No. 3, Jun. 1972, pp. 557–564.

Croll, R. H., et al., "A Distributed data Acquisition and Processing System for Multiple Aerospace Test Facilities," Proceedings of the 26$^{th}$ Int'l Instrumentation Symposium, May 1980, pp. 287–295.

Tsay, D. P., et al., "Design of a Robust Network Front–End for the Distributed Double–Loop Computer Netowrk," Distributed Data Acquisition, Computing, and Control Symposium, Dec. 1980, pp. 141–155.

Glorieux, A. M., et al., "Distributing a Line System into a Distributed Data Base Management System: Sirius–Delta Experience," Proceedings—Computer Networking Symposium, Dec. 1980, pp. 19–25.

Bertsekas, Dimitri P., "Distributed Dynamic Programming," Proceedings of the 20th IEEE Conference on Decision & Control, Dec. 16, 1981, vol. 1, pp. 774–779.

Hartung, R.L., et al., "Virtual I/O—An Experiment," Sigmicro Newsletter, vol. 10, No. 4, Dec. 1979, pp. 109–113.

Microprocessor Smartens Teletext, Electronics, Sep. 28, 1978, p. 74.

Pandey, K., "Advanced Teletext Systems," pp. 262–265.

Sowter, B., "Vision of the Future," International Broadcast Enginneer, Dec. 1977/Jan. 1978, pp. 13–19.

Dynamic Technology Limited, Vimacs, Machine Control and Data Transmission Systems, product descriprion, 6 pages.

O'Connor, R.A., "Current Usage of Vertical Interval Test Signals in Television Broadcasting," IEEE Transactions on Consumer Electronics, Aug. 1976, pp. 220–229.

Setos, A., "WASEC's Network Operations Center,"Cable: '81, May 1981, pp. 52–54.

Beakley, G.W., et al., "Cable and Earth Stations—A Business Connection," Cable: '81, May 1981, pp. 108–113.

Thomas, W., "Zenith Videotex/Teletext Review," 3 pages.

Vidata Interface Cable (Vidata 2105).

Vidata—352/BNC Connectors, Wegener Communications, Inc., 8 pages.

Taylor, E.L, "Teletext v. Videotext: Pros and Cons and What's Really Going On," For TVC Magazine, 6 pages.

VG Electronics—Short Form Catalogue, 4 pages.

Technical Publications Department, Mullard Limited, "525 Line NTSC Teletext Decoder Module," Advanced Development Sample Information, Jan. 1983, 8 pages.

Presentation Level Protocol—Videotex Standard, Bell System, May 1981, pp. 1–105.

Ciciora, Walter S., "Cable Videotex in the United States," The World Videotex Report, 1984, pp. 559–573.

Zenith Radio Corporation, News Release, "Teletext: The Newest Window To The Future As Science Fiction Becomes Reality," Jun. 23, 1983.

Keycom, SSS Boards Approve Joint Venture for Keyfax National Teletex Magazine, Keycom News Release, Aug. 20, 1982, 3 pages.

Diode Array Connection, Virdata 2.1, 1982, 7 pages.

Sullivan, W., "Cabletext: Into Second Year and Developing," Satellite Communications Corp., 4 pages.

Bugg, R.E.F., "Microprocessor Peripheral for Viewdata," Electronic Components & Applications, vol. 3, No. 2, Feb. 1981, pp. 2–11.

Addressable Cable Television Control System with Vertical Interval Data Transmission, Campbell et al., abandoned app. No. 348,937, pp. 1–28, abstract, claims 1–42, Figs. 1–13 (Mar. 1980).

The Specification of the Parent Application of Campbell et al., filed Mar. 1980 (WO 81/02961 PCT).

Federal Register/vol.64, No. 146/Friday, Jul. 30, 1999.

Programmkennung fur Fernsehsendungen, (Fernsehempfang rund um die Uhr), Funk Technik, Mar. 1981, vol. 36.

Bright, R., "The Telematique Programme in France," Viewdata & Videotext, 1980–81 A Worldwide Report/Transcript of Viewdata '80 First World Conference On Viewdata, Videotex, and Teletext, Mar. 26–28, 1980, pp. 19–24.

Day, J.D., "Terminal Protocols," IEEE Transactions on Communications, vol. COM–28, No. Apr. 4, 1980, pp. 585–593.

Etkin, Vertical Interval Signal Applications, Broadcast Engineering, Apr. 1970, pp. 30–35.

Gecsei, Jan. The Architecture of Videotex Systems (Englewood Cliffs, N.J: Prentice–Hall, Inc., 1983), pp. 174–177, 233–238.

McIntyre, Colin, "Broadcast teletext—who says it isn't interactive?" pp. 1–12 in: Anon, Videotex—key to the information revolution (Online Publications Ltd., 1982).

Nishimoto, Naomichi et al., "VHS VCR with Index and Address Search Systems," Consumer Electronics, vol. CE–33, No. Aug. 3, 1987, pp. 220–225.

O'Connor, R., Ad Hoc Committee on Television Broadcast Ancillary Signals, Journal of the SMPTE, vol. 82, Dec. 1973.

Solomon, B., "The Upcoming New World of T.V. Reception," Popular Electronics, May 1979.

Stagg, "An Integrated Teletext and Viewdata Receiver" The SERT Journal vol. 11, Oct. 1977, pp. 210–213.

Tydeman, John et al. Teletex and Videotex in the United States: Market Potential, Technology, Public Policy Issues, Institute for the Future (New York: McGraw–Hill Publications, 1982), pp. 4, 89–99, 122–169.

Viewdata 81, the second World Conference on viewdata, videotex and teletext, Table of Contents for written papers presented at the Conference, Oct. 1981.

Allora–Abbondi, G., "Transmission System Evaluation for Two–Way Cable," IEEE Transactions on Cable Television, vol. CATV–4, No. 3, Jul. 1979, pp. 111–118.

Ancillary Signals for Television, U.S. Dept. of Commerce, Sep. 1975.

Aston, M.H., "Viewdata—Implications for Education," 1980, pp. 467–476.

Auer, R., "Die Warteschlange Uberlistet," Funkschau, pp. 53–56.

Barlund, O., et al., "Telset, the Finnish Viewdata System," Viewdata & Videotext, 1980–81 A Worldwide Report/Transcript of Viewdata '80 First World Conference On Viewdata, Videotex, and Teletext, Mar. 26–28, 1980, pp. 139–148.

Crowther, G.O. "Teletext Enchancements—Levels 1, 2 and 3," IBA Technical Review, May 1983, pp. 11–16.

Fraser, J., "From 'Pots' to 'Pans' —Videotex Development in Canada," OnLine Conference on Viewdata Services, Mar. 1980, pp. 1–10.

Gallagher, E.F., "Digital Time Division Switching for Military Communications," IEEE Transactions on Communications, vol. COM–27, No. 7, Jul. 1979, pp. 1138–1143.

Gits, V., "Surprise a–Tac," Cablevision, vol. 10, No. 5, Oct. 1984, pp. 30–33.

Maguire, W.T., "Videotex and the Newspaper Business," American Newspaper Publishers Association.

Parkhill, D.F., "An Overview of the Canadian Scene," Viewdata '80, Mar. 1980, pp. 1–12.

Powell, C., "Prestel: The Opportunity For Advertising," Viewdata & Videotext, 1980–81 A Worldwide Report/Transcript of Viewdata '80 First World Conference On Viewdata, Videotex, and Teletext, Mar. 26–28, 1980, pp. 233–246.

Roth, M., "Security Alert a Two–Way Digital Communications System," Official Transcript—20th Annual NCTA Convention, Jul. 1971, pp. 500–506.

Schiller et al., "CATV Program Origination and Production", Feb. 1, 1979.

Schubin, The First Nationwide Live Stereo Simulcast Network, SMPTE Journal, vol. 86, Jan. 1977.

Specification du service de classe A, TeleDiffusion de France, Antiope.

Videotex Service, National Cable Television Association Executive Seminar Series, NCTA Washington, Oct. 1980, pp. III–VII, 1–3, 23–27.

Wilson, L.G., "Vista: Leading to the Successful Implementation of Videotex in Canada," OnLine Conference On Viewdata Services, Mar. 1980.

*IEEE Transactions on Consumer Electronics*, Special Issue—Consumer Text Display Systems (Teletext and Viewdata), Jul. 1979, vol. CE–25, No. 3, (ISSN 0098–3063) (pp. 235–429).

*Videotex Services* transcript of the National Cable Television Association Executive Seminar Series, Oct. 1980.

*Viewdata and Videotext, 1980–81: a Worldwide Report, Transcript of viewdata '80 first world conference on viewdata, videotex and teletext Mar. 26–28, 1980 (ISBN 0–914236–77–6).

*IEEE Transactions on Consumer Electronics*, Aug. 1980, vol. CE–26, No. 3, (ISSN 0098–3063) (pp. 482–628).

*Wireless World*, Nov. 1978 article entitled "Telesoftware Home Computing via Teletext" by Hedger.

Proceedings of the IEE, vol. 126, No. 12, Dec. 1979, article entitled "Telesoftware: Adding Intelligence to Teletext" by Hedger.

"Broadcast Teletext Specification" published by the British Broadcasting Corporation et al. in Sep. 1976.

"The Concept of a Universal 'Teletext' (broadcast and interactive videotext) Decoder, Microprocessor Based" by Bernard Marti Published in the Symposium Record of the $11^{th}$ International Television Symposium, Session VII A, Paper 3A.

*North American Broadcast Teletext Specification*, CBS/CC-ETT, Jun. 22, 1981.

"The Wireless World Teletext Decoder," J.F. Daniels, *Wireless World* vol. 81, No. 1480, Dec. 1975.

*Petition for Rulemaking to the Federal Communications Commission*, filed by CBS, dated Jul. 29, 1980.

Deposition Transcript of Joseph D. Rocci dated Jun. 28, 2005 and Deposition Exhibit Nos. 1–14.

Letter from Ms. J. Barritt (Banner & Witcoff on behalf of S–A) to Alderson Reporting Company dated Aug. 11, 2005 including (a) errata sheet for Jun. 28, 2005 deposition of Joseph D. Rocci and (b) post–deposition "addendum" to deposition transcript of Mr. Rocci.

Letter from S. Schreiner (Hunton & Williams on behalf of PMC) to C. McKee (Banner & Witcoff on behalf of S–A) dated Sep. 12, 2005 objecting to post–deposition, unsworn "addendum" supplied by Joseph D. Rocci.

Deposition Transcript of Frank J. D'Ascenzo dated Jul. 26, 2005, Deposition Exhibits Nos. 1–33, and letter from Ms. J. Barritt (Banner & Witcoff on behalf of S–A) to Alderson Reporting Company dated Aug. 25, 2005 including errata sheet for Jul. 26, 2005 deposition of Frank J. D'Ascenzo.

Deposition Transcript of Graham S. Stubbs dated Jul. 29, 2005, Deposition Exhibit Nos. 1–31, and letter from Ms. J. Barritt (Banner & Witcoff on behalf of S–A) to Alderson Reporting Company dated Aug. 30, 2005 including errata sheets for Jul. 29, 2005 deposition of Graham S. Stubbs.

"Response of Defendant Thomson Multimedia Inc. to Pegasus Development Corporation's Second Set of Interrogatories," dated Oct. 4, 2001.

"Thomson's Second Supplemental Response to Pegasus' Second Set of Interrogatories," dated Oct. 29, 2002.

"Defendant Thomson Multimedia Inc.'s First Amended Notice Pursuant to 35 U.S.C. § 282" dated Oct. 29, 2002.

Letter from G. Beck (Foley & Lardner on behalf of Philips) to S. Rosenzweig (Arnold & Porter on behalf of Pegasus and PMC) dated Feb. 4, 2003.

"Invitation to Press Preview of Playcable West Coast Premiere," PR Newswire, Oct. 8, 1980.

Scientific–Atlanta's Initial Invalidity Claim Charts from their Initial Prior Art Statement filed in US District Court for the Northern District of Georgia Civil Action No. 1:02–CV–824–CAP regarding Harvey, I, U.S. Patent No. 4,694,490.

Personalized Media Communications' Responsive Validity Claim Charts from their Joint Response to Scientific–Atlanta's Initial Prior Art Statement filed in US District Court for the Northern District of Georgia Civil Action No. 1:02–CV–824–CAP regarding Harvey I, U.S. Patent No. 4,694,490.

Scientific–Atlanta's Supplemental Invalidity Claim Charts from their Supplemental Prior Art Statement filed in US District Court for the Northern District of Georgia Civil Action No. 1:02–CV–824–CAP regarding Harvey I, U.S. Patent No. 4,694,490.

Personalized Media Communications' Validity Claim Charts from their Response to Scientific–Atlanta's Supplemental Prior Art Statement filed in US District Court for the Northern District of Georgia Civil Action No. 1:02–CV–824–CAP regarding Harvey I, U.S. Patent No. 4,694,490.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10, 12 and 13 is confirmed.

Claims 1–9 and 11 are cancelled.

* * * * *